(12) United States Patent
Ratnasingam

(10) Patent No.: US 9,672,734 B1
(45) Date of Patent: Jun. 6, 2017

(54) TRAFFIC AWARE LANE DETERMINATION FOR HUMAN DRIVER AND AUTONOMOUS VEHICLE DRIVING SYSTEM

(71) Applicant: Sivalogeswaran Ratnasingam, Petersham (AU)

(72) Inventor: Sivalogeswaran Ratnasingam, Petersham (AU)

( * ) Notice: Subject to any disclaimer, the term of this patent is extended or adjusted under 35 U.S.C. 154(b) by 0 days.

(21) Appl. No.: 15/093,761

(22) Filed: Apr. 8, 2016

(51) Int. Cl.
| | |
|---|---|
| *G06F 19/00* | (2011.01) |
| *G06G 7/70* | (2006.01) |
| *G08G 1/01* | (2006.01) |
| *H04L 29/08* | (2006.01) |
| *G08G 1/0968* | (2006.01) |

(52) U.S. Cl.
CPC ......... *G08G 1/0133* (2013.01); *G08G 1/0112* (2013.01); *G08G 1/0968* (2013.01); *H04L 67/12* (2013.01)

(58) Field of Classification Search
None
See application file for complete search history.

(56) References Cited

U.S. PATENT DOCUMENTS

| | | | | |
|---|---|---|---|---|
| 5,289,183 A | * | 2/1994 | Hassett | G01S 13/765 340/905 |
| 5,295,551 A | * | 3/1994 | Sukonick | B62D 1/28 180/167 |
| 5,331,561 A | * | 7/1994 | Barrett | G05D 1/024 340/903 |
| 5,369,591 A | * | 11/1994 | Broxmeyer | G05D 1/0261 180/167 |
| 5,487,002 A | | 1/1996 | Diller et al. | |
| 5,680,122 A | * | 10/1997 | Mio | G05D 1/0246 180/167 |
| 5,934,399 A | * | 8/1999 | Iiboshi | B60K 31/0008 180/169 |
| 6,032,097 A | * | 2/2000 | Iihoshi | G08G 1/22 180/168 |
| 6,150,961 A | * | 11/2000 | Alewine | G08G 1/01 340/905 |

(Continued)

FOREIGN PATENT DOCUMENTS

| | | |
|---|---|---|
| DE | 10327869 | 1/2005 |
| DE | 112009002556 | 2/2014 |

(Continued)

*Primary Examiner* — Bhavesh V Amin
(74) *Attorney, Agent, or Firm* — Michael D. Eisenberg

(57) ABSTRACT

A system, method, and computer program product for determining lane information in a road segment to drive a first vehicle to minimize travel time. According to an embodiment, navigation data of the first vehicle and at least one other vehicle in a road segment is sent to a computer server system via their respective clique leaders through a communication network. The lane information may include whether a change of lane is required, a lane to avoid, an optimum lane, and rank order of drivable lanes according to increasing order of travel time for the first vehicle to minimize travel time. The determined lane information is sent to the appropriate user device through its clique leader. The user device presents the lane information to a human driver and/or autonomous vehicle driving system of the first vehicle appropriately.

30 Claims, 20 Drawing Sheets

(56) References Cited

U.S. PATENT DOCUMENTS

| | | | |
|---|---|---|---|
| 6,169,495 B1* | 1/2001 | Koike | B61L 27/0016 340/435 |
| 6,169,940 B1* | 1/2001 | Jitsukata | B62D 1/28 340/903 |
| 6,246,932 B1* | 6/2001 | Kageyama | G05D 1/0297 340/992 |
| 6,249,232 B1* | 6/2001 | Tamura | G08G 1/163 180/167 |
| 6,269,304 B1 | 7/2001 | Kaji et al. | |
| 6,311,123 B1 | 10/2001 | Nakamura et al. | |
| 6,313,758 B1* | 11/2001 | Kobayashi | G08G 1/162 340/436 |
| 6,356,820 B1* | 3/2002 | Hashimoto | G08G 1/22 180/167 |
| 6,369,720 B1* | 4/2002 | Wilhelm | G08G 1/163 340/435 |
| 6,388,582 B2 | 5/2002 | Yamashita et al. | |
| 6,480,783 B1* | 11/2002 | Myr | G01C 21/3492 340/990 |
| 6,615,137 B2* | 9/2003 | Lutter | G08G 1/0965 340/436 |
| 6,700,505 B2 | 3/2004 | Yamashita et al. | |
| 6,708,107 B2* | 3/2004 | Impson | G08G 1/096716 340/905 |
| 6,720,920 B2 | 4/2004 | Breed et al. | |
| 6,765,495 B1* | 7/2004 | Dunning | G08G 1/161 340/435 |
| 6,944,538 B2 | 9/2005 | Ishibashi et al. | |
| 6,985,089 B2* | 1/2006 | Liu | G08G 1/161 340/436 |
| 7,085,633 B2 | 8/2006 | Nishira et al. | |
| 7,113,866 B2 | 9/2006 | Taliwal et al. | |
| 7,127,350 B2 | 10/2006 | Oikubo et al. | |
| 7,151,467 B2* | 12/2006 | Fujita | G08G 1/123 340/902 |
| 7,188,025 B2* | 3/2007 | Hudson, Jr. | G08G 1/161 340/904 |
| 7,376,508 B2 | 5/2008 | Barkowski et al. | |
| 7,427,929 B2* | 9/2008 | Bauer | G08G 1/162 307/9.1 |
| 7,610,138 B2* | 10/2009 | Takagi | G01C 21/3407 701/117 |
| 7,613,563 B2* | 11/2009 | Haegebarth | G08G 1/20 701/117 |
| 7,804,423 B2* | 9/2010 | Mudalige | G08G 1/161 340/902 |
| 7,899,617 B2 | 3/2011 | Kawakami et al. | |
| 7,925,438 B2 | 4/2011 | Lo et al. | |
| 7,930,094 B2* | 4/2011 | Bauchot | G08G 1/163 701/117 |
| 7,930,095 B2 | 4/2011 | Lee et al. | |
| 7,973,674 B2* | 7/2011 | Bell | G08G 1/161 340/435 |
| 7,979,198 B1* | 7/2011 | Kim | G08G 1/091 701/117 |
| 7,991,551 B2* | 8/2011 | Samuel | G08G 1/162 340/901 |
| 8,032,081 B2* | 10/2011 | Bai | H04L 12/1818 455/11.1 |
| 8,068,982 B2 | 11/2011 | Takada et al. | |
| 8,072,350 B2* | 12/2011 | Luke | B60W 30/02 340/903 |
| 8,131,467 B2 | 3/2012 | Yoshioka et al. | |
| 8,155,868 B1 | 4/2012 | Xing et al. | |
| 8,335,641 B2 | 12/2012 | Nakayama et al. | |
| 8,346,473 B2 | 1/2013 | Nakamura et al. | |
| 8,451,140 B2 | 5/2013 | Piccinini et al. | |
| 8,467,962 B2 | 6/2013 | Irie et al. | |
| 8,483,903 B2* | 7/2013 | Tengler | B60R 16/00 340/435 |
| 8,489,305 B2* | 7/2013 | Arai | B60W 10/06 180/170 |
| 8,620,571 B2 | 12/2013 | Konishi et al. | |
| 8,630,801 B2 | 1/2014 | Katzer et al. | |
| 8,655,575 B2* | 2/2014 | Reghunath | G08G 1/0112 701/117 |
| 8,666,653 B2 | 3/2014 | Irie et al. | |
| 8,825,372 B2 | 9/2014 | Nishibashi et al. | |
| 8,874,347 B2* | 10/2014 | Funabashi | G08G 1/161 701/36 |
| 8,914,225 B2* | 12/2014 | Caskey | G08G 1/00 701/117 |
| 8,935,046 B2 | 1/2015 | Muhlfelder et al. | |
| 8,948,995 B2* | 2/2015 | Pandita | B60W 30/17 180/168 |
| 9,014,977 B2 | 4/2015 | Beaurepaire et al. | |
| 9,026,353 B2 | 5/2015 | Tashiro et al. | |
| 9,047,774 B2* | 6/2015 | Tseng | G08G 1/096766 |
| 9,076,341 B2* | 7/2015 | Funabashi | G08G 1/22 |
| 9,146,127 B2 | 9/2015 | Bank et al. | |
| 9,189,959 B2 | 11/2015 | Bank et al. | |
| 9,269,267 B2* | 2/2016 | Goodwin | G08G 1/162 |
| 2001/0013837 A1 | 8/2001 | Yamashita et al. | |
| 2001/0021895 A1 | 9/2001 | Yamazaki et al. | |
| 2001/0049582 A1 | 12/2001 | Sakashita et al. | |
| 2002/0013659 A1 | 1/2002 | Kusama et al. | |
| 2002/0030611 A1* | 3/2002 | Nuesser | G08G 1/092 340/992 |
| 2002/0053984 A1 | 5/2002 | Yamashita et al. | |
| 2002/0198632 A1* | 12/2002 | Breed | B60N 2/2863 701/1 |
| 2003/0023369 A1 | 1/2003 | Takashima et al. | |
| 2003/0125845 A1* | 7/2003 | Carlstedt | G08G 1/161 701/1 |
| 2003/0146850 A1* | 8/2003 | Fallenstein | G07C 5/008 340/901 |
| 2004/0024522 A1* | 2/2004 | Walker | G01C 21/3492 701/414 |
| 2004/0215373 A1* | 10/2004 | Won | G08G 1/161 701/1 |
| 2005/0062643 A1* | 3/2005 | Pande | G01S 5/0027 342/357.64 |
| 2005/0096838 A1 | 5/2005 | Jung et al. | |
| 2005/0137781 A1* | 6/2005 | Hudson | G08G 1/161 701/117 |
| 2005/0149262 A1 | 7/2005 | Oikubo et al. | |
| 2006/0006988 A1 | 1/2006 | Harter et al. | |
| 2006/0038719 A1* | 2/2006 | Pande | G01S 5/0027 342/357.64 |
| 2006/0152346 A1 | 7/2006 | Maass et al. | |
| 2006/0265123 A1 | 11/2006 | Chon et al. | |
| 2007/0124072 A1 | 5/2007 | Nakayama et al. | |
| 2007/0252723 A1* | 11/2007 | Boss | G08G 1/162 340/902 |
| 2008/0065311 A1* | 3/2008 | Bauchot | G08G 1/0104 701/117 |
| 2008/0082261 A1* | 4/2008 | Tengler | B60R 16/00 701/414 |
| 2008/0249710 A1 | 10/2008 | Takada et al. | |
| 2009/0024321 A1 | 1/2009 | Bando et al. | |
| 2009/0112462 A1 | 4/2009 | Lo et al. | |
| 2009/0177388 A1 | 7/2009 | Schmidt et al. | |
| 2009/0222202 A1 | 9/2009 | Kato et al. | |
| 2009/0309757 A1* | 12/2009 | Mudalige | G08G 1/161 340/905 |
| 2009/0326752 A1 | 12/2009 | Staempfle et al. | |
| 2010/0138148 A1 | 6/2010 | Nishibashi et al. | |
| 2010/0274473 A1 | 10/2010 | Konishi et al. | |
| 2011/0015859 A1 | 1/2011 | Kim et al. | |
| 2011/0098919 A1 | 4/2011 | Irie et al. | |
| 2011/0213548 A1 | 9/2011 | Tashiro et al. | |
| 2012/0038491 A1 | 2/2012 | Publicover et al. | |
| 2012/0296539 A1* | 11/2012 | Cooprider | B60W 10/06 701/70 |
| 2013/0110394 A1 | 5/2013 | Irie et al. | |
| 2013/0194109 A1 | 8/2013 | Clark et al. | |

(56) References Cited

U.S. PATENT DOCUMENTS

| | | |
|---|---|---|
| 2014/0002652 A1 | 1/2014 | Gonzales et al. |
| 2014/0005922 A1 | 1/2014 | Bank et al. |
| 2014/0207377 A1 | 7/2014 | Gupta et al. |

FOREIGN PATENT DOCUMENTS

| | | |
|---|---|---|
| EP | 1548404 | 6/2005 |
| EP | 1636550 | 3/2006 |
| EP | 2272056 | 10/2009 |
| WO | 2004111574 | 12/2004 |
| WO | 2013113010 | 8/2013 |

* cited by examiner

TRAFFIC AWARE LANE DETERMINATION FOR HUMAN DRIVER AND AUTONOMOUS VEHICLE DRIVING SYSTEM

FIELD OF THE INVENTION

Described herein is a system and method for determining lane information for a vehicle in order to minimize travel time in a multilane road segment.

BACKGROUND OF THE INVENTION

Vehicle traffic congestion is an increasingly problematic issue for authorities and road users. Traffic congestion leads to a multitude of downstream effects including significant time wastage on the road, slower speed, increased vehicular queuing and as consequence, increases in traffic delay, financial costs and vehicle carbon emissions. One reason for traffic congestion and delays in reaching a destination is that the driver may not be aware of the correct road layout and the traffic conditions in the lanes ahead. In particular, drivers may not be aware of congestion in each lane, navigation characteristics and navigation routes of other vehicles. Without such information, it may be difficult for a driver to find an optimum lane in order to minimize travel time in a multi-lane road. In the absence of accurate lane information and traffic condition/traffic data in each lane, a driver is likely to remain in the wrong lane or a slow moving lane, which in turn contributes to traffic congestion and delays in reaching the desired destination.

Conventional lane guidance systems suffer from one or more disadvantages in providing a system that efficiently and accurately minimizes travel time for a driver. For example, in determining an optimum lane to minimize travel time, such systems may not consider parameters such as navigation data of vehicles, location, lane, vehicle types, road map data including traffic restrictions at current time, current traffic conditions, weather conditions, surrounding conditions, driver state, road conditions, driver preference, complexity of road segment, familiarity of the road and the switching cycle and switching period of traffic lights. In addition, some of the presently available systems may require manual input about traffic related events, which is cumbersome for a user. Obtaining updated traffic related data about every aspect of road system and traffic events is a significant task. In using such a system, it is difficult to find enough volunteers to constantly update traffic related data in all road segments in order to have a comprehensive up-to-date database of live traffic events. In these systems, redundant or multiple copies of data about the same traffic event may be sent to the server by multiple users, which is inefficient and consumes bandwidth and processing of the user device and the server.

Furthermore, existing systems are limited in their ability to provide comprehensive information to a user. For example, some existing lane guidance systems provide lane guidance only at intersections and may not take useful information into account when determining a lane guidance such as user preference, lane change restrictions, road rules, road and weather conditions.

In some driver guidance systems, the devices communicate directly to a central server. Communicating all the dynamic traffic-related data to and from a central server may be difficult or impossible particularly in a dense road network and heavy traffic conditions. In these systems, the same data may be sent by multiple users, which in turn may waste bandwidth, energy of the device, and consume processing power of a server in filtering out redundant or multiple copies received from multiple users in a congested area. In other existing driver guidance systems, a primary vehicle for which the navigation guidance is determined, the relevant data is received at the primary vehicle directly from sensors in other vehicles and sensors installed in the environment or the like. Transmitting the same data to every vehicle directly in a densely congested area may be inefficient and unnecessary wastage of network resources and device resources.

It will be appreciated that reference herein to "preferred" or "preferably" is intended as exemplary only.

SUMMARY OF THE INVENTION

In one aspect, a system, method, and computer program product is described for determining lane information in a multilane road segment to drive a first vehicle to minimize travel time based at least on one or more from a list including navigation data of the first vehicle, navigation data of one or more other vehicles, characteristics of navigation of the first vehicle, characteristics of navigation of the other vehicles, type of the first vehicle, type of the other vehicles, current time, map data of current road segment, traffic condition in a road segment (present, past and future), road condition, weather condition, surrounding conditions, driver state, driver preference and road safety.

A system, method, and computer program product are described for determining lane information in a road segment to drive a first vehicle to reach a destination faster. In preferred embodiments of the invention, navigation data of the first vehicle and at least one other vehicle in a road segment is sent to a computer server system directly or through their respective clique leaders via a communication network. The navigation data represents the navigation data within the current road segment of the vehicles. The other vehicle is in the same side of the road and same road segment as that of the first vehicle. The method/system may perform at least one from a list including (a) determine characteristics of navigation of at least one of the first and the other vehicles, (b) receive type of vehicle of at least one of the first and the other vehicles at the server system, and (d) receive current time at the server system. The method/system may apply an appropriate traffic regulation process to minimize any disruption to the traffic flow or any congestion caused by the determined lane information.

Based on the received and determined data, the method/system may determine appropriate lane information in at least one of coarse mode and fine mode of operation for the first vehicle to minimize travel time in the current road segment. In the coarse mode, the method/system determines lane information that is at least one of whether a change of lane is required and a lane to avoid in the current road segment for the first vehicle to minimize travel time. In the fine mode, the method/system determines lane information that is at least one of a lane to drive to minimize travel time and rank of drivable lanes in the current road segment according to increasing order of travel time, for the first vehicle. The determined lane information is sent to the appropriate user device by at least one of: directly or through its clique leader. The user device presents the lane information to at least one of a human driver and an autonomous vehicle driving system of the first vehicle as appropriate. Similarly, appropriate lane information may be determined and presented to other drivers of other vehicles in the road as appropriate.

In a preferred embodiment, the determination of mode of operation and/or the determination of lane information may further depend on one or more from a list including map data, traffic condition, road condition, weather condition, surrounding condition, driver state, driver preference, road safety, and traffic light switching cycle and switching period.

In another preferred aspect, a method for determining lane congestion information among a plurality of vehicles on a multi-lane road is described. The method includes receiving, through a user input of a user device, a driving destination; sensing, with a sensor on a first vehicle containing the user device, the presence of a user device in a second vehicle within a vehicle awareness zone relative to the first vehicle; receiving, through a wireless radio of the user device of the first vehicle, vehicle data of the second vehicle; and transmitting the vehicle data of the second vehicle to a remote server using the wireless radio of the user device in the first vehicle.

In an additional preferred aspect, a method for determining lane congestion information among a plurality of vehicles on a multi-lane road is disclosed. The method includes receiving, through a user input of a user device, a driving destination; receiving, through a wireless radio of the user device, vehicle navigation data of a second vehicle within a vehicle awareness zone relative to a first vehicle containing the user device; and determining whether a lane change is needed for the first vehicle based on the vehicle navigation data of the second vehicle.

Preferably, the methods described herein further comprise forming a clique between the first vehicle and the second vehicle based on at least one of a predetermined strength-of-signal threshold between the user device of the first vehicle and the user device of the second vehicle, a predetermined distance sensed between the user device of the first vehicle and the user device of the second vehicle, and a direction of travel of the first vehicle and the second vehicle.

Preferably, the user device of the first vehicle is designated as a clique leader configured to interact with the remote server, the designation being based on a comparison of available processing resources amongst user devices in the first and second vehicles.

In preferred embodiments, the vehicle data of the second vehicle is received using a Wi-Fi or a peer-to-peer communications protocol. Suitably, the vehicle data of the second vehicle includes navigation data. In certain preferred embodiments, the navigation data of the second vehicle is transmitted to the remote server without storage in the user device of the first vehicle. In other preferred embodiments, the navigation data of the second vehicle transmitted to the remote server is predetermined prior to commencement of a trip being undertaken by the second vehicle.

The methods described herein may further comprise receiving a lane change recommendation based on a comparison of navigation data of the first vehicle and the navigation data of the second vehicle. The lane change recommendation may be based on a density of vehicles in the lane in which the first vehicle is travelling. Alternatively, the lane change recommendation may be based on a calculated minimum time of travel to the destination.

It is contemplated that the methods described herein may further comprise filtering data received from the second vehicle prior to transmitting the vehicle data of the second vehicle to the remote server.

Suitably, the methods described herein may further comprise receiving a lane change recommendation based on the second vehicle being classified as a non-automobile vehicle. In alternative embodiments, the methods described herein may further comprise receiving a lane change recommendation based on a vehicle ahead of the first vehicle being driven in a manner causing a bottleneck in traffic ahead of the first vehicle. In further embodiments, the methods described herein further comprise receiving a lane change recommendation without providing GPS data to the remote server after sensing the presence of the user device in the second vehicle. In yet further embodiments, the methods described herein further comprise selectively transmitting a lane change recommendation amongst a plurality of vehicles, including the first and second vehicles, to minimize traffic oscillation between lanes.

Preferably, the methods described herein further comprise switching, in the user device, between a first mode in which a lane change recommendation is provided based on traffic conditions ahead of the first vehicle within the lane the first vehicle is travelling, and a second mode in which a lane change recommendation is provided based on traffic conditions ahead of the first vehicle in a plurality of lanes, the lane change recommendation in the second mode including a ranking of lanes based on a travel time estimate for each drivable lane.

In preferred embodiments, the methods described herein further comprise storing the vehicle data of at least the second vehicle to generate a traffic profile, the traffic profile being based on a time of day. Accordingly, such methods may preferably further comprise time-stamping the vehicle data of at least the second vehicle to generate the traffic profile.

In preferred embodiments, the traffic profile is a profile of a predefined segment of road. In other preferred embodiments, the traffic profile is a profile of a driver.

Preferably, the methods described herein further comprise ranking each lane of a predefined segment of road on which the first vehicle is travelling, the ranking being based on at least one of whether the first vehicle is an automobile, the presence of a travel restriction in a lane of the road being travelled by the first vehicle, and average lane speed of each lane within the predefined segment of road.

Suitably, the methods described herein may further comprise receiving, through the wireless radio of the user device of the first vehicle, an estimated time for an obstructing vehicle ahead of the first vehicle to clear a lane in which the first vehicle is travelling, and receiving a lane change recommendation if the estimated time exceeds an estimated travel time for the first vehicle to reach a location of the obstructing vehicle.

In preferred embodiments, the vehicle awareness zone is defined by at least one of a predetermined strength-of-signal threshold between the user device of the first vehicle and a user device of the second vehicle, a predetermined distance sensed between the user device of the first vehicle and the user device of the second vehicle, and a direction of travel of the first vehicle and the second vehicle.

Preferably, the methods describe herein further comprise sensing, with a sensor in the first vehicle, the presence of a user device in the second vehicle and obtaining the navigation data of the second vehicle from the user device in the second vehicle the presence sensed by the sensor meets a predetermined threshold.

In a further preferred aspect, a system for determining lane congestion information among a plurality of vehicles on a multi-lane road is described. The system includes a first database including navigation data pertaining to a geographical area; a processor configured to receive navigation data from a user device in a first vehicle; and a non-transitory computer readable medium encoded with a computer program coupled to the processor. The computer program is configured to compare the navigation data of the first vehicle with the navigation data stored in the first database; receive navigation data of a second vehicle within a vehicle awareness zone relative to the first vehicle, the navigation data of the second vehicle being received from the user device in the first vehicle; compare the navigation data of the first vehicle with the navigation data of the second vehicle; and provide an instruction to the user device in the first vehicle to change lanes based on the comparison of the navigation data of the first vehicle with the navigation data of the second vehicle.

Preferably, the computer program encoded on said non-transitory computer readable medium includes instructions that when executed by said processor cause said processor to generate a plurality of lane change recommendations deliverable to a respective number of vehicles to reduce traffic oscillation between lanes.

In yet another preferred aspect, a computer program product embodied in a computer readable storage medium for providing a lane change recommendation to a user in a first vehicle is disclosed. The computer program product includes programming instructions causing a coupled processor to: receive a driving destination; sense a presence of a user device in a second vehicle within a vehicle awareness zone relative to the first vehicle; receive navigation data of the second vehicle; and transmit the navigation data of the second vehicle to a remote server using a coupled wireless radio.

In preferred embodiments, the computer program product embodied in a computer readable storage medium further comprises programming instructions causing the coupled computer to receive a lane change recommendation from the remote server and transmit the lane change recommendation to the second vehicle.

In alternative preferred embodiments, the computer program product embodied in a computer readable storage medium further comprises programming instructions causing the coupled computer to receive a plurality of lane change recommendations from the remote server and multicast the lane change recommendations to a plurality of vehicles within the vehicle awareness zone. In preferred embodiments, the vehicle awareness zone is defined by at least one of a predetermined strength-of-signal threshold between the user device of the first vehicle and a user device of the second vehicle, a predetermined distance sensed between the user device of the first vehicle and the user device of the second vehicle, and a direction of travel of the first vehicle and the second vehicle.

The articles "a" and "an" are used herein to refer to one or to more than one (i.e., to at least one) of the grammatical object of the article. By way of example, "an element" means one element or more than one element. As used herein, the use of the singular includes the plural (and vice versa) unless specifically stated otherwise.

Throughout this specification, unless the context requires otherwise, the words "comprise," "comprises" and "comprising" will be understood to imply the inclusion of a stated step or element or group of steps or elements but not the exclusion of any other step or element or group of steps or elements. Thus, use of the term "comprising" and the like indicates that the listed elements are required or mandatory, but that other elements are optional and may or may not be present.

LIST OF ABBREVIATIONS

Figure 1:
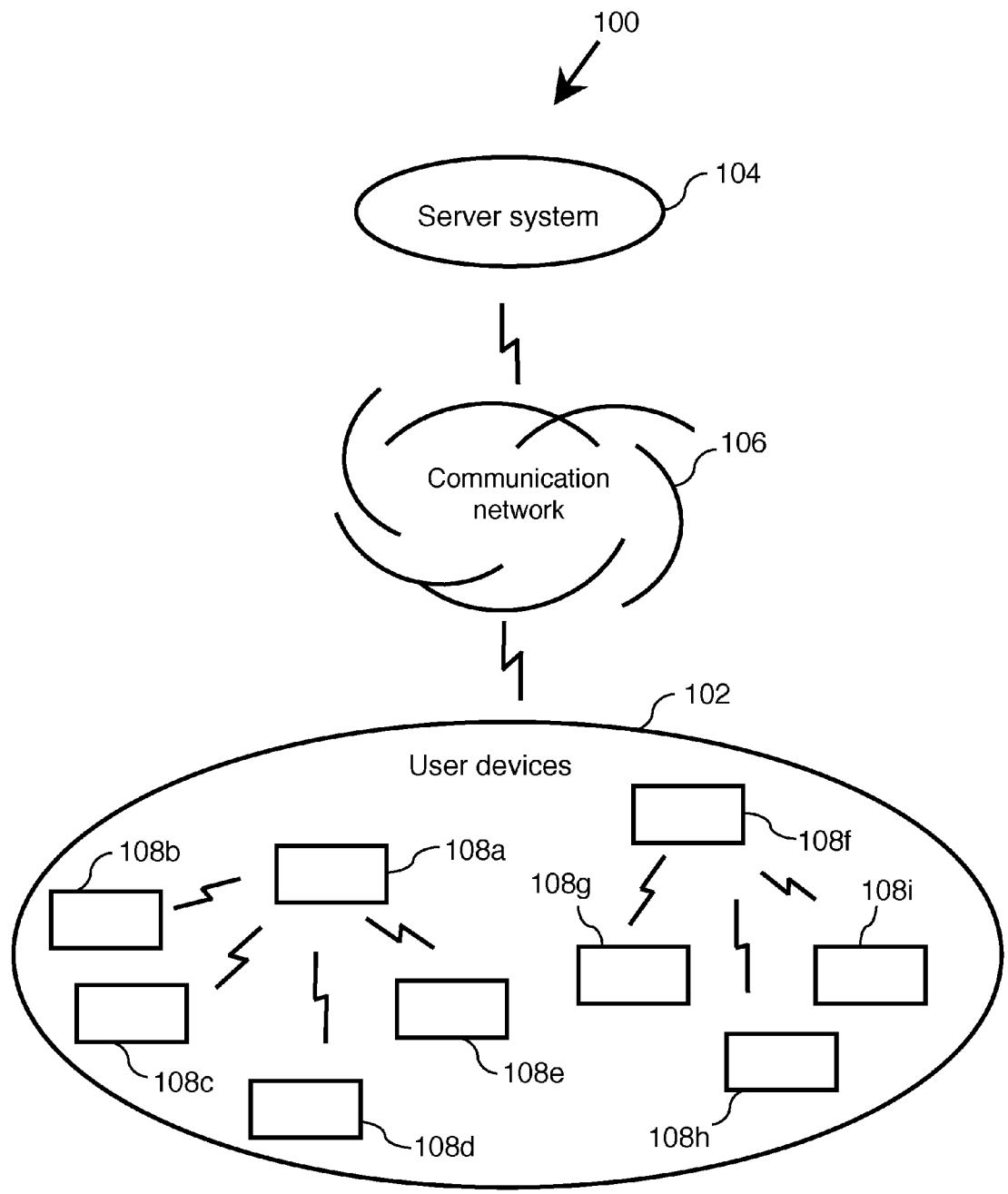
FIG. 1 is a block diagram of a lane determination system to minimize travel time that may be implemented according to an embodiment of the invention.

3G—third generation of mobile telecommunications technology
4G—fourth generation of mobile telecommunications technology
AGPS—assisted global positioning system
ALU—arithmetic logic unit
DGPS—differential global positioning system
DVD-RAM—digital versatile disc-random access memory
FPU—floating-point unit
GLONASS—global navigation satellite system
GPRS—general packet radio service
GPS—global positioning system
ID—identification
IP—internet protocol
IR—infrared
ITS—intelligent transportation systems
km—kilometer
kmph or Kmph—kilometer per hour
LAN—local area network
LIDAR—light detection and ranging
LTE—long term evolution
MAN—metropolitan area network
RAM—random access memory
ROM—read only memory
RTK—real time kinematics
RTP—real time transport protocol
SD—secure digital
SLAM—simultaneous localization and mapping
SMS—short message service
TCP—transmission control protocol
UDP—user datagram protocol
UV—ultraviolet
VANET—vehicular ad hoc network
VCS—vehicular communication system
WAAS—wide area augmentation system
WAN—wide area network
WCDMA—wideband code division multiple access
Wi-Fi—wireless fidelity (wireless local area network/IEEE 802.11 standards)
WiMAX—worldwide interoperability for microwave access

DEFINITION OF TERMS

Unless defined otherwise, all technical and scientific terms used herein have the same meaning as commonly understood by those of ordinary skill in the art to which the invention belongs. Although any methods and materials similar or equivalent to those described herein can be used in the practice or testing of the present invention, preferred methods and materials are described. For the purposes of the invention, the following terms are defined below.

Additional data: includes the data that may be useful in determining lane information for a vehicle to minimize travel time (other than the navigation data, characteristics of navigation, type of vehicle, and current time). The additional data may include (and is without limitation thereto) user preference, road safety, driver state, traffic condition (current, past, and future traffic condition), traffic light switching cycle and switching period, difficulty of changing lane, road condition, weather condition, and surrounding conditions. In preferred embodiments, additional data may also include one or more of the following: type of vehicle, current time, road map data, and combinations thereof.

Application program (computer program): a set of instructions when executed produces an intended outcome, wherein the instructions may be implemented in one or more computer readable medium (e.g., a non-transitory computer-readable medium) including, but not limited to, software, hardware (for example, hard disk, RAM, ROM, CD-ROM, USB memory stick, or other physical device), firmware, and programmable hardware. The program may be stored in one or more memories or storage devices or even sent to a device via an appropriate transmission medium.

Characteristics of navigation: indicates whether a vehicle is moving or stopped moving. Further it represents the type of movement of a moving vehicle and type of stop for a stopped vehicle. For a moving vehicle, it may indicate the characteristics of movement including maneuvering to park, changing lane, how often a vehicle stops, average speed over a predetermined time or distance, speed variation over a predetermined time, driving behavior, driving maneuver of a vehicle, time to perform a driving maneuver, time to reach a point in a road segment, and other information characterizing the movement of a vehicle on a road. For a stopped vehicle, it may indicate the type of stop including, but not limited to, stopped temporarily, parked, stopped for making a turn, stopped for loading or unloading, stopped at traffic congestion, stopped at a red traffic signal, stopped at a pedestrian crossing, stopped for passengers to get on or get off, broken down vehicle, and stopped for other reasons.

Clique: a clique is a group of vehicles or road users, or both, with an appropriate device (appropriately configured) within a predetermined distance from each other in one or more road segments. A member of a clique may be one or more from a list including: a driver of a vehicle with an appropriate device, passenger in a vehicle with an appropriate device, other road users with appropriate devices, and combinations thereof. In preferred embodiments, a member of a clique may include any vehicle with one or more devices appropriately configured including an autonomous vehicle (fully autonomous or partly autonomous), a robot, a bicycle, and a remote operated vehicle. In preferred embodiments, the members of a clique may be in the same side of road. In other preferred embodiments, the members of a clique may be on opposite sides of road or on different roads.

Driver (vehicle driver): a driver includes an operator of a vehicle. A driver of a vehicle may include, but is not limited to, a human, an autonomous driving system, any computer-based vehicle driving system or combinations thereof. An autonomous a driving system includes driving system of a driverless vehicle, a robot system, and a computer system installed in a vehicle or operating remotely. In certain preferred embodiments, a driver may also include a bicycle rider, a motor cycle rider or a driver of a surface vehicle.

Lane determination system (system): includes a configured user device to send appropriate data including navigation data to a server system and receive navigation data, a communication network to provide the necessary data communication, and a server system with appropriate hardware and software to communicate to the user device and to process the navigation data of plurality of vehicles to determine an appropriate lane information for vehicles to minimize travel time in a road segment.

Leader: a leader of a clique may be one or more members in a clique designated to perform one or more operations from a list including collect appropriate data from members of its clique, appropriately process the data, remove any redundant data, remove any data that a server already received, send appropriate data to a server including navigation data, keep record of member devices, monitor member devices, receive lane information from a server and send it to one or more appropriate member devices, broadcast or multicast appropriate data to plurality of members as appropriate, store appropriate data including navigation data and lane information, and communicate with leaders of neighboring cliques to manage members for efficiency (non-limiting examples: change clique membership of one or more devices from one clique to another clique, and merge cliques), and combinations thereof. In preferred embodiments, the leader itself may determine and/or provide lane information to its members in situations including there is an emergency service vehicle (police, ambulance and fire brigade) requesting a lane, when server is busy or down, any time critical situations or any other appropriate situations. In other preferred embodiments, a leader may determine some of the navigation data of some or all the member devices including, for example, relative location (vector distance from the leader to a member device), speed, acceleration, side of road, traffic congestion, current road segment, whether a member device/vehicle is ahead or behind another member deceive/vehicle on a road, although without limitation thereto.

Navigation data: any appropriate data about a vehicle that may be useful in determining lane information to minimize travel time in a road segment. Example navigation data of a vehicle includes, but is not limited to, current road segment of the vehicle, current lane, location, speed, acceleration, location of turning, direction of movement at an intersection, location of stopping, location of parking, distance between two vehicles, location of a vehicle with respect to another vehicle, and navigation route in current road segment. In preferred embodiments, the navigation data may also include past history of navigation data collected at appropriate time interval and stored in an appropriate computer readable storage medium. In some exemplary embodiments, the navigation data may also include appropriate navigation data in the future such as direction of movement at the next intersection, location of the next turn, type of the next turn (example: left turn, right turn, and U-turn), lane from which the vehicle will turn, and appropriate future driving maneuvers obtained from sources including appropriate navigation device based on the route to destination, appropriate navigation application software running on an appropriate device, and past history of navigation data of the vehicle in the current route.

Road map data (map data): includes the information available on an updated and accurate digital road map including traffic restrictions at a current time. The map data may include road layout, road rules related data, turn restrictions, number of lanes, lane markings, lane width, lane change restrictions, traffic related restrictions in a road, time dependent traffic restrictions, temporary traffic restrictions, information on signs posted on a road side, information on road markings, speed limit, presence of traffic light, pedestrian crossing, traffic zones (example: school zone, pedestrian high activity zone, and shared zone), and other traffic related information that may be useful in determining lane information to minimize travel time of a vehicle.

Road segment: includes one or more portions of any type of road such as a local road or a highway and/or a freeway. A road segment may include portions of one or more roads between predetermined points. In exemplary embodiments, a road segment may include one or more intersections and portions of one or more roads meet at an intersection. Example road segments include a portion of a road between two intersections, between an intersection and a fixed point at a predetermined distance from the intersection or between two points on a road at a predetermined distance. The points and distances in defining a road segment may depend on one or more from a list including type of road, location, time, traffic condition, and other conditions. A "predetermined" or "predefined" road segment is, for example, one where a landmark or fixed point is known ahead of time before a trip is undertaken. Examples include, but are not limited to, intersections, curves, bridges, ramps, natural objects (e.g., mountains, rivers), or equally-spaced points (e.g., distance markers).

Road user: includes a person who uses the road system to travel by any appropriate means of transport to travel (non-limiting example: driver of a vehicle, passengers in a vehicle, bicycle riders and pedestrians) to a destination. A road user may possess a device that is configured at least to send navigation-related data of a vehicle to the server system and receive lane information to minimize travel time as appropriate. In some exemplary embodiments, a user declared as the driver or operator of a vehicle may receive the determined lane information from a server system.

Server (server system/computer server system): includes a computer system with appropriate hardware and software installed, and appropriately configured to process data including navigation data and responses for requests received from other systems (computing devices or software systems). In exemplary embodiments, a client-server model may be implemented with user devices being the clients and the server system performs the functions of a server.

Stopped moving vehicle: a vehicle that has stopped for some reason or parked at a location on a road. A stopped vehicle may include a vehicle waiting to make a turn, stopped for loading or unloading, waiting for a green traffic signal, a bus stopped at bus stop, waiting for pedestrians to cross, waiting at traffic congestion, and a broken down vehicle.

User (application user): includes a person who has a device (user device) on which an application program is installed and correctly configured to communicate to a server system to send the necessary navigation data and to receive determined lane information from a server system to minimize travel time in a road segment. A user may also include driver, passenger, and pedestrians.

User device (device): A user device includes a computing device that is appropriately configured with required hardware and software to provide required features for a user to send navigation data manually or automatically to a server system and receive appropriate lane information from the server system. A user device may include, but is not limited to, mobile computing device, smart phone, tablet, laptop, portable devices, navigation device, and built-in computer in a vehicle (including computer driving system of an autonomous vehicle).

Vehicle (motor vehicle): includes a vehicle with propulsion provided by at least one of an engine (non-limiting example: internal combustion engine) and motor (non-limiting example: electric motor). Example vehicles include, but not limited to, cars, buses, lorries, motorcycles, electric vehicles, and off-road vehicles. In preferred embodiments bicycles may also be included. In alternative preferred embodiments, a vehicle may include any surface vehicles. A "vehicle type" is, for example, an automobile of any make or variety (e.g., station wagon, SUV, etc.), or a non-automobile (e.g., garbage truck, bus, bicycle, or other slow-moving vehicles).

Each embodiment described herein is to be applied mutatis mutandis to each and every embodiment unless specifically stated otherwise.

DETAILED DESCRIPTION

Described herein is a system, method, and computer program for determining lane information in at least one of coarse mode and fine mode to a first vehicle to minimize travel time in a multilane road segment. Throughout the document, several exemplary embodiments are described based on either a method or a system however, one skilled in the art would be able to implement the invention in at least one of method, system, and computer program product.

In a preferred embodiment of the invention, the method receives navigation data of a first vehicle and at least one other vehicle that is on the same side of road and same road segment as that of the first vehicle. The method performs at least one operation from a list including (a) determine characteristics of navigation of at least one of the first and the other vehicles, (b) receive type of vehicle of at least one of the first and the other vehicles at the server system, and (c) receive current time. In a further step, the method determines at least one of coarse mode and fine mode to determine lane information for the first vehicle to minimize travel time. In the coarse mode, the method determines at least one of whether a change of lane is required and a lane to avoid in a multilane road segment to minimize travel time for the first vehicle. In a preferred embodiment, in the fine mode, the method further receives map data of a current road segment that includes the traffic restrictions at a current time. In the fine mode, the method determines at least one of an optimum driving lane in the current road segment to minimize travel time and a rank (or score) of drivable lanes in a multilane road segment according to increasing order of travel time for the first vehicle.

In preferred embodiments of the invention, the road system network is divided into appropriate segments. Referring to FIG. 1, a plurality of user devices 102 (devices in a first vehicle and other vehicles) form one or more cliques with at least one leader appointed for each clique. Formation of a clique is based on a presence of one or more vehicles within a vehicle awareness zone relative to a first vehicle. The vehicle awareness zone may be defined by, for example only, one or more of a list including the direction of movement of the vehicles, distance between vehicles, number of vehicles, and wireless communication signal strength. In a preferred embodiment, a device may become a member of a clique if the distance to a clique leader is below a predetermined threshold, the direction of movement is the same as that of a clique leader, the number of members in a clique is below a predetermined value, and the received signal strength is above a predetermined threshold. Members of a clique communicate to the server system by way of a clique leader.

The first user and other users in one or more cliques may send navigation data and other appropriate data (including vehicle type) to the server system 104 via their clique leaders. In a preferred embodiment, the clique leader may appropriately process the received data from its clique members to remove any redundant data or any data that the server system has already received (to minimize the amount of data transmission, preserve bandwidth, avoid processing of multiple copies of the same data and increase the efficiency of the entire system), store appropriate data including member details, and other appropriate processing of the navigation data.

In preferred embodiments, the leader may send the data of its members to the server system 104 via a communication network 106. The server system 104 may also receive navigation data, vehicle type, and other appropriate data from members in other cliques. The system may also receive one or more additional data including road map data and current time. Preferably, the navigation data may include, but is not limited to, navigation route in current road segment, current lane, current location in the road segment, and stopped location. It is contemplated that the server may perform one or more of the following: (i) check that the other vehicle is in the same road segment as that of the first vehicle, and (ii) check the other vehicle is on the same side of the road as that of the first vehicle. The server may determine characteristics of navigation of the first and/or the other vehicles, receive type of vehicle of the first and/or the other vehicles, and current time. Current time may be received from a clock in the user device, a clock in the server, from the Internet or from any other appropriate source as would be known by a skilled addressee.

The navigation characteristics indicate the characteristics of a moving vehicle and types of stop for a stopped moving vehicle. In particular, for a stopped moving vehicle this indicates the type of stop including but is not limited to, stopped temporarily, parked, stopped for making a turn, stopped for loading or unloading, stopped for traffic congestion, stopped at a red traffic signal, stopped at a pedestrian crossing, stopped for passengers to enter and exit a vehicle, and a stop for other reasons. For a moving vehicle, it indicates the characteristics of movement including maneuvering to park, changing lane, how often a vehicle stops, average speed over a predetermined time or distance, speed variation over a predetermined time, time to perform a driving maneuver, time to reach at a point in a road segment, and other information characterizing the movement of a vehicle on a road. By way of example only, a changing lane may be determined by monitoring the direction of heading or turning of the steering or orientation of the vehicle relative the lane markings. In particular, if the head direction of the vehicle was stable for a predetermined time and then changes more than a predetermined angle and subsequently becomes stable for a predetermined time. If the stable head directions are parallel to the lane markings, the maneuver may be declared as a change of lane. In another non-limiting example, some of the navigation characteristics may be identified based on the past history of the first vehicle or of other vehicles. In a further non-limiting example, a parking maneuver may be identified based on the movement of the vehicle, parking restrictions at the location, and movement of the vehicle depending on the type of parking allowed (i.e., right angle parking, parking at an angle, and reverse parallel parking). Further, parking may be identified based on one or more of the following: turning off of the engine, driver exits the vehicle, driver locks the vehicle, location of the device is out of the drivable area, detection of a walking movement of the device if it is a mobile device, device turned off or in sleep mode if it is a built-in device in the vehicle. A stopped moving vehicle may be identified based upon the speed of the device. A vehicle stopped at red traffic signal may be identified based on the current switching cycle of the traffic light. A vehicle stopped for traffic congestion may be identified based on the navigation data of other vehicles in the lane and in the road segment. A bus stopped at the bus stop may be determined based on the type of the vehicle, lane, and the current location. A vehicle stopped for loading or unloading may be determined based on the past history, loading zone marked on the road map or road side, other sensors in the vehicle or environment, or by some other means as will be known to a person of skill in the art. A vehicle waiting to make a turn may be identified based on the indication light, navigation route determined by a navigation device or navigation application program, user input, past history of locations where the vehicle turned, traffic restrictions of the current lane (such as a dedicated turning lane or by some other means).

The type of vehicle includes private car, taxi, bus, public transport vehicle, bicycle, motorcycle, tram and other appropriate vehicle types. In an embodiment, the server system may appropriately process the navigation data received at appropriate time interval to determine characteristics of navigation of a first and/or other vehicles. For example, average speed of a vehicle may be calculated by appropriately processing the speed received over a predetermined time. In another embodiment, the server system may appropriately process the received navigation data in conjunction with other data including but not limited to, road map data, vehicle type and historical data, to determine characteristics of navigation of a first and/or other vehicles. By way of example only, lane change of a vehicle may be identified by comparing the direction of heading over a predetermined time period relative to the lane marking on the road. In another non-limiting example, a stopped vehicle may be identified by monitoring the speed of the vehicle and the location to check whether stopping is permitted based on the map data.

The system then determines a mode of operation (coarse mode or fine mode) to identify lane information for the first vehicle in order to minimize travel time based on one or more characteristics selected from the group consisting of a user preference (preference of the driver of the first vehicle), familiarity of current road segment to the driver of the first vehicle (whether the driver has driven before in the current road segment), complexity of the current road segment (presence of one or more complex junctions or complex roundabout), available navigation data, and details in road map data, and combinations thereof. In preferred embodiments, determination of mode of operation may also depend on one or more from a list including navigation data of first and/or other vehicles, characteristics of navigation of first and/or other vehicles, type of first and/or other vehicles, road map data of current road segment, and appropriate additional data, and combinations thereof. By way of example only, if there is not enough data available to provide lane information in fine mode, the system may determine lane information in coarse mode as appropriate.

In the coarse mode, the system determines at least one of whether a lane change is required and a lane to avoid driving in within the current road segment to minimize travel time for the first vehicle. In the fine mode of operation, the system determines at least one of an optimum lane to drive for the first vehicle to minimize travel time and rank order of drivable lanes for the first vehicle according to increasing order of travel time. Lane information includes one or more from a list including (a) whether a lane change is required, (b) a lane to avoid driving in, (c) optimum lane to drive, and (d) rank of drivable lanes, and combinations thereof. In a preferred embodiment, the lane information may also include other data such as drivable lanes for a vehicle in a road segment. In another preferred embodiment, the method may require the type of vehicle, navigation data, and road map data to determine drivable lanes for a vehicle in a road segment. In this case, the road map data may include traffic restrictions in each lane at a current time and turn restrictions in the road segment. The navigation data may include navigation route in the road segment or locations of turn and direction of travel at intersections. By way of example only, a bus lane in a road segment may not be a drivable lane for a private car. In another non-limiting example, if there are dedicated lanes for a left turn and dedicated lanes for moving straight at an intersection wherein if a vehicle is turning left at the intersection, the drivable lanes for this vehicle are the lanes dedicated for left turn and not the lanes dedicated for moving straight.

Determination of lane information to minimize travel time for a vehicle in at least one of coarse mode and fine mode depends on one or more parameters from a list including navigation data of first and/or other vehicles, characteristics of navigation of first and/or other vehicles, type of first and/or other vehicles, current time, map data of current road segment, and appropriate additional data, and combinations thereof.

In preferred embodiments, the server system 104 may also be in communication with other systems to receive data such as weather data, traffic related data, and other relevant data for determination of the lane information. In addition, the server may also have a storage system such as a database or some other means to store the updated digitized road map data, navigation data of vehicles and other related data as appropriate.

The determined lane information is appropriately formatted and sent to the appropriate user device via a clique leader. In certain embodiments, the user device may directly communicate to the server system without the leader or without forming any cliques. The user device presents the lane information appropriately to at least one of a human driver and an autonomous driving system. The lane information may be presented to a human driver in one or more of the form including visual, audio, haptic, multimedia, and other appropriate form. For an autonomous driving system, the lane information may be appropriately formatted and sent to the processor of the driving system, stored in an appropriate memory register, stored in other appropriate computer readable medium, input via an appropriate interface or any other appropriate method of input. In some preferred embodiments, the leader may directly send the lane information to an appropriate interface or to the processor of the driving computer of an autonomous vehicle. In other preferred embodiments, the lane information may be sent to the user device and the user device may send this information to an appropriate interface or to the processor of the driving computer of an autonomous vehicle.

In a preferred embodiment, the lane information may be processed in conjunction with other appropriate data to drive the autonomous vehicle. In an example, if the rank order of drivable lanes in a multilane road segment is presented by a lane determination system, the autonomous driving system may further consider other conditions such as vehicle conditions, external conditions and other appropriate conditions to determine which lane to go, to minimize travel time. In one example, depending on the conditions, the autonomous driving system may choose the best lane from the rank order of lanes presented by the lane recommendation system to minimize travel time. In another example, depending on the conditions, the autonomous driving system may choose the second best lane from the rank order of lanes as appropriate.

The advantages of clique-based communication over a vehicular ad-hoc network include simple routing of data through a leader, no routing data (such as routing table, forwarding table, or neighbor table) is stored in each members, member devices do not store navigation data of others, less memory requirement for members, less complexity of the user devices, less complexity of the server system as it supports fewer parallel connections compared to each device communicating directly to the server system and some of the processing of data is performed by a leader (example: removing redundancy), better utilization of bandwidth and network resources by elimination of redundant data, no need to update routing data between devices (no routing overhead), no dynamic routing to neighboring devices is stored, and devices are better managed by a leader for efficiency of the overall system. Further, in a clique-based system, determination of some of the lane information may be performed by the clique leader, this is efficient in terms of network utilization, server processing, and overall efficiency of the system. In certain preferred embodiments, the leader may determine some of the data including some of the navigation data of the clique members. In other preferred embodiments, the leaders may communicate each other to better manage their members (example: change membership based on received signal strength, and merge cliques).

Alternatively, a vehicular ad hoc network is a decentralized type of wireless network in which each user device participates in routing the data by forwarding it to one or more neighboring device. Ad hoc networks primarily use flooding or similar protocols for forwarding data. The same data may reach the destination via multiple routes. VANET requires one or more hops to send data to a destination, requires higher routing protocol overhead, each device needs to store data related to neighbor devices or routing related information. In a dynamic network, each device needs to continuously update its neighbouring devices, continuously send and receive routing related data in addition to the navigation data, store routing related data and store data of neighbouring devices to participate in routing. This results in increased complexity of each device as it participates in routing and storing data of other devices, redundant data may be sent to the server and the server is required to handle many parallel connections simultaneously.

In advantageous embodiments of the invention, a clique-based communication is utilized for devices to communicate efficiently. The advantages or differences of the invention include (a) a clique leader may cache the appropriate data to filter any redundant data, (b) processing of the server is shared depending on the work load of the server, (c) prioritize data based on the type of data and available resources, (c) performs unicast, multicast or broadcast data to its clique members appropriately, (d) control of the data transmission to the server, (e) management of members in a clique, (f) a record of member data in a clique is retained, (g) and efficient data communication, but are not limited thereto.

If the members directly communicate to the server, in a dense road network during heavy traffic time periods it may be difficult or impossible for the server to allocate simultaneous parallel communication links to each and every user device. Without clique based architecture, in a congested road network if there is heavy traffic it is difficult or impossible for the server to simultaneously provide many parallel connections to provide real time navigation guidance in a dynamic environment.

In preferred embodiments of the invention, the communication links between the leader and members in a clique may be Wi-Fi or BLUETOOTH or any other appropriate wireless communication link depending on the distance between devices as will be known in the art. This may be more efficient and cost effective compared to users directly communicating to the server. If users directly communicate to a server or to other devices, the same data may be sent and/or received multiple times, which is inefficient (wasting of bandwidth, network resources, and resources in the server). However, in a clique based communication system the leader may filter redundant data. The clique leader may temporarily store a copy of appropriate data that the server maintains about the clique for efficient data transmission, preservation of bandwidth, and cost savings. In the invention described herein, the leader performing appropriate processing on the member data also supports the server in providing real time service. It will be appreciated that the leader may determine lane information in appropriate mode and send it to the intended member or members. For example, if the leader receives a message from an emergency vehicle to indicate current location, lane and direction of movement in the current road segment, the leader may broadcast or multicast the information appropriately to inform the members about the emergency vehicle so that, the members may change lane to allow the emergency vehicle to move quickly.

It is also contemplated that in certain embodiments, the clique leader may also determine relative location of members, monitor member devices, and provide quick response to emergency situations such as notifying the members about an emergency vehicle without contacting the server. In other embodiments, if the server is busy or not responsive or any other reasons, the leader may provide appropriate lane information to its clique members as appropriate. If a device does not have connectivity (cellular network or Internet) or not enough resources to directly communicate to the server, the device may communicate to its leader directly via Wi-Fi or a peer-to-peer connection such as BLUETOOTH or Wi-Fi Direct, or any other appropriate communication technology and the leader may send the data to the server via an appropriate communication network.

In addition, compared to other existing driver assistance methods or systems, preferably the present invention does not require the determination of a route to the destination or the map data of the entire road network. In preferred embodiments of the present invention, the method requires map data of current road segment and navigation data within the current road segment. Additionally, in other preferred embodiments of the present invention, the other vehicles that are on the same side of a road and same road segment as that of the first vehicle are considered. In yet other preferred embodiments, the method may also provide drivable lanes for the first vehicle.

In certain preferred embodiments of the invention, the server may inform the driver of a first vehicle of at least one from a list including (a) whether a lane change is required, (b) a lane to avoid driving to minimize travel time, (b) an optimum lane to minimize travel time or (c) rank order of the drivable lanes in a multilane road segment according to increasing order of travel time. The server may also provide an indication of difficulty of changing lane based on the traffic in other lanes, estimated time that can be saved by moving to a lane, number of vehicles that can be overtaken by moving to a lane, how many lane changes are required to go to the determined lane, and safety of changing lane. Travel time for a first vehicle may be estimated (a) based on the past history of travel time of vehicles for a similar traffic conditions in the road segment, (b) based on the average speed of vehicles in each lane and length of road segment, and (c) probability of missing a green light at the next traffic light signal based on the current switching cycle and switching period, distance to the next traffic light, and average speed. The number of vehicles that could be overtaken may be estimated by counting the number of vehicles (that are in the same lane and ahead of the first vehicle before changing any lane) that the first vehicle would be able to overtake when reaching the end of the current road segment if it changed lane. The number of lane changes required to go to a lane may be determined by counting the lanes between the current lane of the first vehicle and the determined lane in a multi-lane road segment. Current switching cycle and switching period of a traffic light signal indicates in what order the traffic light switches at current time and time duration of green light in each switching in a complete switching cycle.

In a preferred embodiment, in the coarse mode if there is an obstructing vehicle in the same lane and ahead of the first vehicle in the road segment, the system may inform the driver of the first vehicle whether (at least) a change of lane is required to minimize travel time. In this case, the method requires at least the current lane of the first vehicle, current lane of the obstructing vehicle, and location of the obstructing vehicle relative to the first vehicle. The minimum data required to determine lane information depends on the navigation characteristics of the first and/or other vehicles, updated road map data at current time, and appropriate other data. A road condition may include road surface condition, icy road, uneven surface, geometry of road, slope of road, slippery road, wet road, snow, and visibility conditions. Surrounding conditions may include any hazard conditions in the surrounding, children playing on the road side, animals crossing or on the road side, and any other unsafe conditions in the surrounding. In an example, a road condition and a surrounding condition may be obtained from a camera device fitted in the vehicle or in the environment.

In other preferred embodiments, in the coarse mode, if there is an obstructing vehicle ahead of first vehicle the system may inform the driver of the first vehicle at least a lane to avoid driving in a road segment to minimize travel time. In this case the method may require at least the current road segment of the first vehicle, current lane of the obstructing vehicle, and location of the obstructing vehicle relative to the first vehicle.

Accordingly, in some preferred embodiments that relate to the fine mode, if there is an obstructing vehicle ahead of first vehicle the system may inform the driver of the first vehicle at least one lane to drive in a road segment to minimize travel time. In this case the method requires at least the current road segment of the first vehicle, current lane of the obstructing vehicle, location of the obstructing vehicle relative to the first vehicle and road map data. The method may also use traffic information, drivable lanes in the current road segment, user preference, weather condition, surrounding conditions, traffic condition, road safety, difficulty of changing lane, navigation characteristics of the first and navigation characteristics of other vehicles.

In other preferred embodiments that relate to the fine mode, the server may inform the driver of the first vehicle of at least the rank of drivable lanes in a multilane road segment according to increasing order of travel time if there is an obstructing vehicle ahead of first vehicle. The top ranked lane is the shortest travel time lane, the second top ranked lane is the second shortest travel time lane and so on for all the drivable lanes in the road segment. In this case the method requires at least the current lane of the first vehicle, the current lane of the obstructing vehicle, location of the obstructing vehicle relative to the first vehicle, traffic information in each drivable lane and road map data. In exemplary embodiments, the system may use one or more other data for ranking the drivable lanes in the current road segment.

According to preferred embodiments of the invention, if turning is not possible in a road segment, the lane information for the first vehicle to minimize travel time in the road segment may be determined based on the speed of a first vehicle and at least one other vehicle in another lane on the same side of the road segment. For example, in a straight, multi-lane road segment, the system may determine a lane that runs faster than the speed of the first vehicle or it may rank order the lanes according decreasing order of average speed or increasing order of travel time. In this case, the system may need the speed of the first vehicle, speed, location, and lane of at least one other vehicle. If the other vehicle is in a different lane and moving faster than the first vehicle, the system may determine appropriate lane information in order to move to the faster moving lane as appropriate. In some embodiments, the server may also compare the speed of the vehicle in the other lane with the speed limit of the road segment or the maximum speed set by the driver of the first vehicle, to determine whether a lane change is required. If the speed of the other vehicle is above the posted speed limit or maximum speed set by the driver for the type of road, the system may determine that no lane change is required for the first vehicle. In another example, the system may also consider only the drivable lanes determined based on the type of first vehicle and traffic restrictions at current time in the road segment to determine a lane information for the first vehicle in one of coarse and fine mode. The system may also consider lane change restrictions, difficulty of changing lane, user preference, weather condition, surrounding conditions and driver state. The lane change restrictions may be obtained from an updated road map according to current time or by some other means such as using a sensing device (non-limiting examples: a video camera, a device for capturing waves in the wavelength range of UV, IR, visible or any other appropriate range of wavelengths) to detect the lane marking(s) on the road.

In another non-limiting example, the system may use the data about the type of the other vehicle that is in the same lane and ahead of the first vehicle i.e., if the other vehicle stops frequently (for example, a bus or garbage collecting truck) or a vehicle that moves slowly (for example, a bicycle or speed of a vehicle learnt from the current speed or navigation data history or by some other means), the system may determine an appropriate lane information in one of coarse mode and fine mode for the first vehicle to minimize travel time.

By way of example only, if there are only two lanes in one direction in a road segment, a vehicle is parked in lane in that road segment, then the server may require at least the current lane of the first vehicle, lane and relative location of the parked vehicle to determine an appropriate lane for the first vehicle. In one preferred embodiment, if appropriate map data is available, the system may identify the lane in which the vehicle is parked from the parking restrictions. Preferably, the system requires the current road segment of the first vehicle and whether a vehicle is parked in that road segment to determine lane information as in most roads vehicles are parked in a lane close a curb. Therefore, the first vehicle may be appropriately informed when entering the road segment based on the type of obstruction (parked vehicle, bus stopped at bus stop, vehicle waiting to turn). For example, if a vehicle is waiting to turn right, in most cases, the vehicle may be waiting on the right most lane (depending on the type of road-local road or motor way and whether the road system is left or right hand driving).

Parking restrictions and other traffic restrictions may also be found in an appropriate road map data. These restrictions may be updated in the map database using the information on the sign boards on the road side (either by using an appropriate camera system or manual update). In this case, the system does not require the current lane of the parked vehicle as part of navigation information. In other embodiments, the server may also require the distance between the first and the parked vehicle to inform the driver at appropriate distance based on the user preference. A user may update the preference in the lane determination program such that any lane information can be obtained at a certain distance from the obstruction depending on the type of obstruction (non-limiting examples: parked vehicle, stopped vehicle, vehicle waiting to turn, vehicle waiting for a green traffic light signal, broken down vehicle). In yet other embodiments, the server may also check the lane change restrictions to inform the driver as appropriate. In yet further embodiments, the server may additionally use the traffic information, speed in the neighboring lane, difficulty of changing lane, and safety to inform the driver about lane information to minimize travel time at appropriate distance from the parked car. Therefore, the navigation data required to determine a lane to minimize travel time may vary depending on the conditions such as navigation characteristics of the first and other vehicles, road map data, and one or more additional data.

In a preferred embodiment, a vehicle in a lane that ends or a vehicle in a lane that is closed ahead changes lane to the same lane as that of the first vehicle and ahead, the method may determine lane information in at least one of coarse mode and fine mode to minimize travel time. The navigation data required to determine lane information in different modes may vary depending on the conditions. However, the minimum navigation data for the first vehicle is at least the current road segment, and for the other vehicle is the current lane and location relative to the first vehicle. The relative location of a device with respect to another device may be obtained by means of one of the following methods including (a) absolute location of the two devices, (b) using range or distance measurements from two known locations (or user devices with known locations) and performing map matching, and (c) using array antenna or steerable antenna and map matching to detect relative location. In preferred embodiments, the leader of a clique may estimate the relative location of the member devices based at least on the received signal strength, time of arrival, return time of arrival or time difference of arrival of radio wave (non-limiting examples: BLUETOOTH or Wi-Fi signal). Further, a leader of a clique may also employ array antenna or steerable antenna and map matching to determine the relative location of member devices.

In those embodiments where there is high probability of a vehicle to be parked or stopped (or presence of an obstruction) in a lane in which the first vehicle moves, then the system may determine appropriate lane information in at least one of coarse mode and fine mode to minimize travel time for the first vehicle. The probability of a vehicle being parked in a road segment or in a lane may be determined from the navigation data history of the vehicles in the road segment or by some other means.

In embodiments that contemplate a first vehicle moving straight in a road segment where there is no lane marking on the road, if another vehicle is vehicle is parked, waiting to make a turn or stopped temporarily, the system may determine appropriate lane information in coarse mode to minimize travel time for the first vehicle. However, if there is sufficient data available to determine an optimum lane in fine mode to minimize travel time or to determine the rank order of the drivable lanes in the road segment for the first vehicle, then the system provides appropriate lane information to the driver of the first vehicle. By way of example only, the system may inform the driver about the other obstructing vehicle ahead in the road so that the driver of the first vehicle may perform an appropriate driving maneuver to minimize delay or go around the obstacle as appropriate. In another non-limiting example, if the system does not have enough data about the navigation of the other vehicle or current road map data, then the system may provide lane information in the coarse mode for the first vehicle based on the available information. In yet a further non-limiting example, if the accurate current road map data is not available to determine an optimum lane to minimize travel time for a vehicle, the system may inform the driver of the vehicle whether a lane change is required or a lane to avoid, or as appropriate. The driver notification by the system may also be in the form of probability of an obstruction present in a lane where the first vehicle is moving based on the past history of navigation data of the vehicles that were in the road segment or incomplete road map data received about one or more of the following: road segment, navigation data of the other vehicle, and navigation data of the first vehicle.

In preferred embodiments, the system may also account for other vehicles that may pose potential hazard to the first vehicle. For example, when merging, entering a roundabout, entering a 'T' junction, a junction with give way sign, junctions where there are no traffic lights, and other locations in a road where the driver of the first vehicle must watch for other vehicles wherein, the system may notify the driver appropriately so that the driver may take necessary precautions while driving. In one preferred form, the system may inform the driver of the first vehicle about other vehicles by displaying the locations of the other vehicles, other visual form, audio, haptic or any other appropriate form of warning to inform the driver about potential hazards.

In an exemplary embodiment, if the information about direction of movement or navigation route or any other navigation data is not available, the system may learn the direction of movement from the past navigation information of the vehicle in the road segment. However, if the past history is not available, the system may use probability of other vehicles' moving direction at a current time or in the past in the road segment. In a further non-limiting example, if there is no historical navigation information available, the system may either ask the driver or use the road map data to obtain the required data. In this case, the system may indicate to the driver about the data assumed in determining the lane information to minimize travel time or use an appropriate metric to indicate the confidence level on the estimated lane information. Confidence level may be presented to the driver in appropriate output such as color coded, percentage or any other appropriate method. If the moving direction in the current road segment assumed by the system is not correct, the driver may input the correct direction of movement by some means (such as voice, gesture, haptic, touch input or any other appropriate input method).

In a preferred embodiment, the user may change the preference such that not to present lane information if there is not enough data to determine an appropriate lane to minimize travel time, estimated travel time that would be saved by changing to a lane is below a predetermined threshold, traffic in other lanes is high, difficulty of changing lane, type of obstruction, estimated time of waiting due to the obstruction in the current lane, and distance from the obstruction to inform any lane change information. The preferences may be entered manually by the user and may be saved in a database, file system or any other appropriate form in one or more appropriate computer readable medium. In other embodiments, a user may prefer to stay in a lane close to a curb or prefer to change only one lane at a time to minimize travel time. For example, if the lane determination system determines a lane that is two or more lanes away from the current lane the driver may not move to that lane, although without limitation thereto. In another non-limiting example, for safety reasons a user may prefer to stay in one of the outer lanes in a road segment where the separation of the two opposite direction lanes is marked with lines painted on the road without any guard rails.

In a preferred embodiment, a user (driver of first vehicle) may change settings such that if he/she is moving close to the posted speed or maximum speed set by the user in the user preference, even if another lane moves faster than the first vehicle, the system may not determine a change of lane. The system may also limit the maximum number of lane changes for a vehicle to minimize travel time in a road segment. Frequently changing lanes may not be safe and also difficult for a driver. The limit of the maximum number lane changes may depend on one or more factors including type of road, vehicle speed, current traffic condition, user preference, and environmental condition. For example, the system may limit the maximum number of lane changes to 1 in a 500 m road segment where vehicles move below 50 kmph. In another example, in a motor way where the vehicles move above 80 kmph, the system may limit the number of lane changes to 1 for a 3 km or 5 km. If the road condition or environmental condition is bad (example: slippery, frosty, snowing, raining, uneven road surface), the system may determine a lane change only if there is some obstacle that obstructs the lane in which a first vehicle is moving or it is safe to change lane to reduce significant travel time (for example: above 120 or 300 seconds) otherwise the system may not determine another lane. It is noted that these values are non-limiting examples.

It will be appreciated that the server system may not present the determined lane if changing of the lane is difficult, other vehicles in the determined lane are close to the first vehicle, other conditions including driver's cognitive load or driver state prevent such an action, and vehicle conditions. A driver's cognitive load (driver state) may be measured by body sensors, activity of the driver monitored by a video camera or by other means.

In preferred embodiments, when a first vehicle is stopping for a red light signal ahead, the lane determination system may consider the number of vehicles in each lane ahead of the first vehicle to determine lane information for the first vehicle to minimize travel time. In one preferred embodiment, the system may use the number of vehicles stopped in each lane ahead of the first vehicle for a red traffic light signal. In another preferred embodiment, the system may use one or more items or features from a list including lane change restriction, navigation characteristics of a first vehicle, navigation characteristics of the other vehicles, available navigation data of a first vehicle in the next road segment, type of a first vehicle, type of other vehicles, past history of navigation data of a first vehicle, past history of navigation data of the other vehicle, driver profile, switching cycle and switching period of the traffic light, past history of lane that moves faster with time of day, number of vehicles the first vehicle could overtake by changing lane, estimated time that could be saved by changing lane and other traffic related restrictions, and combinations thereof.

It will be appreciated that in those embodiments where there is heavy traffic in neighboring lane and if it is difficult to change lane, the system may not determine lane information or may determine lane information accounting the traffic conditions and present the lane information indicating the traffic conditions or any other information that may be useful to the driver. However, if the lane ahead is temporarily or permanently blocked or staying in the lane causes significant delay compared to moving to a neighboring lane, then depending on the safety the system may determine an appropriate lane information in appropriate mode to minimize travel time. In this case, the system may also present the estimated time that could be saved by changing to a lane by the first vehicle.

In a preferred embodiment, if an additional lane is added in a segment of the road, the system may appropriately determine a lane depending on the traffic in the added lane, traffic in the current lane, type of lane, and type of the first vehicle. The server may also check if any future lane change is required within a predetermined distance from the last lane change location for the first vehicle i.e., the server may minimize or limit the frequency of lane changes required when determining a lane for a vehicle. Future lane change requirements may be obtained from traffic conditions ahead, history of traffic in each lane in the next road segment, lane closures ahead, lane merge, road work, and any other traffic restrictions in the recommended lane in the next road segment or in a future road segment. By way of example, vehicles in a neighboring lane to the lane in which a first vehicle is travelling, moves faster or less traffic in the current road segment however, in a next segment of the road the neighboring lane may end, or a vehicle is stopped or parked in the lane, although without limitation thereto. In this case the system may not take this lane into account when determining lane information in an appropriate mode of operation to minimize travel time for the first vehicle.

In a preferred embodiment, if only the first vehicle is in a road segment, the server may not provide any lane guidance information. Alternatively, the server may determine a lane based on the driver preference. In yet other embodiments, the server may determine a lane based on the traffic conditions in the next road segment in the navigation route of the first vehicle, road condition, weather conditions, and speed of the vehicle with respect to the posted speed limit.

In preferred embodiments, the server may use the past history of traffic information in each lane in the road segment at different time of day to determine a lane for the first vehicle to minimize travel time. In other preferred embodiments, if the navigation data of other vehicles in a road segment is not available, the server may use the past navigation information of other vehicles or traffic information to determine a lane for the first vehicle to minimize travel time. By way of example, if there is a merging lane, road side fuel station or car park, or the like, there may be many vehicles merging in a certain lane in a road segment during certain times of day, although without limitation thereto. The system may learn this pattern of traffic congestion in lanes at different times of day using an appropriate pattern recognition/machine learning algorithm (for example: artificial neural network, Bayesian approaches, or any other appropriate technique as would be known by a person of skill in the art). Based on the learned traffic pattern in each lane at different times of day at different locations, the system may determine lane information for vehicles as appropriate. In a non-limiting example, at certain locations in a road at certain times of day the vehicles waiting to make a turn may take longer or the dedicated lane for turning may overflow due to traffic in the opposite side of road or switching cycle and switching period of the traffic light signal or for some other reasons. In this case, the server may determine an appropriate lane for the vehicles that travel in the same lane where the overflowing vehicles from a dedicated lane for turning lane or a lane in which a vehicle is waiting to turn in the lane ahead of the first vehicle.

Navigation data of first and other vehicles may be obtained by different means. As a non-limiting example, speed, current location, locations of turn, direction of movement at intersections, and the like may be obtained from an appropriately configured navigation device, smart phone, tablet, computer or other computing device that is correctly configured to provide the navigation data. Some of the navigation data may be obtained from the route determined by a navigation device. In preferred embodiments, the user may manually input the route to a destination. For example, draw the route on a map displayed on a touch sensitive screen. In other exemplary embodiments, a user may provide voice input or some other appropriate form of input about some of the navigation data such as location of turning, name of next road and the like.

In other preferred embodiments, some of the navigation data of the vehicles such as location of turning, direction of movement at an intersection, location of parking, location of stopping, and the like may be obtained from past history of navigation data of the vehicle. The server may store the navigation data of each vehicle in an appropriate computer readable medium (for example: hard drive, tape storage, flash memory) in an appropriate format (for example: database, storage files) to retrieve the past history of navigation data of a vehicle in an appropriate format.

Current location, current lane in a road, speed, trajectory of a vehicle may be derived by means of continuously measuring geo-location of a device at an appropriate time interval at an appropriate accuracy. The geo-location may be obtained by some means including satellite based localization, terrestrial based localization, image-based localization or some other appropriate means of localization. Geo-location of a vehicle may be obtained from different sources or different methods or a combination of methods, to obtain sufficient accuracy. Satellite based localization approaches may include GPS (by United States), GLONASS (by Russia), and Galileo (by Europe). There are different versions of GPS available for improving accuracy and reliability such as Differential GPS (DGPS), Real Time Kinematics (RTK), wide area augmentation system (WAAS), and Assisted GPS (AGPS).

Other means of localization of a device or a vehicle include street view based localization (for example: Google street view), LIDER based localization, using time of flight camera, depth camera, other depth sensing device, radar, any radio frequency based localization system, video camera based system, ultrasonic based system, Infrared based system, cell ID based system, inertial navigation system based localization or a combination of one or more of these approaches. Measurements means for localization may include, but are not limited to, time of arrival, time difference of arrival, return time of flight, angle of arrival, received signal strength, radio hop count, street view, image, video, depth image and other appropriate range measurements. The methods of localization means may include but not limited to triangulation, trilateration, multilateration, map matching, dead reckoning, particle filter based methods, Kalman filter based methods, other SLAM (simultaneous localization and mapping) algorithms, and other appropriate methods for localization as would be readily appreciated by a skilled addressee.

In preferred embodiments, the system may use more than one type of measurement or location technique to obtain the location of the vehicle to the required accuracy. In certain preferred embodiments, the system may use different localization methods depending on the time or location or based on some other conditions. By way of example only, in a road where there are tall buildings on both sides of the road, the satellite signal reception may be poor. In this case, the system may use an inertial navigation system, image based localization, depth map based localization, dead reckoning, map matching, or some other appropriate means to obtain the location of a vehicle to the required accuracy.

In preferred embodiments, the system may use at least one of image, video, depth image, and range measurements captured by appropriate sensing devices (non-limiting examples include: video camera, time of flight camera, and LIDER) appropriately mounted on the vehicle to detect road boundaries by recognizing a curb, road markings, barriers or appropriate markings to separate opposite road sides. Based on the identified road boundaries and the number of lanes obtained from a road map the system may determine approximate lane boundaries to localize a vehicle. The system may also use the lane width and other appropriate data in calculating the lane boundaries. Lane width may dependent on the type of road, region, territory and country. In an exemplary embodiment, the system may detect lane markings from the image, video or other appropriate measurement using appropriate pattern recognition or machine learning approaches (non-limiting examples include color/reflectance based road marking recognition methods, shape recognition based methods and other appropriate methods such as artificial neural networks). The system may also use location of parked vehicles in road side parking, other land marks to determine lane boundaries and localize a moving vehicle in a video, depth or other appropriate measurement based methods. In other preferred embodiments, the system may use distance or range measurements between vehicles obtained from vehicle to vehicle communication or some other appropriate methods to localize vehicles or enhance the localization accuracy in a road and to identify lanes.

Traffic Regulation Process

In certain embodiments when determining lane information to minimize travel time, the system may consider any possible traffic congestion (any effect that may cause disruption to traffic flow, oscillation of traffic between lanes, and the like) caused by the lane information provided by the system. For example, using the same data (non-limiting examples include traffic condition in a road segment) to determine lane information to minimize travel time for all the vehicles in the road segment, may cause oscillation of traffic between lanes. In particular, if the lane determination system instructs many vehicles to move to a fast moving lane in a multilane road segment, that lane may be slowed down because of too many vehicles that have moved to that lane by following the lane presented by the system. Now, one of the previously congested lanes may become less congested and may start to move faster. The system may determine the lane that is starting to move faster has too many vehicles until this lane become slower. This may continue in a cycle and may lead to oscillation of traffic congestion between lanes. This may also increase traffic congestion and even may even cause accidents due to frequent change of lanes. To overcome this oscillation of traffic congestion between lanes due to many vehicles choosing to move to a lane nearly at the same time, the system may apply an appropriate traffic regulation process when determining a lane information for a vehicle based on one or more from a list including traffic condition in each lane in a road segment, navigation data of the vehicles, characteristics of navigation of the vehicles, navigation route of the vehicles in the current road segment, type of obstruction (non-limiting examples include: stopped vehicle, parked vehicle, vehicle waiting to turn, vehicle overflowing from dedicated lane for turning), speed of vehicles in each lane, vehicle density in each lane (number of vehicles in a predetermined length of a lane), type of road, user preference, and appropriate additional data.

A traffic regulation process is described below to overcome the oscillation of traffic between lanes and minimize traffic congestion to minimize travel time for one or more vehicles in a road segment. The traffic regulation process includes three steps. In step 1 the process determines appropriate number of vehicles (number of vehicles in the current set) to provide lane information without causing any disruption (cause congestion or oscillation of traffic) to the traffic flow. In step 2, the process selects appropriate vehicles to be in the current set to receive appropriate lane information to minimize travel time. In step 3, the process identifies any vehicles that may potentially cause traffic, a bottleneck or any disruption to the flow of traffic and provide appropriate instructions to the drivers to minimize traffic or delay in a road segment.

Step 1:

Step 1 determines appropriate number of vehicles to provide lane information in a road segment or a predetermined length of a road (for example: 1 km, 2 km or 5 km depending on traffic, type of road and the like). In a multilane road segment, the system may determine appropriate number of vehicles that may change lane without causing traffic, oscillation of traffic or any significant disruption to the traffic flow. The set of vehicles in a road segment that may be given lane information to change to appropriate lane to minimize travel time is referred to as 'current set'. The number of vehicle in a current set may depend on one or more from a list including navigation data of vehicles, characteristics of navigation of the vehicles, traffic conditions, type of vehicles, current time, road map data, and appropriate additional data.

In an embodiment, the system may choose the number of vehicles in a current set based on the speed difference between lanes in the road segment. By way of example only, if there are two lanes in a road segment and the average speed of vehicles in a first lane is 10 kmph and in the other lane is 60 kmph, the system may determine 3 vehicles to be in the current set in the current road segment. The system may monitor the speed of lanes in the next road segment and if the speed of first lane is, for example, 20 kmph and the speed of the other lane is 60 kmph, the system may determine 2 vehicles to be in the current set for the next road segment to present lane information. The system may continue to do this until the speed difference between lanes is below some appropriate threshold (non-limiting examples: 5 kmph, or 10 kmph). In another non-limiting example, there may be two lanes in a road segment where there are 15 vehicles in a first lane running slower than the other lane in which only 6 vehicles which are moving relatively faster. The lane determination system, in the first step, may choose 3 vehicles to be in the current set. In one form, the current set may have maximum of 3 vehicles from the first lane. However, if the number of vehicles in the first and other lanes is 11 and 7 respectively in a road segment, the system may choose 1 vehicle to be in the current set. Similarly, number of vehicles in the current set may be chosen to be proportional to the speed difference between the two lanes or vehicle density difference between lanes or an appropriate method.

In a preferred embodiment, the system may choose the number of vehicles in the current set based on the vehicle density in each lane in the road segment or speed and density of vehicles in each lane. By way of example only, if the user preference of the drivers in a slow moving lane is 'do not prefer to change lane', the system may select zero vehicles in the current set or an appropriate value. In other exemplary embodiments, the number of vehicles in current set may be learned from the past history of traffic condition in each lane and the number of vehicles changed lane, by trial and error or some other appropriate machine learning or pattern recognition method such as artificial neural network, and Bayesian approaches.

Step 2:

Step 2 chooses appropriate vehicles to be in the current set to determine lane information to minimize travel time in the current road segment. The system may choose the vehicles to determine lane information in one of the following three approaches (i) round robin, (ii) random selection, and (iii) the best vehicle to minimize travel time.

Approach 1:

(round robin): In a multilane road, the system may determine appropriate lane information to minimize travel time to vehicles in a round robin fashion. In particular, the process may choose one set of vehicles in one road segment to provide lane information to minimize travel time and choose a different set of vehicles in the next road segment. The number of vehicles in each set is obtained from step 1. In preferred embodiments, only the vehicles in the slow lane or congested lane may be chosen to be in the current set. In the lane information determination system, if the first vehicle is in the current set of vehicles chosen for the current road segment, the system may provide lane information in an appropriate mode to minimize travel time. In other preferred embodiments, the system may determine the set of vehicles to provide lane information in the next road segment and start the lane determination method with one of these vehicles as a first vehicle when the vehicle reaches the next road segment.

By way of example only, if there are two lanes in a road segment and there are 15 vehicles in a first lane running slower than the other lane in which only 6 vehicles are moving relatively faster. The lane determination system may choose 3 vehicles from the first lane to be in a current set and determine the other lane as the appropriate lane for these vehicles to minimize travel time depending on their navigation data, map data and other conditions such as user preference and safety. After a predetermined time period (non-limiting examples: 30 seconds or 60 seconds) or predetermined distance (non-limiting examples: 300 m or 1 km depending on the speed, traffic, type of road and the like) the lane determination system may check the speed difference and/or vehicle density difference between the two lanes. If the other lane is still running faster (speed difference is above a predetermined threshold) the system may choose 1 or 2 vehicles from the first lane and present the other lane as the appropriate lane to minimize travel time. The system may monitor the traffic condition in both lanes in the road segment and estimate the number of vehicles that may be provided lane information to minimize travel time without causing traffic congestion and/or oscillation of traffic congestion between lanes. The system may continue to monitor the traffic condition or speed in each lane to recommend lane information to one or more vehicles until the speed difference between lanes or the difference in number of vehicles in each lane is smaller than an appropriately chosen value.

Approach 2

(random selection): The system may choose vehicles randomly to be in the current set in a road segment to determine lane information in order to minimize travel time. In an embodiment, the system may assign an identification number to each vehicle in a road segment or only the vehicles in congested/slow moving lane and use an appropriate random number generator to select the appropriate number of vehicles (determined in step 1) in a slow moving or congested lane to determine an appropriate lane to minimize travel time. In a non-limiting example, if there are two lanes in a road segment in which 10 vehicles are in a first lane and 3 vehicles are in a second lane moving relatively faster than the vehicles in the first lane. The system may assign an identification number to each vehicle in the first lane starting from 1 to 10 and randomly draw one or more numbers between 1 and 10 to choose vehicles to present the second lane as a better lane to minimize travel time. The system may continue to monitor the traffic condition (non-limiting examples: number of vehicles, speed of vehicles, and other traffic information) in each lane to provide lane information. In another embodiment, if the speed difference or the difference between the number of vehicles in each lane is smaller than an appropriately chosen value, the system may stop providing lane information to minimize travel time.

Approach 3

(best vehicles): The system may choose the best vehicles that would benefit the most from the determined lane, or the best vehicles that would reduce traffic congestion. By way of example only, the best vehicles may be chosen such that the longest travel time is saved by a vehicle compared to other vehicles and/or minimize traffic congestion or some other criteria. Approach 3 may use appropriate current and past data of one or more from a list including navigation data of vehicles, characteristics of vehicles, type of vehicles, current time, road map data, and appropriate additional data to choose the best vehicles to be in the current set, and combinations thereof. The system may also apply an appropriate machine learning or pattern recognition approach (non-limiting example: artificial neural network) to determine the best vehicles.

In preferred embodiments, the system may choose vehicles that are in the immediate neighboring lanes to the lane that runs faster or less congested. Alternatively, vehicles may be selected such that a minimum number of lane changes is required to reach the determined lane. In other embodiments, the system may choose vehicles that drives close to the posted speed (learned from the past history of navigation data) to be in the set rather than a vehicle which drives slowly. Suggesting a fast moving lane to a slow moving vehicle may cause traffic or disruption to that fast moving lane. From the past history data, the system may learn which vehicles that change a lane results in traffic minimization. The best vehicle to choose in order to determine lane information to minimize traffic may be learned by applying appropriate machine learning or pattern recognition algorithm such as Bayesian approach or artificial neural network based approaches. The system may continue to monitor the traffic condition or speed in each lane to recommend lane information to one or more vehicles until the speed difference between lanes or the difference in number of vehicles in each lane is smaller than an appropriately chosen value. This value may be chosen from the past history of data. Further, the system may also consider map data, navigation data of the vehicles, road safety, and appropriate additional data when determining vehicles to be in the current set.

Step 3:

In this step, the system identifies one or more of the following: (a) vehicles that may cause disruption to the flow of vehicles in a road segment, (b) vehicles obstructing one or more lanes, (c) driving behavior that may affect others, and combinations thereof. The system may appropriately instruct one or more of these drivers to change lane, change driving behavior, speed up appropriately, or any other appropriate instruction to minimize travel time for one or more vehicles. In an embodiment, the system may choose one or more vehicles such that traffic congestion in a road segment would reduce if these vehicles changed lane. In an exemplary embodiment, for a first vehicle, the system may compare the speed of one or more vehicles in front and one or more vehicles behind in the same lane as that of the first vehicle. If the speed difference between the average speed of the vehicles in front and vehicles behind is higher than a predetermined first threshold, the system may inform the driver of the first vehicle to appropriately speed up to bring the speed difference between the vehicles in front and behind the first vehicle to below the first threshold.

In alternative embodiments, the system may also inform the driver of the first vehicle to change to an appropriate lane such that the traffic congestion reduces in the road segment. For example, a slow moving vehicle may create a bottleneck that leads to traffic congestion. Some drivers may not aware of the impact of their driving behavior in the overall traffic congestion in the road. Informing a driver appropriately about the potential effect of his or her driving behavior may minimize problematic traffic conditions and therefore minimize travel time for one or more drivers. By way of example only, if a driver is moving slowly in a lane intended for fast moving vehicles or intended for overtaking vehicles, the system may identify the vehicle by comparing the speed of the slow vehicle with other vehicles in other lanes, or with the speed limit of the road segment, or by comparing the speed of the vehicles in front and behind in the same lane as that of the slow vehicle. The slow moving vehicle may be instructed to move to an appropriately faster speed, or change lane or any other appropriate instructions to minimize traffic congestion in the road segment.

In preferred embodiments, the system may use a sliding window approach to find the vehicle that obstructs other vehicles or is causing congestion. In particular, in a road segment, the system may calculate the average speed of a predetermined number of vehicles that are consecutive in the same lane. A sliding window may contain a predetermined number of vehicles that are consecutive in a lane. When sliding the window along the lane, it drops one or more vehicles from one side of the window and adds one or more vehicles on the other side of the window such that the number of vehicles within the window is the same for all window positions and the vehicles within a window are always consecutive. The system is configured to calculate the average speed of vehicles within the window for each window position. The system may detect a vehicle that obstructs or causes a bottleneck or traffic congestion by comparing the average speed of vehicles in neighboring window positions. If the difference in the average speed between two consecutive window positions is larger than a predetermined threshold, the system appropriately identifies the vehicle that causes the bottleneck. In particular, if the window slides in the opposite direction to the direction of movement of the vehicle(s) then the vehicle(s) that cause the bottleneck may be identified by finding the vehicle that is newly added to the window for which the average speed has dropped compared to the previous window. The system may either provide appropriate lane information in an appropriate mode of operation or inform the driver to appropriately speed up without exceeding the speed limit of the road.

By way of example only, if there are ten vehicles moving in a lane and the vehicles are numbered from 1 to 10 consecutively starting from the vehicle that moves ahead of all the vehicles. Assume the size of the window is configured to accommodate 3 vehicles and the window slides in the opposite direction to the direction of movement of the vehicles. The first window may contain vehicles 1, 2 and 3, the second window may contain vehicles 2, 3 and 4, the third window may contain vehicles 3, 4 and 5, and so on. The system may calculate the average speed of the vehicles in each window and compare the average speed with neighboring windows (compare the average speed of first and second window, compare the average speed of second and third windows, and so on). If the average speed difference between two neighboring windows (for example: average speed difference between the second and third windows) is larger than an appropriately chosen threshold, the system is configured to determine the vehicle added to the third window (the vehicle added to the window when moving from the second window to the third window position) as the one causing a bottleneck or traffic congestion. By way of example only, if the absolute speed difference between second and third window is larger than the threshold, the system is configured to determine that vehicle 5 is responsible for the bottleneck or obstruction, and provides appropriate lane change information, and/or provides instructions to speed up as appropriate. It is noted that the size of the window and/or the number of vehicles to add or drop when sliding the window along a lane may be chosen appropriately by a person skilled in the relevant art. In another embodiment, a plurality of windows may be used to scan either a single lane or across parallel lanes to appropriately identify the vehicle(s) that cause traffic congestion, bottleneck or obstruction as appropriate.

In alternative embodiments, the system may use vehicle density instead of calculating the average speed. In exemplary embodiments, the system may use a fixed length window and count the number of vehicles within the window. In other exemplary embodiments, the system may vary the width of the window to enclose a predetermined number of vehicles for each position of the window and either use the width of the window or distance between the neighboring vehicles that are within the window as a measure to find a vehicle causing the traffic or a bottleneck. In some preferred embodiments, the system may use statistics such as variance, entropy, other types of mean (harmonic mean, geometric mean) or any other appropriate statistical value to compare the speed, distance, density or any other appropriate measures to determine a vehicle causing traffic or a bottleneck.

In certain preferred embodiments, the system may check the road map data, navigation route of the first vehicle, accidents, lane closure, broken down vehicles and other appropriate data when identifying a vehicle that causes traffic congestion or a bottleneck. By way of example only, if a first vehicle is behind a vehicle from a list including a vehicle waiting to turn, vehicles overflowing from a dedicated turning lane, a broken down vehicle, an accident, a temporary lane closure, waiting to merge and the like, the system may not determine the first vehicle as causing traffic congestion. Instead the system may appropriately determine a lane to minimize traffic congestion for the first vehicle. However, if a first vehicle is moving substantially below the posted speed and the vehicles in front move relatively faster, the system may either inform the driver to speed up, or determine appropriate lane change information for the first vehicle to minimize traffic congestion.

In an alternative embodiment, the number of vehicles in a window may be chosen appropriately depending on the traffic congestion, type of road, speed, and other conditions. The number of vehicles to move when sliding the window may also be chosen appropriately (non-limiting example: move window by 1 vehicle). Further, if the window slides in the same direction as that of the direction of vehicles moving, the vehicle causing an obstruction or traffic may be identified appropriately. The drivers who cause a bottleneck or cause traffic congestion may be informed appropriately such as on a percentage scale, color coded scale or the like. For example, 0% may mean that no congestion caused, while 100% may mean that the vehicle causes obstruction to other vehicles behind or causes traffic congestion as appropriate. In a preferred embodiment, it may also be possible to apply an appropriate machine learning or pattern recognition approach in each step of the traffic regulation process such as a Bayesian approach, artificial neural network, or other appropriate methods. These approaches may use current and past history of appropriate data including navigation data of the vehicles, navigation characteristics of the vehicles, type of vehicles, current time, road map data, appropriate additional data, and combinations thereof.

FIG. 1 illustrates a block diagram of a traffic aware lane determination system to minimize travel time in a multilane road segment according to a preferred embodiment. The lane determination system includes a plurality of user devices 102, a server system 104, and a communication network 106. Block 102 represents plurality of user devices on which an application program runs and correctly configured to allow a user device to communicate to the server system 104 via the communication network 106. In exemplary embodiments, the server system 104 determines the appropriate lane information in appropriate mode of operation for the vehicles to minimize travel time and send the lane information to the user device to be presented appropriately to the driver.

In a preferred embodiment of the present invention, user devices form cliques and for each clique at least one leader is appointed. For example, in FIG. 1 there are two cliques shown. A first clique consists of five members 108a to 108e including the leader 108a. A second clique consists of four members 108f to 108i including the leader 108f. Devices 108a and 108f are designated to be the leaders of the first and second cliques respectively. A clique formation is at least based on the direction of movement of the devices, distance between devices, and/or wireless communication signal strength. A device may become a member of a clique if the distance to the clique leader is below a predetermined threshold, the direction of movement is the same as that of the clique leader, and/or the received signal strength is above a predetermined threshold. Members of a clique communicate to the server system via its clique leader. In a non-limiting example, a member 108*b* sends its navigation data and other appropriate data to its leader 108*a*. The leader 108*a* may process the received data appropriately to remove any redundant data or any data that the server system 104 already received (this is to minimize the amount of data transmission and increase system efficiency), and sends the data to the server system 104 via the communication network 106. The server system 104 also receives navigation data and other appropriate data from other members in the clique and from other cliques. In exemplary embodiments of the invention, the server system appropriately processes the navigation data and one or more additional data including road map data. The server may perform one or more of the following: determine characteristics of navigation of the vehicles, obtain type of vehicles, current time, and combinations thereof. The server may also check whether the other vehicles are on the same side of road and in the same segment of the road as that of the first vehicle for which lane information is determined. Based on the received data the server may determine at least one of coarse mode and fine mode to determine lane information to minimize travel time for the vehicle. The determined lane information is sent to the user device 108*b* via its clique leader 108*a*. The user device appropriately presents the lane information to a human driver or a driving system of an autonomous vehicle (driverless vehicle).

There may be one or more members in a clique designated as leaders to perform one or more operations from a list including collect appropriate data from members of its clique, appropriately process the data, remove any redundant data, remove any data that the server already received, send appropriate data to the server including navigation data, keep record of member devices, monitor member devices, receive lane information from the server and send it to one or more appropriate member devices, broadcast or multicast appropriate data to plurality of members as appropriate, store appropriate data including navigation data and lane information, and communicate with leaders of neighboring cliques to manage members for efficiency (non-limiting example: change clique membership of one or more devices from one clique to another clique, and merge cliques), and combinations thereof. In preferred embodiments, the leader may determine some of the navigation data of some or all the member devices including relative location (vector distance from the leader to a member device), speed, whether a member device/vehicle is ahead or behind another member deceive/vehicle on a road. The leader may also store one or more of the following: identification of its clique members, relative location, received signal strength, number of members, navigation data, lane information data, and other appropriate data in an appropriate form such as a database, file storage or any other appropriate form, in appropriate computer readable medium.

In preferred embodiments, a leader may store the details of all the members in its clique, such information may be one or more from the following list including member identification, type of vehicle, speed, location, lane, acceleration, user profile, type of device, destination, current lane, received signal strength, distance to the leader, type of communication technology supported, battery power, other resources, processing power, other appropriate information, and combinations thereof. The server system may also store these data and other appropriate data about each user in an appropriate computer readable medium such as a database or file storage. By way of example only, in a database the user information may be stored in tables.

In preferred embodiments of the invention, the leader may perform some or all the processing of a server or the leaders may communicate to each other to exchange navigation data to determine lane information for member devices. In some exemplary embodiments, the user devices in a clique may share the processing performed by the server system in determining lane information to minimize travel time. The system may be implemented as a centralized system, fully distributed system or a hybrid centralized and distributed system.

A leader of a clique may be selected based at least on one or more methods from a list including: (a) selecting by the server system based at least on the available resources, received signal strength to other members or other appropriate criteria, (b) voting by the members of the clique (each member vote to a device to be the leader based at least on received signal strength, distance or other appropriate criteria), (c) in a round robin fashion (each device becomes the leader in turn to time slot basis), (d) time based (leader is selected depending on the current time), (e) location based (leader is selected based on the current location for example, more than one leader may be required in some locations, received signal strength may be weak for some devices at certain locations), (f) based on the characteristics of navigation of the vehicle (non-limiting example: average speed relative to the rest of the members and driving behavior), (g) vehicle speed (a vehicle may not become the leader if the speed of a vehicle is significantly higher or lower than the average speed of the members of a clique), (h) available resources in the device (sufficient processing power, memory, and/or data communication), (i) number of members (a device may not become the leader if it does not have the capacity to act as a leader for the number of devices in the clique), (j) by volunteering (a device or user may volunteer to become the leader), (k) manual selection by a user of the device, (l) based on received signal strength to all the members in the clique, (m) other appropriate methods, and combinations thereof.

The server may store the navigation data of the user devices (leaders and members), clique data (identification of each clique, identification of members in a clique, leaders, and other appropriate information about cliques), determined lane information, and other relevant data. The server system may also have a database (not shown) to store the updated current road map data in appropriate format. Weather conditions may be obtained from the Internet or from appropriate weather monitoring system as is known by a person of skill in the art. Data about surrounding conditions may be obtained from sensors mounted on the vehicles, environment and other appropriate sources. Road conditions may be obtained from road sensors, sensors on the vehicles and in the environment or inferred from the weather conditions (wet road, snow on the road, frosty road surface, and any other conditions that may affect the driving or road safety).

At the commencement of driving or when the lane determination application program is started a user device searches for a clique in the vicinity to join with a clique. However, if there are no cliques to join, the device may form a new clique and declare itself as the leader and start communicating with the server to obtain lane information in order to minimize travel time. The server may monitor each clique and based on the number of members in a clique, the server may instruct to merge two or more cliques to form one clique or to split a clique into two or more cliques with leaders appointed for each clique. If one or more members of a clique changes direction of movement, stops moving or the received signal strength goes below an appropriate threshold, the member searches for an appropriate clique to join. If there are no appropriate cliques to join, the one or more devices form a new clique and one of the devices becomes the leader. It is contemplated that the leaders of the neighboring cliques may communicate to each other to move one or more members from one clique to another appropriately. For example, if the signal strength or the distance to a member in one clique does not satisfy the conditions the leader may find an appropriate clique for that member. In another embodiment, the member itself may search and find an appropriate clique to join based at least on the received signal strength, distance to the leader, speed of the vehicle, direction of movement, and combinations thereof. Devices in vehicles that are not moving or devices carried by passengers or any road users may also join in an appropriate clique based at least on the received signal strength or distance to the clique leader. A leader or the server may limit the maximum number of members in a clique to a predetermined value. In preferred embodiments, more than one leader may be in a clique to share the work load of a leader of a clique or as a backup if the current leader fails or disappears for some reason or changes direction from the rest of the members.

In alternative preferred embodiments, the user devices 102 may not form any cliques, but rather directly communicate to the server system 104 through the communication network 106 to send the navigation data and to receive the appropriate lane information from the server system 104. In exemplary embodiments, the user devices may communicate to the server through road side units or access points installed on the road side appropriately to send data and to receive data between the vehicle (user device) and the server or appropriate system for determining appropriate lane information to minimize travel time.

In preferred embodiments, if a bus that stops frequently (or an obstructing vehicle such as a vehicle stops frequently or waiting to turn) is in the same lane and ahead of the first vehicle in a multilane road segment, the server may inform the driver of the first vehicle to change lane or determine an appropriate lane to minimize delay or even present rank of drivable lanes for the first vehicle. However, the data required to determine one of (a) whether a lane change is required, (b) a lane to avoid, (c) an optimum lane to drive, and (d) rank order of drivable lanes for the first vehicle to minimize travel time may vary. By way of example only, to determine whether a change of lane is required for a first vehicle, the system requires the lane and location of the first and the other vehicle (bus or any other obstructing vehicle). In another exemplary embodiment, if the other vehicle is a parked vehicle or a truck stopped for loading or unloading, the system may determine the lane information from the map data. In some cases, the location of stopped vehicle for loading may also be obtained from an appropriate map data. To determine a lane to avoid for a first vehicle, the system requires at least current location of the first vehicle; current location and lane of the other obstructing vehicle. Alternatively, to determine a lane to avoid for the first vehicle to minimize travel time, the system may require at least location of the other obstructing vehicle relative to the first vehicle and lane of the other obstructing vehicle. To determine an optimum lane for the first vehicle to minimize travel time the system may require at least the location of the first vehicle, location and lane of the other obstructing vehicle, and traffic condition in other drivable lanes. To determine the rank order of drivable lanes for the first vehicle in the multilane road segment, the system may require a location and lane of the other obstructing vehicle, and traffic condition in other drivable lanes. In some embodiments, the system may use one or more additional data as available. It is noted that the lane information provided by the lane determination system to minimize travel time may not always be the lane for best performance or fuel efficient or energy efficient lane.

The server may determine the traffic information in each lane in a road segment based on the current navigation data (such as location, lane, and speed of vehicles) received from all the vehicles in a road segment or from past history of navigation data. The server may also obtain traffic information from other online traffic information services, and past history of traffic information or by some other means. Past history of traffic information may be created by appropriately processing and storing the past navigation data of all the vehicles at appropriate time interval in appropriate form (database or file storage) in an appropriate computer readable medium. Traffic history in each lane may also be obtained by applying an appropriate pattern recognition or machine learning algorithm on the history of navigation data in the road segment. Direction of movement at an intersection, location of turning and other appropriate navigation data may also be obtained by appropriately processing the history of navigation data of the vehicle. Traffic condition in a lane or in a road segment may also be determined from current navigation data of all the vehicles such as average speed of vehicles in each lane, number of vehicles in each lane, type of vehicles, turning location of a vehicle, and the like. Further, navigation routes of vehicles, parking locations, parking time, parking duration, stopping location, stopping duration, lane followed during normal driving, normal driving behavior, and other data that may be relevant to determine lane information for a vehicle to minimize travel time may also be appropriately determined from the historical navigation data of the vehicles.

In preferred embodiments, the navigation data may be provided to the server system automatically by a user device without any user intervention. By way of example only, a portable navigation device with appropriate accuracy may automatically send the current location of the vehicle, the next location where it will make a turn, current lane, acceleration, current speed, and other relevant information. In another non-limiting example, a smart phone appropriately configured with navigation software may provide appropriate navigation data including current lane, location, speed, acceleration, navigation route, destination, and other appropriate data. In this case, the system may ask the user to input the type of vehicle (private vehicle, taxi, bus, and motorcycle etc.).

In yet another non-limiting example, a built-in computer system in a vehicle may provide navigation data including type of vehicle, condition of the vehicle, speed, acceleration, current lane, navigation route, and presence of neighboring vehicles detected by some means (including video camera, communication signal or by some other means). In another example, a computer system that drives an autonomous vehicle may provide data including type of vehicle, condition of the vehicle, speed, acceleration, current lane, navigation route, presence of neighboring vehicles detected by some means (including video camera, LIDAR, depth camera, communication signal or by some other means), density of vehicles, state of the driving system, and other relevant data. In addition, external environmental data or surrounding data may be provided by weather forecast system, environment sensors, road side traffic camera, satellite system and other appropriate systems. The data provided by these external systems may include weather conditions, frosty road surface, flood, road condition, road/lane closure, accident, and other useful data. Further, the traffic condition may also be given in part by a user (non-limiting examples: driver, passenger, and road user). By way of example only, a user may provide data about a closed lane, stopped vehicle, traffic condition and other appropriate data.

The communication network 106 may include, but is not limited to, a wireless communication network (e.g., cellular network (3G, 4G and beyond), Wireless-Fidelity (Wi-Fi), WiMAX, and BLUETOOTH) for providing the required data communication between the user devices 102 and/or the server system 104. In an embodiment, a user device may wirelessly communicate to a base station and the base station may be connected to a core network such as public switch telephone network (PSTN) or an appropriate network. In another exemplary embodiment, user devices 102 may communicate wirelessly to a Wi-Fi access point and that Wi-Fi access point may be connected to Internet Protocol network (IP network or the Internet). In preferred embodiments, the network may also include Local Area Network (LAN), Metropolitan Area Network (MAN), Wide Area Network (WAN), ad-hoc network, and peer-to-peer network.

In an embodiment, the lane determination system may be implemented as central processing server systems to operate as a client-server model with the user devices. The server system may also be a single server, group of servers distributed in one or more geographic locations or implemented on a cloud computer system. The server may also have an appropriate database system (not shown) to store data (such as updated road map data, history of navigation data, weather data, data about road condition, and the like) required to determine appropriate lane information for the vehicles to minimize travel time.

In another embodiment, a plurality of user devices may be connected wirelessly such that they communicate to each other to provide at least one function of a server system. In alternative embodiments, the user devices may communicate directly between them or communicate to a road side node. According to this embodiment, the functions of the server system may be implemented such that the user device and the road side node may share the necessary processing, data transmission and storage. It may also be possible to implement the lane determination system with technologies that may be available in the future for vehicular communication system (VCS) or as part of intelligent transportation systems (ITS).

The server systems 104 may be implemented as a combination of software, firmware and hardware configured correctly to perform functions including communicating to user devices 102 and to perform processing on the navigation data and other relevant data to determine lane information for vehicles to minimize travel time. The server system 104 may be replicated in multiple geographic locations to distribute the system or may be a central server system performing the appropriate processing on the navigation data and other data. The server 104 may store the navigation data and other relevant data received from each user in a computer readable volatile or non-volatile storage medium. The navigation data, and other related data may also be stored in a computer readable medium in a database or an appropriate form such as file storage or in an appropriate database. The relevant data may include vehicle navigation data such as route, time, geographic location, driving events, driver performance, source of data received, and other appropriate data. The stored historical vehicle data may be used to create a user profile (e.g., driver profile), track navigation data over time, predict travel time, predict traffic pattern and for other applications. The user profile may represent aspects of driving of a user including normal driving quality, speed, navigation route, parking location, parking time, and other appropriate navigation data. The profile may also include how well the user provides navigation data, accuracy of data, and other relevant data about a user. In an implementation, the navigation data, determined lane information, and other relevant data may be stored in a database server (not shown) collocated with the server system 104 or remotely located from the server. The data base system may be a computer server system or arrays of computer server system appropriately configured to store the data. The lane determination server system 104 has access to the data stored in the database. The data may be stored in the form of tables or other appropriate form and the database server may respond with the appropriate data for a database query received from the server system or other computer system.

In preferred embodiments, the server system may apply pattern recognition and machine learning on the navigation data and other data to provide additional features to users including, but not limited to, information on live traffic congestion, travel time prediction, optimum route to a destination at different times of day, prediction of traffic in a road segment, and other useful information to a driver or a passenger. The lane determination system may also provide additional services to users including location based information, promotion, and advertisement, based at least on the navigation data.

In exemplary embodiments of the invention, the server system 104 may apply a traffic regulation process to avoid traffic congestion, namely oscillating between lanes or to minimize overall traffic congestion in a road segment. Traffic instability (non-limiting example: traffic jam or oscillation of traffic between lanes) may be caused if many vehicles are presented the same lane information based on the same data (non-limiting example: traffic information). An appropriate process may be used based at least on one or more of the following: traffic congestion in each lane in the road segment, speed of vehicles, type of obstruction, type of vehicle obstructing the lane, navigation data of the vehicles, road map data, and combinations thereof.

Figure 2:
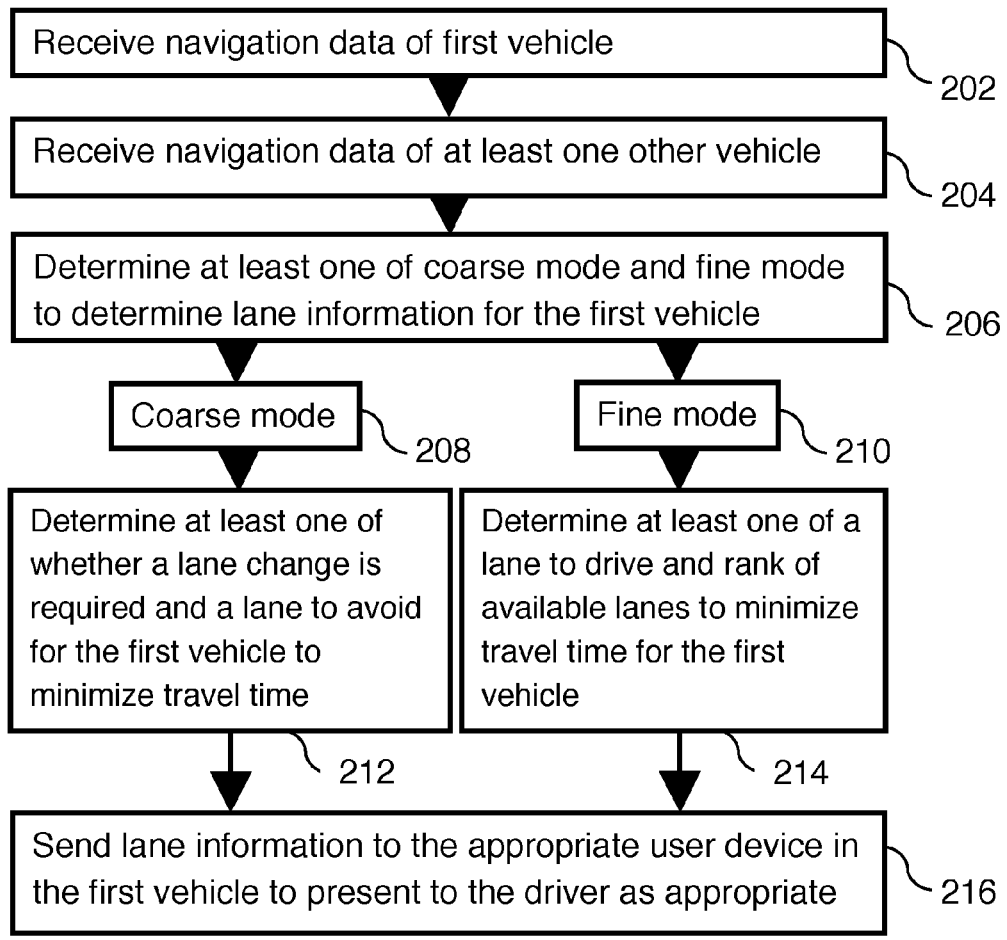
FIG. 2 is a flow chart illustrating a method for determining lane information in at least one of coarse mode and fine mode for a first vehicle to minimize travel time according to an embodiment of the invention.

FIG. 2 is a flow chart illustrating a method for determining lane information to drive a first vehicle to minimize travel time according to some exemplary embodiments of the present invention. As shown in step 202, the method receives navigation data of the first vehicle. The navigation data may be received directly from the user device (automatic or manual user input), via its clique leader, from appropriate sensors in the first vehicle, other vehicle, in the environment and/or from other sources such as satellite data. In a preferred embodiment the navigation data is received via its clique leader. At step 204, the method receives navigation data of at least one other vehicle. It is contemplated that the other vehicle may be in the same side of road and same road segment as that of the first vehicle in certain embodiments.

In preferred embodiments, the navigation data of the first and the other vehicles may represent the navigation data within the current road segment. Navigation data of a vehicle is any appropriate data about a vehicle that may be useful in determining lane information to minimize travel time in a road segment. Example navigation data of a vehicle includes, but is not limited to, current road segment of the vehicle, current lane, location, speed, acceleration, location of turning, direction of movement at an intersection, location of stopping, location of parking, distance between two vehicles, location of a vehicle with respect to another vehicle, and navigation route in current road segment. According to some exemplary embodiments of the invention, the navigation data may also include past history of some appropriate navigation data collected at appropriate time interval and stored in an appropriate computer readable storage medium such as a hard disk drive or a database server. The past history of the navigation data may be appropriately collected at appropriate time interval in the current journey. In preferred embodiments, the navigation data may also include the navigation data collected at an appropriate time interval in one or more previous journeys in the same day or in some day in the past. In this case the navigation data collected in the past time in the current journey and in the past journeys may include, but is not limited to, location, lane, speed, acceleration, time taken to pass predetermined distances in different locations, locations of turning in the current road segment, type of turning, direction of travel in a two-way road, direction of movement at an intersection, location where a vehicle stops, and location where a vehicle parks, and other appropriate data.

According to certain embodiments of the invention, the navigation data may also include appropriate data about a vehicle in the future such as direction of movement at the next intersection, location of the next turn, type of the next turn (non-limiting example: left turn, right turn, and U-turn, exit at a roundabout), lane from which the vehicle will turn, other future driving maneuvers obtained from one or more sources including appropriate navigation device, appropriate navigation application software running on an appropriate device, past history of navigation data of the vehicle in the current route, indication light (turn signal), and manual input. Indication light may not be appropriate to learn whether a vehicle turns beyond a certain distance (non-limiting example: beyond 300 m or 1 km from the current location) from the current location. Receiving the navigation route of other vehicles may provide the locations of turn, direction of movement at an intersection, lane from which it turns, and other appropriate data.

In preferred embodiments, the lanes may be given identification numbers starting from the lane close to a curb in each side of road. In an implementation, for example, odd numbers may be given to lanes on the left hand side and even numbers may be given to lanes on the right hand side of the road relative to a person facing north or east depending on the orientation of the road. The orientation of a road may be obtained from the road map or based on the direction of movement of a vehicle by comparing plurality of coordinate locations of a vehicle or a user device within a predetermined distance.

The navigation data of the first and the other vehicles may be received directly from a user device in the other vehicle and/or via the leader of the clique in which the other vehicle is a member, from satellite data, from a database that stores the past navigation data, navigation device that may provide some of the current and future navigation data, smart phone with appropriate navigation application running, from other road users or combinations thereof. In an embodiment, the navigation data may include current data, historical data and future data about a vehicle. The current navigation data about the first and other vehicles may also be received by means of sensors in the environment, satellite based positioning systems, terrestrial positioning system, speedometer, accelerometer, gyroscope, odometer, LIDAR, radar, time of flight cameras, visual camera, and one or more devices that emit and/or sense appropriate ranges of frequency waves to provide appropriate data including distance, relative location, and speed. By way of example only, an array of antennae or steerable antennae may provide the direction of a communication device and measurement on time of arrival or time difference of arrival of electromagnetic wave from the device may provide distance measurement. From direction and distance measurements, the relative location of a device may be obtained. In an embodiment, it may also be possible to use map matching as well to obtain the location. In another implementation, dead reckoning may also be used to obtain some of the navigation information such as location, speed, acceleration, and the like.

At step 206, the method determines at least one mode of operation to determine lane information for the first vehicle to minimize travel time based at least on one or more of navigation data of the first vehicle and navigation data of the other vehicles. In preferred embodiments with the default settings of the user device or the lane determination program, the method may automatically choose a mode of operation to determine lane information without requiring any data to determine an appropriate mode. In another embodiment, the default setting of the system may choose fine mode if there is heavy traffic (many vehicles present in the road segment) in the current road segment. In yet another embodiment, the method may switch to fine mode in a road segment if the vehicle makes a difficult maneuver, make a turn and the like.

In those embodiments where a driver travels on a road that is unfamiliar (have not driven on the road or location before), the system may provide lane information in fine mode or in an appropriate mode based on the available data to determine lane information to minimize travel time. According to some embodiments, if there is not enough data (road map data or navigation data or any other data), the method may determine lane information in coarse mode.

At steps 208 and 210 the method branches to coarse mode and fine mode respectively to determine appropriate lane information to minimize travel time. At step 212 the method determines lane information that is at least one of (a) whether a change of lane is required and (b) a lane to avoid driving in the current road segment to minimize travel time for the first vehicle based at least on the navigation data of at least one of first and other vehicles in the current road segment. In some embodiments the method may also use the past, current and/or future navigation data to determine lane information (a) and/or (b).

By way of example only, in the coarse mode, if the data about current lane of the first vehicle is not available however, if the system received data that another vehicle is parked on a lane ahead of the first vehicle, the system may inform the driver of the first vehicle to avoid the lane in which the other vehicle is parked. In another example, if the system knows the current lane and location of the first vehicle and another vehicle that is ahead of first vehicle, moving too slow or stopped for some reason, based on the lane of the other vehicle the method may determine whether a lane change is required or not. Whether a vehicle has stopped or not may be determined by monitoring speed in a predetermined time period, from the past stopping location, user input or by other methods. In other preferred embodiments, if the method receives the current lane and location of first vehicle and another vehicle in a different lane wherein if the other vehicle drives faster than the first vehicle but below the speed limit, the method may determine a change of lane is required or determine the lane of the other vehicle to drive in current road segment. In some embodiments, the lane to avoid in a road segment may be determined based on the past navigation data or traffic information calculated from the navigation data of all the vehicles in the road segment in the past. By way of example only, if the speed of vehicles in a lane in a road segment was always lower than the speed of vehicles in other lanes in the past then the method may determine the slowest lane to avoid driving for the first vehicle as appropriate.

At step 214 the method determines at least one of (c) an optimum lane to drive in the current road segment to minimize travel time for the first vehicle and (d) rank of drivable lanes in increasing order of travel time based at least on the navigation data of at least first vehicle and other vehicles. In preferred embodiments, in a road segment, if the method receives the speed of the first vehicle and other vehicles in different lanes, the system may determine the fastest lane as the optimum lane to drive and/or rank the lanes in the current road segment according to increasing order of travel time (or decreasing order of speed). In other exemplary embodiments, the method may also use the future navigation data to determine lane information (c) and/or (d).

In those embodiments that contemplate a situation where turning is not possible in a road segment, the optimum lane information in fine mode for the first vehicle to minimize travel time may be determined based at least on the speed of the first vehicle and speed of at least one or more vehicles in other lanes in the current road segment. In an embodiment, in a straight multi-lane road segment, the server system may determine the optimum lane information that runs faster than the speed of the first vehicle. In this case, the server may need the speed of the first vehicle, speed and lane of at least one other vehicle in the road segment.

In another embodiment, the server may also use lane change restrictions and other traffic restrictions when determining the optimum lane or rank of the drivable lanes for the first vehicle. In this case, the server system may need at least the speed of the first vehicle, speed of at least one other vehicle in another lane or speed of all the drivable lanes, and any lane change restrictions to move to the lane of the other vehicle. The lane change restrictions may be obtained from an updated current road map or by some other means such as using a sensing device (video camera) to detect the lane markings on the road.

In yet another embodiment, the method may use the data about the type of the first and the other vehicle that is in the same lane and ahead of the first vehicle i.e., if the other vehicle stops frequently (example: a bus, garbage collecting truck) or a vehicle that moves slowly (bicycle or speed of a vehicle from the history of navigation data or by some other means), the method may determine an appropriate lane information for the first vehicle to minimize travel time.

In an exemplary embodiment of the invention, the method may also receive other data such as road map data, weather data, road condition, traffic condition, surrounding condition, driver state, and driver preference at step 204 or at an appropriate step. This data may be appropriately used for determining a mode of operation and/or for determining lane information for the first vehicle to minimise travel time in an appropriate mode.

At step 216, the lane information may be sent to the appropriate user device in the first vehicle to be presented to driver of the first vehicle. In a preferred embodiment, the lane information may be sent directly to the user device, through its clique leader, road side network access unit or any other appropriate means. In another preferred embodiment, the lane information is sent to the appropriate user device through the leader of the clique in which the user device is a member. The user device may present the lane information to the driver through appropriate interface.

Figure 3:
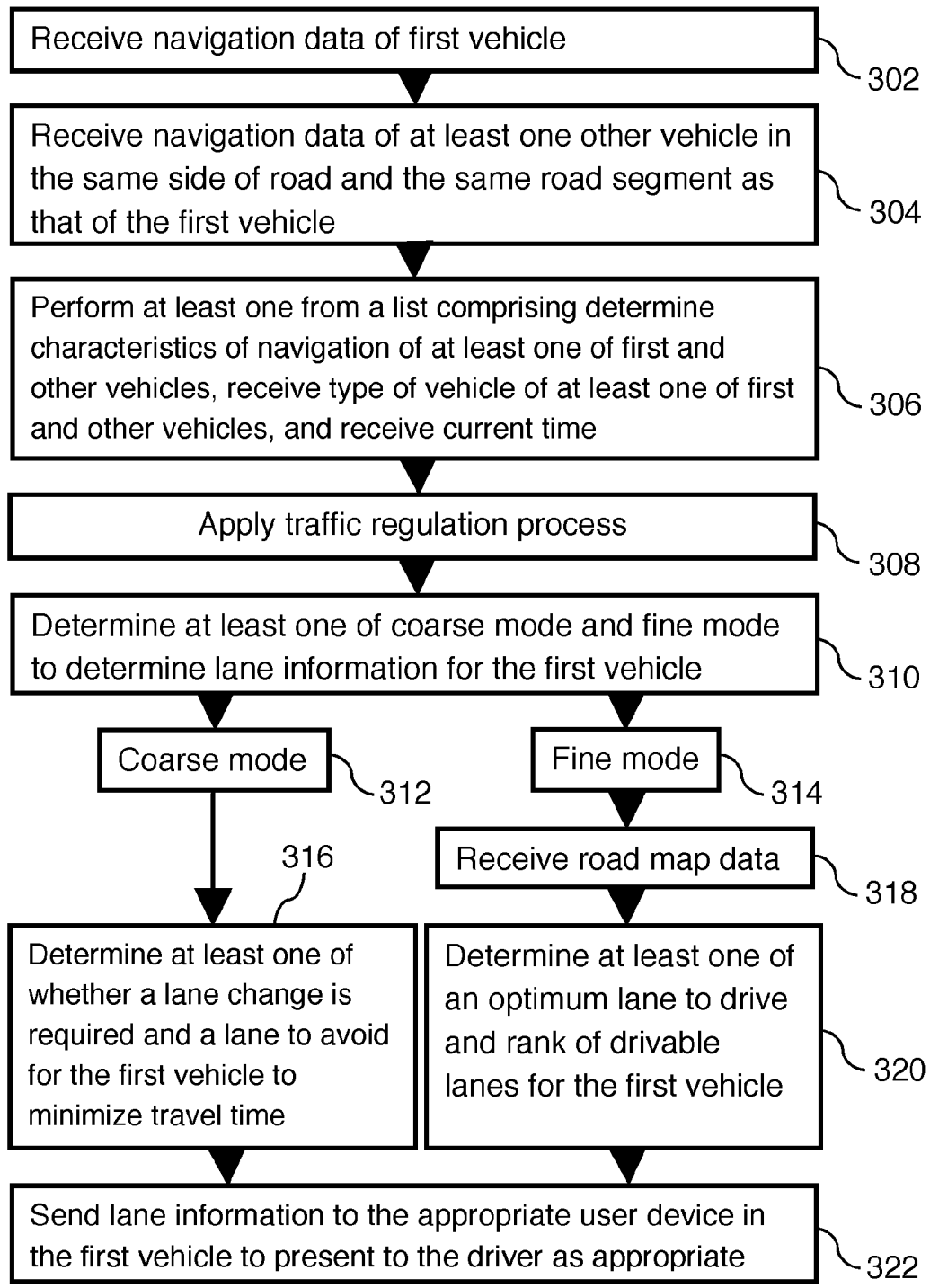
FIG. 3 is a flow chart illustrating a method for determining lane information in at least one of coarse mode and fine mode for a first vehicle to minimize travel time according to an embodiment of the invention.

FIG. 3 is a flow chart illustrating a method for determining lane information to drive a first vehicle to minimize travel time according to a preferred embodiment of the present invention. Step 302 is the same as the step 202 in FIG. 2. At step 304, the method receives navigation data of at least one other vehicle that is in the same side of road and same road segment as that of the first vehicle. In some exemplary embodiment, the navigation data of the first and the other vehicles may represent the navigation data within the current road segment and not the entire route to the destination. At step 306, the method performs at least one from a list including (a) determine navigation characteristics of at least one of first and at least one other vehicle, (b) receive type of vehicle of at least one of first and at least one of other vehicle, and (c) receive current time. Type of vehicle may be received from a user's manual input, control computer of the vehicle, or by some appropriate means. At step 308, the method applies appropriate traffic regulation process to minimize at least one of overall traffic and oscillation of traffic between lanes. In a preferred embodiment, the method may monitor the speed of vehicles in each lane in a road segment while presenting determined lane information to one or more vehicles. The following two steps are performed. Step 1 (s1): the method may present lane information to a first predetermined number of vehicles and wait for a second predetermined time period. Step 2 (s2): the method monitors the speed and/or traffic in each lane and if the speed difference between lanes is larger than a third predetermined value, the method presents appropriate navigation information to the next set of vehicles (number of vehicles in the set=first predetermined number) and monitor the speed and/or traffic in each lane. Repeat steps s1 and s2 until the speed difference between lanes in the road segment is smaller than the third predetermined value.

Step 310 is similar to step 206 in FIG. 2. However, the method determines at least one mode of operation to determine lane information for the first vehicle to minimize travel time based at least on one or more from a list including navigation data of the first vehicle, navigation data of the other vehicles, characteristics of navigation of the first vehicle, characteristics of navigation of the other vehicles, type of the first vehicle, type of the other vehicles, and current time. At steps 312 and 314 the method branches to coarse mode and fine mode respectively to determine lane information to minimize travel time. At step 318, the method receives the map data of current road segment. The road map data may include traffic restrictions in the road segment at current time. The road map data may be received by means of stored road map data in a database that is updated appropriately about current traffic restrictions obtained from appropriate authorities (road transport authority or department of transport or an appropriate entity based on the country or territory or region), Internet or other appropriate sources of information. The road map data may be stored on a cloud storage, stored in the memory of the server system 104 or any other appropriate computer readable medium accessible to the server system 104 and able to respond appropriately for the queries of the server system 104.

Step 316 is similar to step 212 in FIG. 2. The determination of lane information depends at least on one or more from a list including navigation data of the first vehicle, navigation data of the other vehicles, characteristics of navigation of the first vehicle, characteristics of navigation of the other vehicles, type of the first vehicle, type of the other vehicles, and current time. Step 320 is similar to step 214 in FIG. 2. However at step 320 the method ranks the drivable lanes wherein the drivable lanes are determined based at least on the type of vehicle and the traffic restrictions in the lanes.

The minimum navigation data required to determine whether a change of lane is required may depend on at least one from a list including type of vehicles, navigation data of the vehicles, current time, and characteristics of navigation of the vehicles, and combinations thereof. In a preferred embodiment, a change of lane may be required for the first vehicle to minimize travel time if the other vehicle that is in the same lane and ahead of first vehicle is at least one from a list including currently parked, maneuvering to park, currently stopped, will stop ahead, stopped at blocked lane, broken down vehicle, vehicle stopped or will stop for loading or unloading or for some other reasons, waiting to turn, will turn from a lane in which the first vehicle is moving, a bus frequently stops, garbage collecting truck or other vehicle stops frequently, a vehicle moves slowly (non-limiting example: bicycle, vehicle driven by a learner driver, and slow vehicle in a fast moving motor way), and combinations thereof. These types of stops may be learned by different means including past navigation data of the vehicle (example: past turning location, stopping or parking location in the past, and direction of movement at an intersection), from a navigation device (non-limiting example: built in navigation device, smart phone, and portable navigation device), indication light for turning, turning of the steering or yaw-rate sensor or gyroscope, parking meter reading, road map data (example: loading zone, parking lane, parking location, bus stop, traffic restrictions in lanes), comparing the speed of neighboring vehicles in the same lane and neighboring lanes, current switching cycle of traffic light signal, head direction of a vehicle, comparing a driving maneuver with a known maneuver of the same vehicle or other vehicles, monitoring speed over a predetermined time or distance, and combinations thereof.

In those embodiments that contemplate a scenario where turning is not possible in a segment of a road, determining whether a lane information to change lane is required for the first vehicle to minimize travel time may be based at least on the speed of the first vehicle and speed of at least one other vehicle in another lane in the same side of the road segment. If the first vehicle is in a slow moving lane or in a congested lane the system may determine appropriate lane information. In example (1), if the system receives speed of another vehicle (in a different lane than the first vehicle) that is faster than that of the first vehicle and below the speed limit posted on the road, the system may inform the driver such that a change of lane is required to minimize travel time. In example (2), if the system receives speed of another vehicle (in a different lane than the first vehicle) that is substantially smaller than that of the first vehicle, the system may inform the driver such that to avoid the lane in which the other vehicle is moving. In example (3), if the system receives speed of one or more vehicles in different lanes in the same side of the road segment, the system may determine a faster lane as appropriate. In example (4), if the system receives speed of one or more lanes in the current road segment the system may rank the lanes according to increasing order of travel time. In preferred embodiments, in these non-limiting examples (1) to (4), the system may perform one or more from a list including check the speed of the other vehicle in faster moving lane is below speed limit of the road, speed difference between the first vehicle and a faster moving vehicle is larger than a predetermined threshold, satisfy user preference (non-limiting example preferences are maximum speed set by the user in a road, mode of operation, number of lane changes in a predetermined distance in a road or journey), determine the drivable lanes for the first vehicle in the current road, check for any lane change restrictions, check for any turn restrictions, other appropriate traffic related restrictions at current time, and combinations thereof. Step 322 is the same as the step 216 in FIG. 2.

Figure 4:
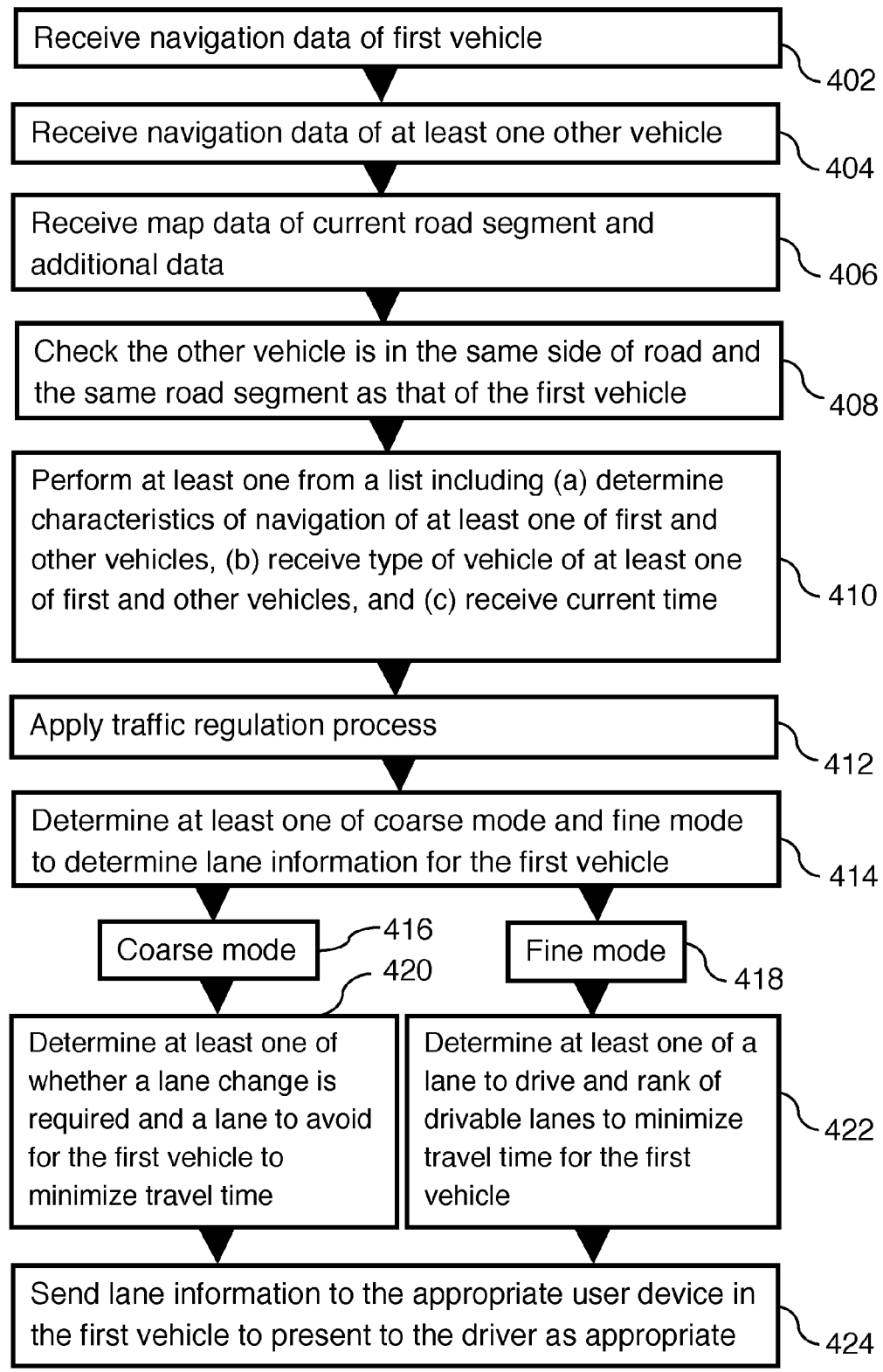
FIG. 4 is a flow chart illustrating a method for determining lane information in at least one of coarse mode and fine mode for a first vehicle to minimize travel time according to an embodiment of the invention.

FIG. 4 is a flow chart illustrating a system for determining lane information to drive a first vehicle to minimize travel time in at least one of coarse mode and fine mode according to an exemplary embodiment. Steps 402 and 404 are the same as the steps 202 and 204 in FIG. 2. At step 406, the method receives the map data of the current road segment. In other embodiment, the method also receives appropriate additional data. The traffic condition include past, current and/or future data. Current traffic condition may be obtained from navigation data of all the vehicles in the current road segment. Past traffic condition may be obtained by appropriately processing the navigation data of vehicles that were in the current road segment in the past. The future traffic condition may be obtained by predicting the traffic flow of vehicles based on the current and past speed, trajectory of vehicles in the neighboring road segments. In some exemplary embodiments, the system may apply an appropriate machine learning or pattern recognition algorithm (non-limiting examples include: regression model, artificial neural network, and Bayesian approaches) to predict the traffic in the next road segment or any future road segment of a vehicle's route based at least on the navigation data of vehicles. The route or future road segments of a vehicle may be obtained from an appropriate navigation device or navigation application.

Driver state of a human driver may be obtained from body sensors, one or more visible or infrared cameras mounted inside the vehicle to monitor activity of the driver, and by other appropriate means. Driver state of an autonomous driving system may be obtained from sensors in the vehicle, driving performance of the vehicle, state of the internal subsystems or by other appropriate means.

At step 408, the method checks whether the other vehicle is in the same side of road and same road segment as that of the first vehicle. The system may check whether the other vehicle is in the same side of road in a two-way road segment by means of checking its lane identification number. By way of example only, in an implementation, the lanes may be numbered based on the direction of vehicle movement. In particular, lanes in one side of a road may be given odd numbers and the lanes in the opposite side of the road or opposite direction of movement may be given even numbers (the lanes may be numbered starting from the lanes close to a curb). In some embodiments, the side of road of the other vehicle may be checked by means of comparing direction of movement of the first and the other vehicles. In other embodiments, the direction of vehicle or the side of road in which a vehicle is moving or stopped moving (stopped or parked) may be obtained by means of one or more from a list including past history of navigation data, clique in which a device is a member (different identification numbers may be given to cliques that move in opposite directions for example), by monitoring absolute and relative speed of vehicles over predetermined time or distance, and by measuring the vector displacement (absolute distance and direction of vehicle from the fixed point) of a vehicle with respect to one or more fixed points on a road (or any other appropriate points) over a predetermined time period.

The system may check whether another vehicle is in the same road segment as that of the first vehicle by means of comparing the location coordinates of the other vehicle to the coordinates stored for the current road segment of the first vehicle. For example, for each road segment the system may store a set of coordinate points obtained at an appropriate distance interval at an appropriate computer readable storage medium. To check if another vehicle is in the same road segment as that of the first vehicle, the system may compare the stored coordinate points of the road segment to the coordinate points obtained from the current location of the other vehicle. If the minimum distance is smaller than a predetermined threshold the system may declare that the other vehicle is in the same road segment as that of the first vehicle. In another non-limiting example, depending on the length of the road segment, and distance to the neighboring road segments on other roads, the system may compare the coordinates of the current location of a vehicle to the center coordinates of the road segment instead of comparing with each and every coordinate points of a road segment. In some implementation, the coordinates of the clique leader may be compared to determine whether some or all the members of the clique are in a road segment instead of comparing the coordinates of each and every vehicle's locations. In another embodiment, the system may create a mathematical model such as Kalman filter, particle filter or neural network model to approximately describe the movement of a vehicle to determine the current road segment. This mathematical model may also be used to estimate some of the navigation data including location, speed, acceleration and other appropriate navigation data of a vehicle. To improve accuracy, dead reckoning and map matching may also be used. In exemplary embodiments, the navigation data of the first and other vehicles may represent the navigation data within the current road segment.

Step 410 and 412 are the same as the steps 306 and 308 in FIG. 3. Steps 414 to 424 are the same as the steps 310 to 314, 316, 320 and 322 in FIG. 3. However, at steps 414, 420, and 422 the method further depends on one or more of additional data including the road map data. At step 420 the method determines lane information for the first vehicle such that to inform the driver of the first vehicle at least one of (a) whether a change of lane is required and (b) a lane to avoid driving in the current road segment to minimize travel time. Depending on the available data, user preference and other conditions, the method may determine lane information (a) and/or (b). For example, if a driver prefers to receive an alert message to change lane if there is an obstruction ahead, the system may provide an alert appropriately. In another example, if a user prefers to receive some form of indication (non-limiting example: visual, sound or tactile haptic) which lane to avoid driving to minimize travel time based at least on the presence of some obstruction in the road ahead or speed of vehicles in each lanes or based on the past history of traffic information in each lane. These user preferences may be stored by means of a database or in a file or any other appropriate form in at least one of user device, leader of the clique, server system or an external computer readable storage medium.

At step 422 the system may determine at least one of (c) an optimum lane to drive in the current road segment to minimize travel time for the first vehicle and (d) rank order of drivable lanes in increasing order of travel time. Depending on the available data, user preference and other conditions, the system may determine lane information (c) and/or (d). In determining lane information, the system may use one or more data from the following: navigation data of the first vehicle, navigation data of the other vehicle, weather data, road condition, surrounding data, traffic light switching cycle and switching period, events in the area, and driver state. The determined lane information may be sent to the user device via the leader of the clique in which the first vehicle is a member or directly to the user device by means of an appropriate communication medium (non-limiting examples: cellular network, IP network, and Wi-Fi network). In some exemplary embodiments, the determination of lane information one of (a) to (d) may further include, past history of one or more of the following: weather data, surrounding conditions, events in the area, road condition, and other appropriate history of data.

For example, and without limitation thereto, depending on the available data, user preference and other conditions, the method may determine lane information. In determining a mode and determining lane information the method may use one or more data from the following: navigation data of the first and/or other vehicles, characteristics of navigation of first and/or other vehicles, type of first and/or other vehicles, road map data, current time, weather data, road condition, surrounding data, traffic light switching cycle and switching period, events in the area (include sports events, cultural events, or any other events), driver state, and combinations thereof.

In a non-limiting example, if there is a sports event, any cultural program, movie show, or some other events, some of the lanes may be congested at certain times of days. In particular, when a sports event finishes or a movie shows ends there may be heavy flow of vehicles trying to enter a road or merge to a motor way. This may cause congestion, or delay in one or more lanes in one or more road segments. This may be learned from the past history of traffic condition based on the navigation data of past history of the vehicles in a road segment and the time of events taking place from the Internet or from appropriate sources such as websites of movie theatres, websites of sports events, and websites of special events appropriately. Special events may also be learned from manual user input.

If a user prefers to receive lane information for certain location, time or route in certain mode of operation he/she may change the settings in the lane determination program through an appropriate user interface (graphical or text based or any other appropriate interface).

Figure 5:
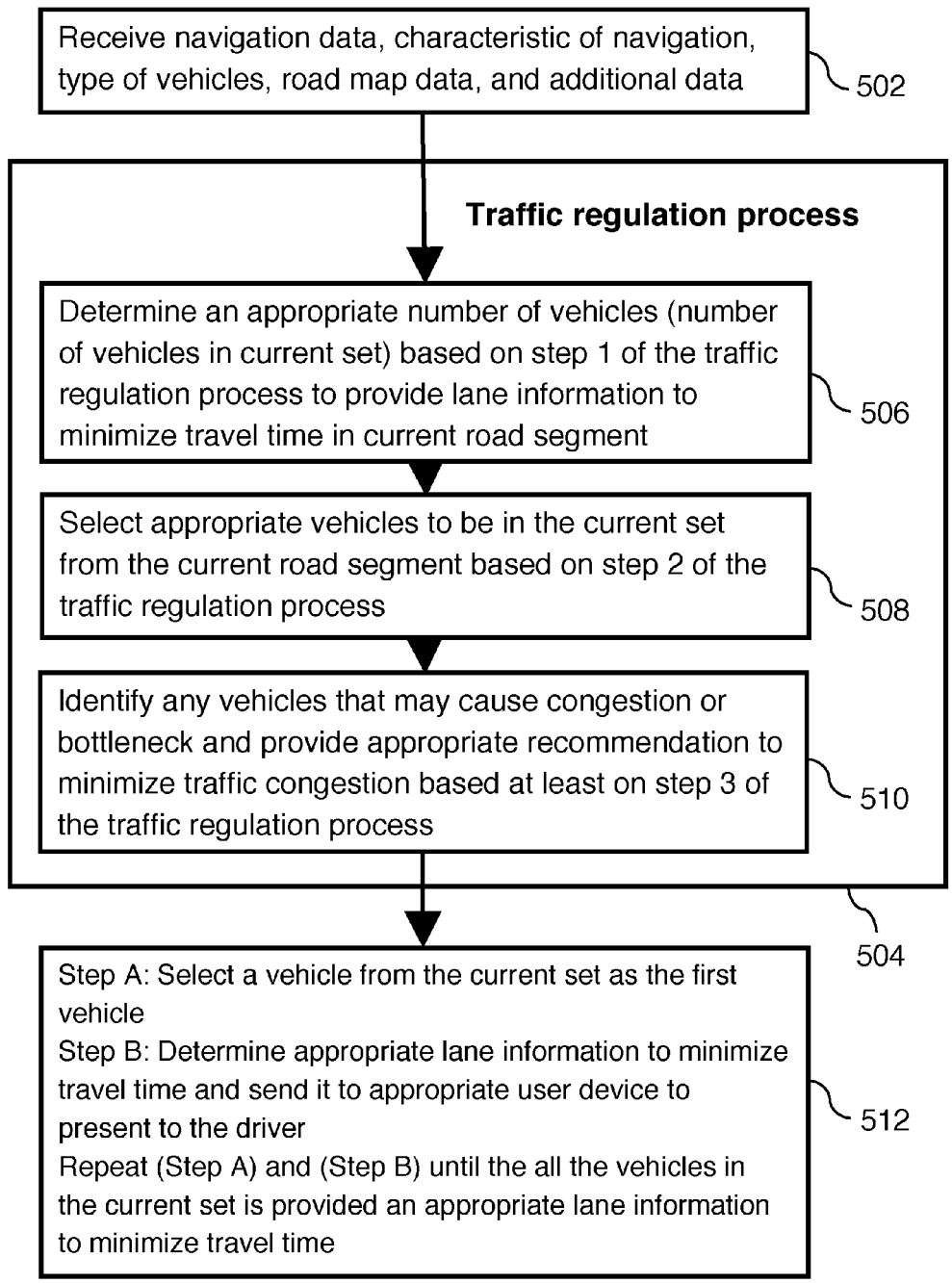
FIG. 5 is a flow chart illustrating a method for determining lane information in at least one of coarse mode and fine mode for one or more vehicles to minimize travel time with steps illustrating the traffic regulation process to minimize traffic or oscillation of traffic according to an embodiment of the invention.

FIG. 5 is a flow chart illustrating a system for determining lane information to drive a first vehicle to minimize travel time in at least one of coarse mode and fine mode according to a preferred embodiment. In particular, the flow chart gives a detailed illustration of the traffic regulation process that appears at step 308 in FIG. 3 and at step 412 in FIG. 4. Step 502 may be the same as combined steps 302 to 306 in FIG. 3 or steps 402 to 410 in FIG. 4. In some embodiments, the step 504 may receive one or more data from a list including navigation data of first and/or other vehicle, characteristics of navigation of first and/or other vehicle, type of vehicle of first and/or other vehicle, current time, road map data, appropriate additional data, and combinations thereof. Step 504 (traffic regulation process) is the same as the step 308 or step 412 in FIG. 3 and FIG. 4 respectively. In an embodiment, the system may comprise one or more of the following steps: 506, 508, 510, and combinations thereof. In another embodiment, if the traffic regulation process only has step 506 (determines the number of vehicles in the current set to provide lane information to minimize travel time), the lane determination method may select the appropriate vehicles or select vehicles randomly. In yet another embodiment, the traffic regulation process may only have steps 506 and 508. In a further embodiment, the traffic regulation process may have all three steps 506, 508, and 510 or some additional steps appropriate for minimizing traffic congestion to minimize travel time for vehicles.

At step 506, the method determines the appropriate number of vehicles to be in the current set of vehicles based on step 1 of traffic regulation process as described in a previous section. In an implementation, the number of vehicles in the current set may depend on one or more from the following: speed difference between the lanes, vehicle density difference between lanes, navigation data of vehicles, characteristics of navigation of the vehicles, type of vehicles, road map data, and appropriate additional data. At step 508, the method chooses the particular vehicles to be in the current set as described in step 2 of traffic regulation process. In an embodiment, the vehicles to include in the current set may be chosen by one of the following methods: round robin selection, random selection, vehicles that minimize traffic congestion, the best vehicles to minimize travel time, or some appropriate methods. At step 510, the method identifies the vehicles that cause a bottleneck or congestion or any obstruction in current road segment and provide appropriate instructions such as speed up for a slow moving vehicle, instructions to clear from an illegal stopping or parking of a vehicle, instructions to reduce gap between the vehicle ahead if the vehicle behind overflows from a dedicated turning lane and blocks other vehicles, a driver who do not notice the change of a traffic signal from red to green signal while waiting at the an intersection, and other appropriate instructions to minimize delay for vehicles or minimize obstruction in a road segment. Identification of vehicles that cause traffic congestion or create bottleneck may be performed based on step 3 of traffic regulation process. Step 512 performs two steps (step A and step B) such that to determine appropriate lane information to minimise travel time for all the vehicles in the current set to minimize travel time and send it to appropriate user device to present to the driver. Step A selects appropriate vehicle as the first vehicle from the current set in each iteration to determine lane information. Step B may be one from a list including (a) steps 206 to 216 in FIG. 2, (b) steps 310 to 322 in FIG. 3, and (c) steps 414 to 424 in FIG. 4.

Figure 6:
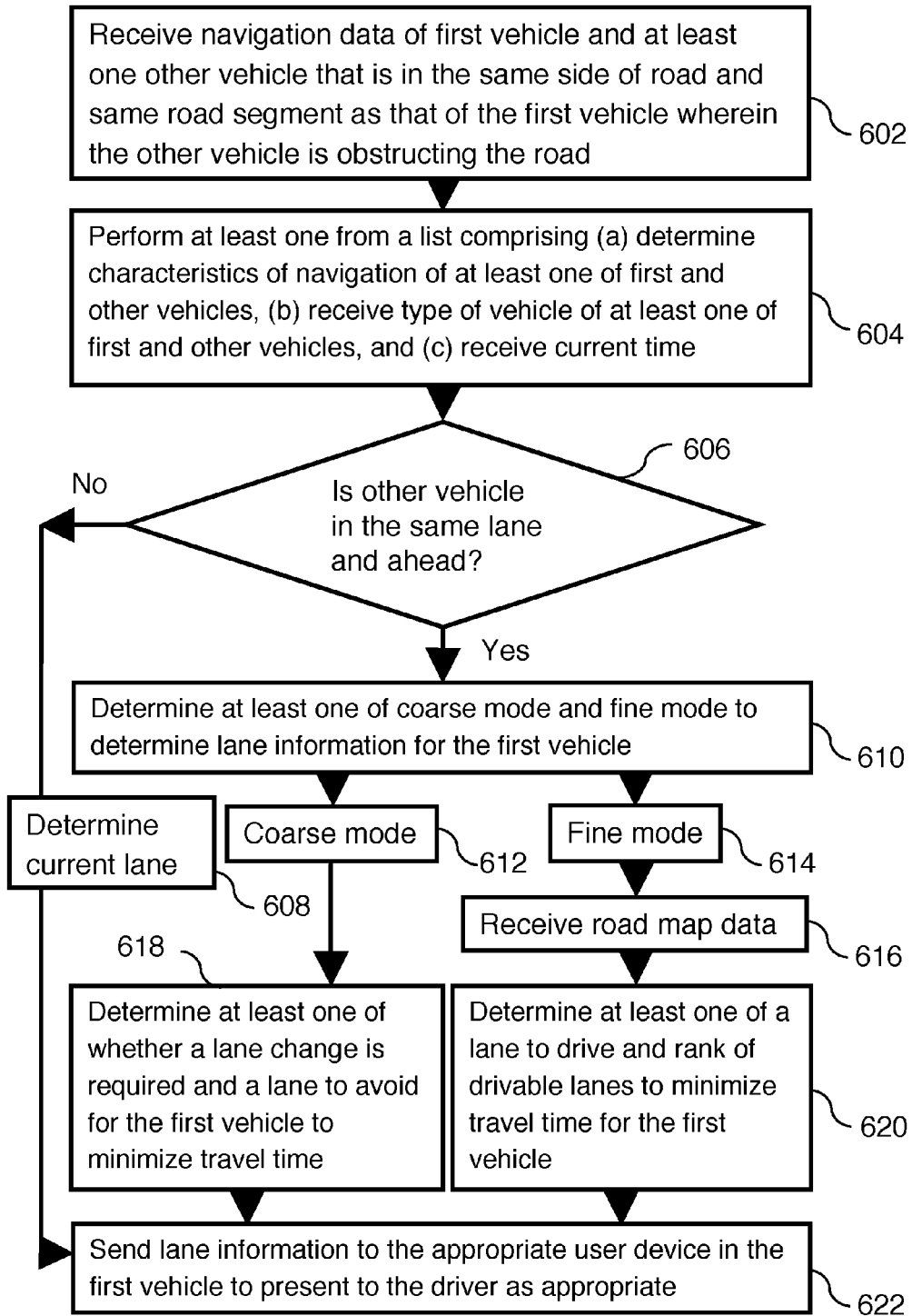
FIG. 6 is a flow chart illustrating a method for determining lane information in at least one of coarse mode and fine mode for a first vehicle to minimize travel time if there is an obstructing vehicle in the road segment, according to an embodiment of the invention.

FIG. 6 is a flow chart illustrating a system for determining lane information to drive a first vehicle to minimize travel time in at least one of coarse mode and fine mode according to some exemplary embodiment. Step 602 is the same as the combined steps 302 and 304 in FIG. 3 except the other vehicle is an obstructing vehicle. Step 604 is the same as the step 306 in FIG. 3. At step 606 the method checks whether the other obstructing vehicle is in the same lane and ahead of the first vehicle in the road segment. If the other obstructing vehicle is not in the same lane and ahead of the first vehicle in the road segment (NO), at step 608, the method determines the current lane or an appropriate lane in the current road segment for the first vehicle depending at least on at least one of navigation data, navigation characteristics, type of vehicles, current time, user preference, road condition, weather condition, and surrounding conditions. User preference may include the preferred lane, user's preference on lane change based on the type of obstruction, estimated time saved above a threshold set by the user, and number of lane changes in a road or in a journey. If the other obstructing vehicle is in the same lane and ahead of the first vehicle in the road segment (YES), at step 610 the method determines one of coarse mode and fine mode based at least on the available data (example: amount of navigation data, details of road map data, and other appropriate data). Further, the determination of a mode of operation may be based at least on one or more from a list including navigation data of a first and/or other vehicle, characteristics of navigation of a first and/or other vehicle, type of vehicle of a first and/or other vehicle, and/or current time. Steps 610 to 622 are the same as steps 310 to 322.

Figure 7:
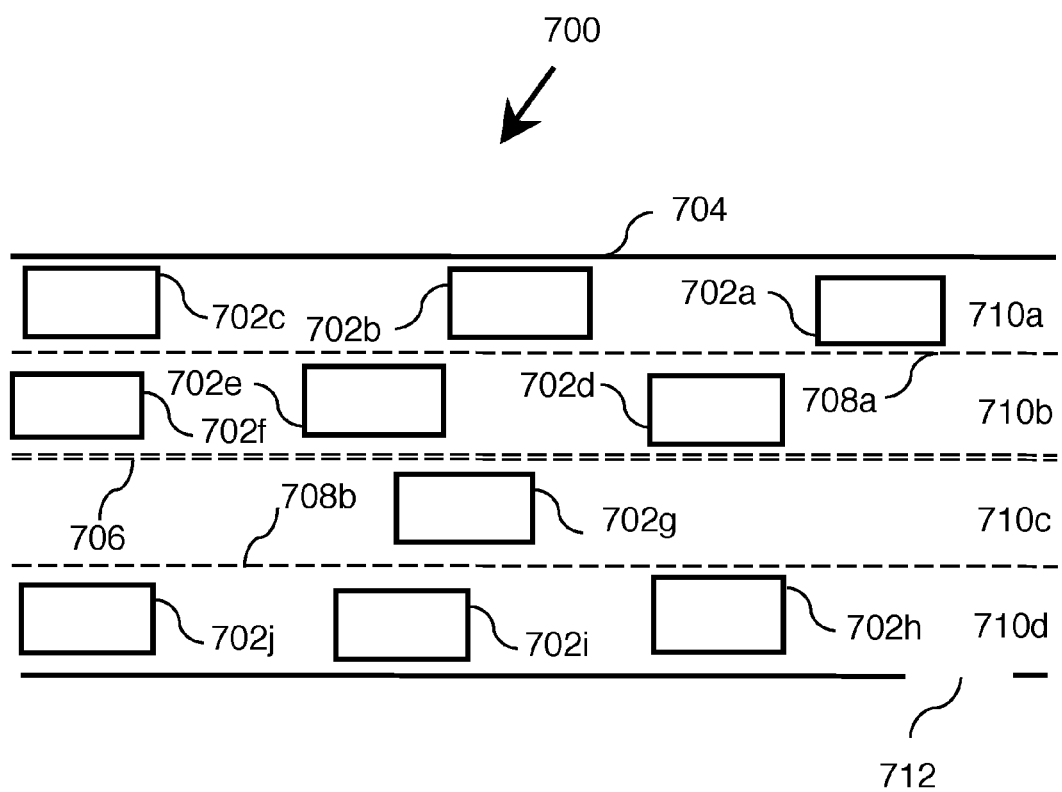
FIG. 7 is a schematic diagram of a road segment and drivers with user devices in vehicles wherein at least one vehicle is one from a list including stopped moving vehicle, parked vehicle, vehicle stops frequently, vehicle moves slowly, and bicycle.

FIG. 7 illustrates an example schematic diagram of a road segment 700. Drivers (users) 702a-702j are currently in the example road segment in vehicles as shown. The rectangular blocks 702a to 702j denote drivers who have computing devices (user device) in the road segment. In this example, only the drivers of the vehicles are shown however, passengers with devices may also be in the vehicles. In some embodiments, the drivers of the vehicles are presented the determined lane information for the vehicle to minimize travel time by the server system and the passengers may not be presented the determined lane information. However, users who are not drivers may update navigation data and other related data to the server system manually or automatically. These users may include any road users travelling on bicycles, motor cycles or vehicles including private or public transport systems, and pedestrians.

An application program may be installed in a user device and appropriately configured such that the device provides features including appropriate processing of data, data communication, user interface for the user to provide navigation data to the server system, and appropriate interface to present the lane information determined by the system for minimizing travel time for the vehicle. The determined lane may be provided to a human driver and/or an autonomous driving system. The application program and the appropriate configuration allow a user device to communicate to the server system over a communication network 106. The users 702a to 702f travel in one direction (left to right), the users 702g to 702j travel in the opposite direction (right to left) in the example road 704. Double dashed line 706 indicates the separating marking on the road to indicate the two opposite sides of travel on the road 704. The single dashed lines 708a and 708b indicate the lane markings on the road 704. The road markings are marked with dashed lines however, it will be appreciated that these road markings may depend on the type of road, region, territory, and country. The two lanes 710a and 710b are for moving left to right direction, and the lanes 710c and 710d are for moving from right to left direction. A driveway is marked as 712 and this drive way may lead to a house, private parking, public parking or any other appropriate place.

In preferred embodiments of the invention, if the vehicle 702a is parked or stopped moving in the road side, the lane determination system may inform the drivers of the vehicles 702b and 702c about the determined lane information which is at least one of: avoid driving in lane 710a, go to lane 710b.

The lane determination system may inform the drivers at appropriate distance to change lane to minimize travel time. The system may also consider road rules when determining lane information to minimize travel time. In one example, the system may require the location of vehicle 702a, location and lane of vehicle 702b to determine lane information. In another example, the system requires the location of the other vehicle 702a (that is parked) relative to first vehicle 702b and also map data indicating lane dedicated for parking at current time. The map data may be obtained from the Internet or appropriate map database.

In an embodiment where a road segment is sufficiently short (example: 200 meters or 300 meters), the current lane of the vehicle 702a and relative location (whether the vehicle 702a is ahead of the vehicle 702b) may be enough to inform the driver of vehicle to avoid lane 710a. If the parked vehicle (702a) is ahead of first vehicle (702b) the system may inform the drivers to avoid lane 710a (in which vehicle 702a is parked or stopped). In this case, whether the vehicle is parked or not may be identified from the past history of parking, maneuver of the vehicle, engine turned off, legal parking area in the road and the like.

In some embodiments, the system may also use map data of the road segment 704 to determine the lane 710b to drive. In the above implementations, the system may also use additional data to determine appropriate lane information such as distance between vehicles 702a (other vehicle) and 702b (first vehicle), lane change restrictions, type of vehicles, traffic restrictions in the lanes, and other appropriate data. The other data may include, but is not limited to, weather data, road condition, traffic condition, user preference, surrounding conditions, and driver state. In other preferred embodiments, depending on the distance from 702a (obstructing vehicle) to the vehicles 702b and 702c, the server may determine lane information to the driver of vehicle 702b but not 702c if vehicle 702c is beyond a predetermined distance from 702a. As the vehicles 702d to 702f are in different lane than the obstructing vehicle 702a, the system may determine the current lane (710b) for these vehicles (702d to 402f) to continue driving as appropriate.

In some preferred embodiments of the invention (vehicle 702a is moving), if the lane 710a ends (not shown) within a predetermined distance from vehicle 702a, the system may inform the drivers of vehicles (702a to 702c) that change of lane is required or appropriate lane information to minimize travel time. The lane determination system may inform the drivers of vehicles (702a to 702c) to change lane at an appropriate distance from the location where the lane 710a ends. This distance may depend on factors including, but not limited to, speed of the vehicles (702a to 702c), speed and location of vehicles in neighboring lane (702d to 702f), lane change restrictions, and road condition. For example, the drivers of vehicles 702a to 702c may not be informed at the same time about the determined lane information to minimize travel time rather these drivers may be informed at a predetermined distance from the location where the lane ends or the location of an obstruction.

In some exemplary embodiments of the invention, if all the vehicles in lane 710a are moving and if the vehicle 702d in the lane 710b is indicating to make a right turn (turning of a vehicle may also be learned from the navigation route or past turning location of the vehicle 702d) then, vehicles 702e and 702f may be informed appropriately about the imminent change of lane that is needed or an appropriate lane 710a to move to minimize travel time.

By way of example only, if there is no traffic light signal installed at the location where the vehicle 702d (other vehicle) turns right, if there are no vehicles in the opposite side of the road (lanes 710c and 710d), and the vehicle 702e (first vehicle) is at sufficient distance from vehicle 702d then the system may not inform the driver of 702e to change lane. However, the system may indicate to the driver of vehicle 702e that a vehicle ahead in the lane is making a turn, but does not require any action. If there are vehicles in the opposite side of the road and the vehicle 702d is expected to take more than a predetermined time to complete the turn or move out of the lane 710b, the system may inform the driver of vehicles 702e and 702f about imminent change of lane needed to minimize travel time or to avoid lane 710b or move to lane 710a to continue driving in the road segment 700 to minimize travel time. The expected time to complete or move out of the current lane for vehicle 702d may be determined from the traffic condition in the opposite side of the road, past history of time taken to make the turn, time of day and driver profile. The driver profile may indicate how quickly the driver makes the turn. For example, some drivers are slow in making turn and other drivers are quick in making turn. Determining whether a lane change is required for vehicle 702e (first vehicle) may also depend on the speed of the vehicle 702e also how easy to change lane (non-limiting example: depending on the traffic in adjacent lanes), other conditions such as road map including road rules and current traffic restrictions. In preferred embodiments, a driver may change the preference in the application program to receive lane information at a certain distance from the location of any obstruction that is in its current lane.

In preferred embodiments of the invention, if the vehicle 702f is an emergency service vehicle (ambulance or fire service vehicle or emergency rescue vehicle and the like) the drivers of the vehicles 702e and 702d may be informed about the emergency vehicle in the lane behind. The drivers may also be informed at least one of whether a change of lane is needed or an optimum lane to minimize travel time. In this example the system may determine the vehicles 702d and 702e to move to lane 710a so that the emergency vehicle moves without delay.

In alternative embodiments of the present invention, in some example road segment, if lane 710a is dedicated only for parking, the data about the parked vehicles 702a to 702c may not be communicated to the drivers of the vehicles 702d to 702f. In an implementation, the system may inform the drivers of vehicles 702d to 702f that the lane 710a is not drivable with the determined lane information. By way of example only, the system may determine lane 710b as the appropriate lane to drive in the road segment 700 and lane 710a is not drivable. If the lane is dedicated only for parking or stopping then the lane marking 708a may be appropriately be marked according road rules of the state, territory or country (for example: lane marking 708a may be a continuous line or parking bays may be marked as appropriate depending on the type of parking—parking parallel to the road, 45 degree angle parking, and right angle parking). If lane 710a is dedicated only for parking, the determination of lane information for the vehicles that move straight in lane 710b in the road segment 700 may not be affected by any vehicles parked in the lane 710a. In some exemplary embodiments of the present invention, the system may not take the following into account when determining lane information including vehicles parked or stopped in lanes dedicated only for parking, vehicles parked in an added extra lane in a road segment intended only for temporary stopping or parking, vehicles that are off road (not designated for normal driving), vehicles in lanes intended only for particular types of vehicles (bus, tram, bicycle, and taxi) if the first vehicle is not one of allowed type.

In an exemplary embodiment of the invention, if lane 710a is a dedicated lane (dedicated for bus, taxi or any other type of public vehicle) for a certain period of time in a day, the lane determination system may determine an appropriate lane for a first vehicle in the road segment accommodating the time dependent traffic restrictions in the road segment and type of the first vehicle for which the lane information is determined to minimize travel time.

In other exemplary embodiments of the invention, if at least one other vehicle that is either waiting or moving towards the location where it will make a turn, is in the same lane as that of a first vehicle and ahead of it, then the determination of lane information for the first vehicle to minimize travel time may depend on one or more parameters from a list including distance between the two vehicles, time for the first vehicle to reach the turning location of the other vehicle, estimated time for the other vehicle to complete turning or to move out of the lane in which the first vehicle is moving, navigation route of the first vehicle in the road segment, and combinations thereof. The estimated time for the first vehicle to complete the turning may be obtained from the past history of time taken in a similar traffic condition or from the traffic light switching cycle and switching period, and traffic in the opposite direction of travel in the road segment.

In a non-limiting example, if the other vehicle is waiting to make a turn is at a distance such that it will complete the turn without causing any delay to the first vehicle, then a change of lane may not be required for the first vehicle. The information about whether the other vehicle will turn ahead and the location of turning may be learned from a navigation device in the other vehicle, user input, past history of location where the vehicle turned, detection of turn indicator light on or from some other appropriate way.

Figure 8:
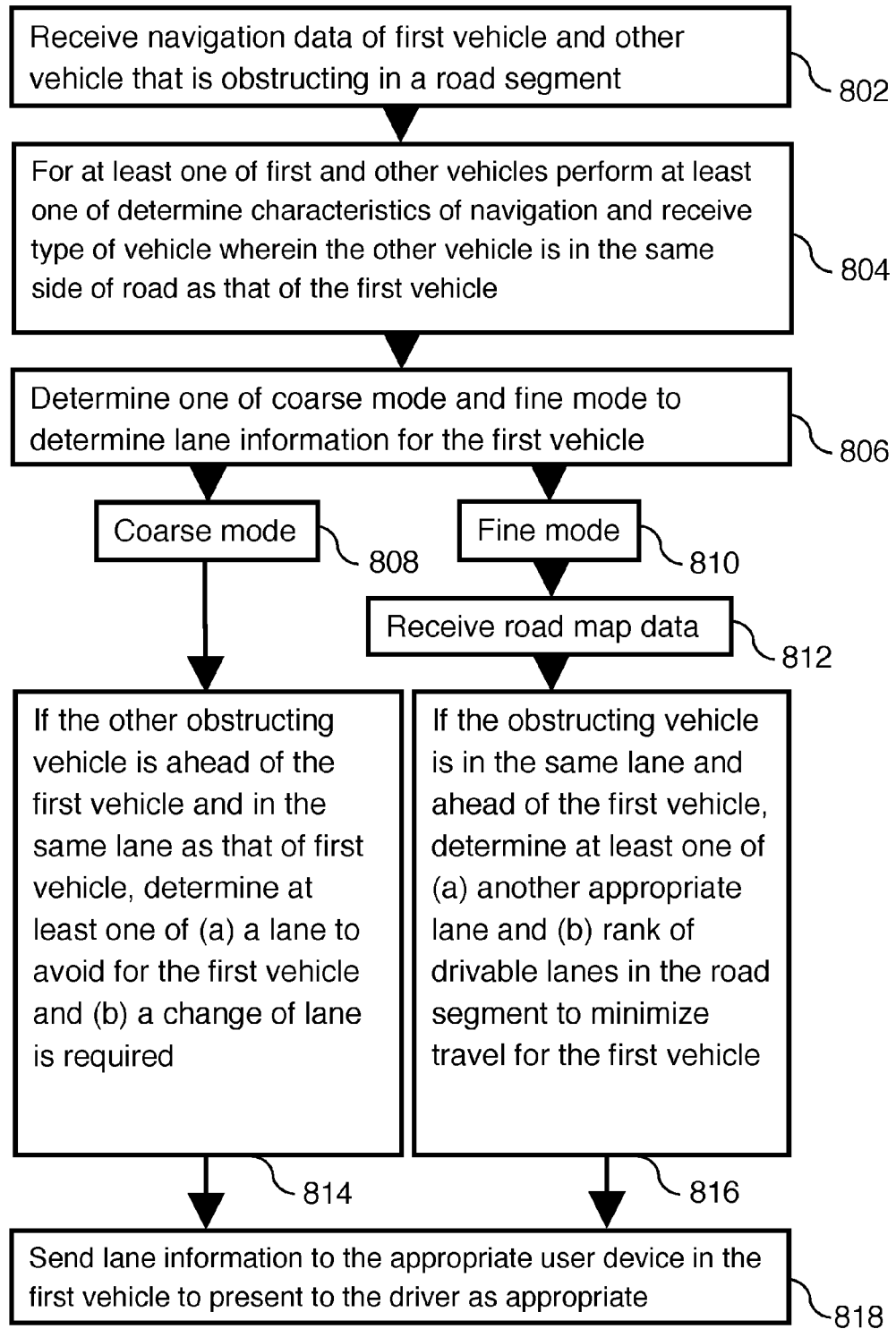
FIG. 8 is a flow chart illustrating a method for determining lane information for a first vehicle to minimize travel time based at least on navigation data of the first and at least one other vehicle obstructing in the road segment, according to an embodiment of the invention.

FIG. 8 is a flow chart illustrating a method for determining lane information for a first vehicle to minimize travel time according to an exemplary embodiment. The flowchart illustrated in FIG. 8 may be described with reference to the schematic illustration shown in FIG. 7. For example, if vehicle 702a (other vehicle) is one of the following vehicle from a list including a bus that stops frequently, a garbage collecting truck that stops frequently, any other vehicle that stops frequently, a slow moving vehicle, a bicycle, a long heavy vehicle that does not pick up speed quickly, and a vehicle driven by learner driver, the system may determine an appropriate lane (710b) for the vehicle 702b (first vehicle). At step 802, the method may receive navigation data of first vehicle 702b and other vehicle 702a wherein, the other vehicle may be an obstructing vehicle. At step 804, the method performs at least one of (a) determine characteristics of navigation of at least one of vehicle 702a and vehicle 702b, and (b) receive type of vehicle of at least one of vehicle 702a and vehicle 702b.

At step 806, the method determines at least one of coarse mode and fine mode to determine lane information to minimize travel time for the first vehicle 702b based at least on the one or more from a list including navigation data of vehicle 702a, navigation data of vehicle 702b, navigation characteristics of vehicle 702a, navigation characteristics of vehicle 702b, type of vehicle 702a, and type of vehicle 702b. At steps 808 and 810, the method branches to coarse mode and fine mode of operation respectively. At step 812, the method may receive map data of the road segment 700. The road map data may include, but is not limited to, road layout, lane marking, current turn restrictions, current lane change restrictions, presence of traffic light, number of lanes, types of lanes, current speed limit, time dependent traffic restrictions, information on the road sign boards, information on the road markings, and any other traffic related restrictions.

At step 814, the method determines appropriate lane information for vehicle 702b to minimize travel time in coarse mode. The determined lane information is at least one of a change of lane from lane 710a is required and avoid driving in lane 710a because of the obstructing vehicle 702a. At step 816, the method determines appropriate lane information for vehicle 702b to minimize travel time in fine mode. The determined lane information is at least one of an appropriate lane 710b to drive in road segment 700 to minimize travel time and rank order of drivable lanes according to increasing order of travel time for vehicle 702b.

At step 818, the determined lane information may be presented to at least one of a human driver in an appropriate method (such as visual, audio, haptic, multimedia, and other appropriate form) and an autonomous driving system of a vehicle as appropriate. According to some embodiments of the present invention, the length of a road segment may vary depending on traffic condition, location, time of day, type of road, location of the vehicle, and other appropriate conditions (for example: weather condition, road condition, and road layout). In other exemplary embodiments, the method may also receive current time, road map data, weather condition, road condition, traffic data, surrounding condition, driver state, and driver preference at step 804 or at an appropriate step. This data may be appropriately used for determining a mode of operation and for determining lane information for the first vehicle to minimise travel time.

Figure 9:
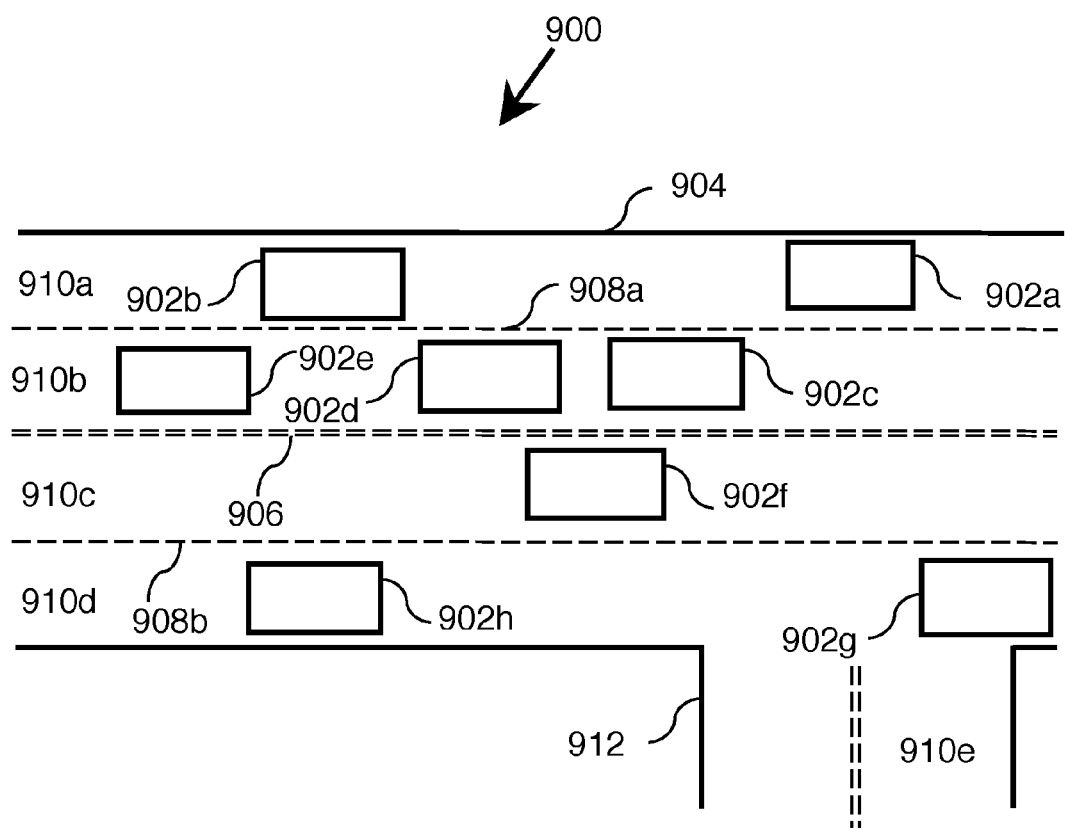
FIG. 9 illustrates a schematic diagram of a road segment and drivers with user devices in vehicles wherein at least one other vehicle is either waiting or moving towards the location where it will make a turn, according to an embodiment of the invention.

FIG. 9 illustrates an example schematic diagram of a road segment 900. The rectangular blocks 902a to 902h denote the drivers (users) with an appropriate device in the road segment 900. In this example, only the drivers of the vehicles are shown however, passengers with devices may also be in the vehicles. The users 902a to 902e move in the left to right direction and the users 902f to 902h move in the right to left direction on the road 904. Double dashed line 906 indicates the separating marking on the road to indicate the two opposite sides of travel. Single dashed lines 908a and 908b indicate the lane markings on the road 904. The road markings are marked with dashed lines however, it will be appreciated that these road markings may depend on the type of road, region, territory, and country. The two lanes 910a and 910b are for moving left to right direction and the lanes 910c and 910d are for moving in the right to left direction. A portion of a side road 912 which is part of the road segment 900 is also shown. A lane 910e is also marked on road 912. A traffic light signal (not shown) may be present at the intersection.

In preferred embodiments, the vehicle 902c may be currently waiting to turn or moving towards the location where it will turn in the current road segment 900. Turning of vehicle 902c may be learned from user input, indicating to make a right turn, from an appropriate navigation application or navigation device, learned from the navigation route to the intended destination, traffic restrictions learned from the road map data (for example: in some roads one or more lanes are dedicated only for turning vehicles) or by some other appropriate means. In an implementation, the system may inform the driver of the vehicles 902d and 902e about imminent change of lane required to minimize travel time as appropriate. In another implementation, the system may perform the following processing to determine appropriate lane information (a) estimate the time required to for the vehicle 902c to complete the turning maneuver/move out of the lane 910b and (b) calculate the time for vehicle 902d to reach the intersection or location of obstructing vehicle. A lane change is required if vehicle 902d reaches the intersection before the estimated time required for vehicle 902c to complete turning. The estimation of time to complete a turning maneuver may depend on a number of factors including current switching cycle and switching period of the traffic light signal (if traffic signal is present at the intersection), how fast the driver makes a turning maneuver, type of vehicle 902c, number of vehicles ahead to turn, and traffic conditions in lane 910e.

Figure 10:
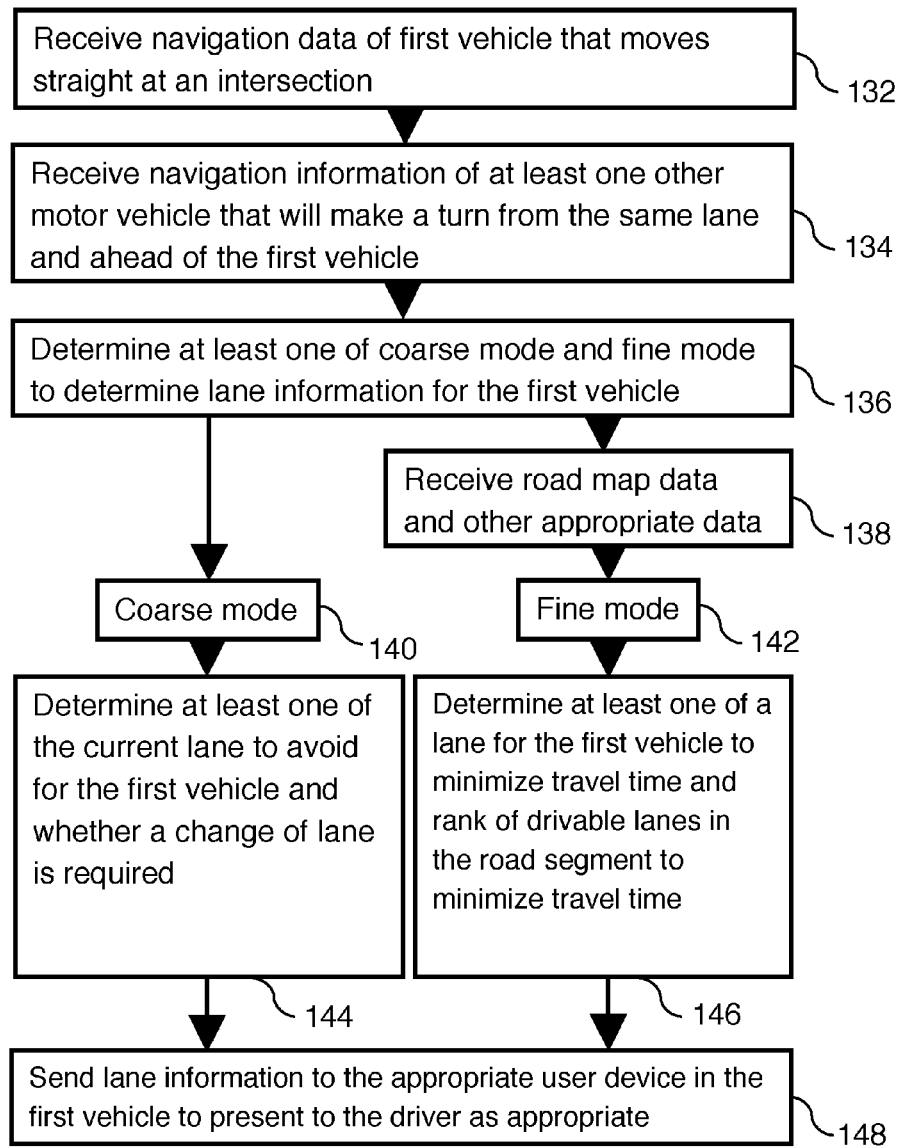
FIG. 10 is a flow chart illustrating a method for determining lane information for a first vehicle to minimize travel time based at least on navigation data of the first and at least one other vehicle that will make a turn, according to an embodiment of the invention.

FIG. 10 is a flow chart illustrating a method for determining lane information for a first vehicle to minimize travel time according to an exemplary embodiment. The flowchart illustrated in FIG. 10 may be described with the schematic illustration shown in FIG. 9. At step 132, the method receives navigation data of first vehicle 902d that moves straight at the intersection. At step 134, the method receives navigation data of other vehicle 902c that will turn right at the intersection. At steps, 136, the method determines at least one of coarse mode and fine mode to determine lane information to minimize travel time for the first vehicle 902d based at least on at least one of navigation data of first vehicle 902d and navigation data of other vehicle 902c. At step 138, the method receives map data of road segment 900 and appropriate additional data. At steps 140 and 142, the method branches to coarse mode and fine mode of operation respectively. At step 144, the method determines appropriate lane information for vehicle 902d to minimize travel time in coarse mode. The determined lane information is at least one of a change of lane is required and avoid driving in lane 910b because of the obstructing vehicle 902c ahead.

At step 146, the method determines appropriate lane information for vehicle 902d to minimize travel time in fine mode. The determined lane information is at least one of an optimum lane (910a) to drive in road segment 900 and rank order of drivable lanes according to increasing order of travel time for vehicle 902d (example rank order may be: 902a, 902b). At step 148, the determined lane information may be presented to the driver.

According to some preferred embodiments, the system may also incorporate information about current switching cycle and switching period of the traffic light at an intersection in determining lane information. For example, if the traffic signal is red for turning vehicle 902c, green for vehicles moving straight, and if vehicle 902d is moving straight, the system may inform the driver of vehicle 902d to go to lane 910a as appropriate to minimize travel time. In other embodiments, the system may use further information such as time for the first vehicle to reach the intersection and traffic condition in lane 910e. If the traffic light is red for vehicle moving straight and green for vehicles turning right, the system may not inform to change lane or inform to stay in the current lane 910b for vehicle 902d if it is moving straight at the intersection.

In another embodiment, determining lane information for the first vehicle may depend on other factors including traffic condition in other lanes, difficulty of changing lane, distance between the first and the other obstructing vehicle, estimated time to complete the turning maneuver for the other vehicle, speed of the first vehicle, and number of vehicles between the turning vehicle and the first vehicle. In an exemplary embodiment, if the first vehicle also makes the same turn as that of the other vehicle ahead then, the first vehicle may follow the same lane as that of the other vehicle or another lane as appropriate based at least on the map data of the road segment.

In preferred embodiments, the method may also perform at least one from a list including (a) determine characteristics of navigation of at least one of first and other vehicles, (b) receive type of vehicle of at least one of first and other vehicles, (c) receive current time at step 134 or at an appropriate step, and combinations thereof. The method may also receive one or more additional data. This data may be appropriately used for determining a mode of operation and for determining lane information for the first vehicle to minimise travel time in an appropriate mode of operation.

Figure 11:
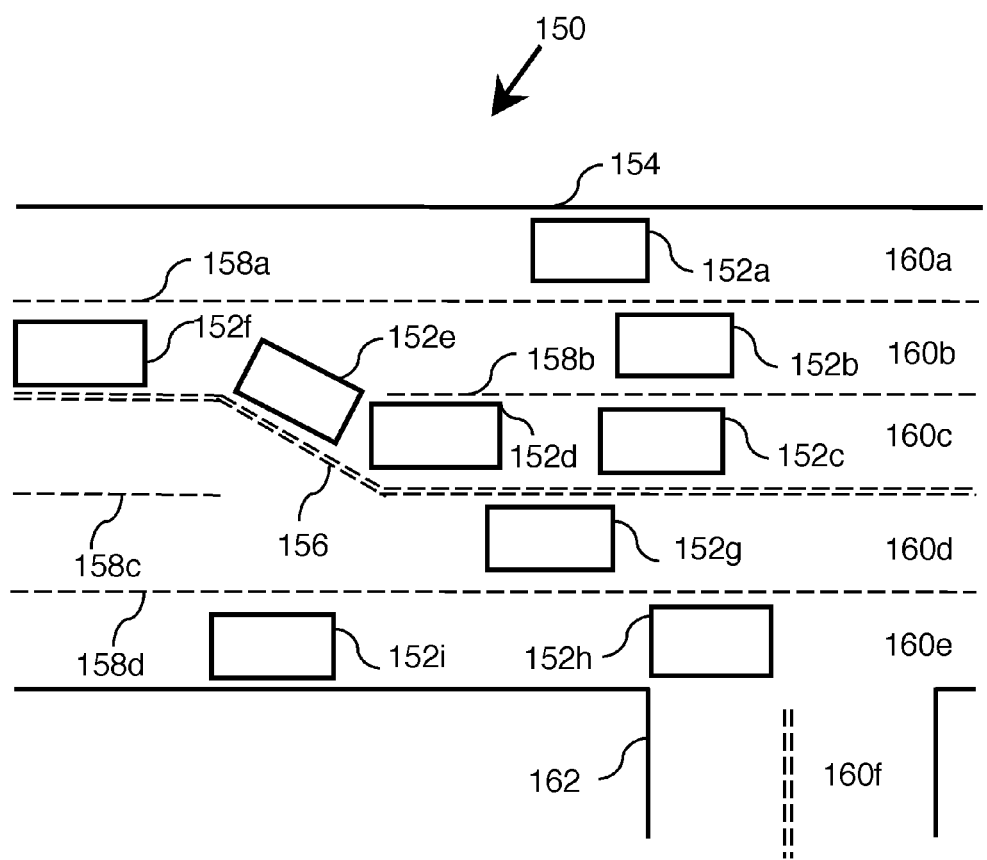
FIG. 11 illustrates a schematic diagram of a road segment and drivers with user devices in vehicles wherein, at least one other vehicle is waiting in a dedicated lane to make a turn, according to an embodiment of the invention.

FIG. 11 illustrates an example schematic diagram of a road segment 150. The rectangular blocks 152a to 152i denote the drivers with an appropriate device in the road segment 150. According to this non-limiting example, only the drivers (users) of the vehicles are shown however, passengers may also be in the vehicles with devices. The users 152a to 152f move in the left to right direction and users 152g to 152i move in the right to left direction on the road 154. Double dashed line 156 indicates the separating marking on the road 154 to indicate the opposite sides of the road 154. The single dashed lines 158a to 158d indicate the lane markings on the road 154. The road markings are marked with dashed lines however, it will be appreciated that these road markings may depend on the type of road, region, territory, and country. The three lanes 160a to 160c are for moving left to right direction, and the lanes 160d and 160e are for moving from the right to left direction. A lane 160f in a side road 162 is also shown. Lane 160c is a dedicated lane for vehicles that turn right to go to road 162. A traffic light signal (not shown) may or may not be present at the intersection.

According to preferred embodiments, the vehicles 152c to 152e may be waiting to make a right turn. The turning of these vehicles may be learned from appropriate navigation application running in the device or from an appropriate navigation device based on the route to the destination. In some embodiments, the turning location may be learned even before the vehicle reaches the intersection. In an alternative embodiment, the server may inform the driver of the vehicle 152f (moves straight at the intersection) about the determined lane information that is at least one from a list including (a) change of lane is required, (b) avoid driving in lane 160b, (c) an appropriate lane (160a as appropriate), and (d) rank order of drivable lanes according to increasing order of travel time for vehicle 152f to minimize travel time (example rank order of drivable lanes may be 160a, 160b).

In another embodiment, the server may estimate the time required for the vehicle 152e to move out of the lane 160b and compare it with the calculated time for vehicle 152f to reach the start of the dedicated turning lane 160c. If vehicle 152f will reach the start of the dedicated turning lane before vehicle 152e moves out of lane 160b the system may inform the driver of vehicle 152f to change lane to minimize travel time. The estimation of time to complete turning or to move fully into the dedicated lane for vehicle 152e may depend on a number of factors including current switching cycle and switching period of the traffic light at the intersection, how fast the drivers (152c to 152e) make a turning maneuver, type of vehicles (vehicle driven by a learner driver, long heavy vehicles may be slow to turn), traffic conditions in lane 160f, number of vehicles ahead to make a turn, the length of the dedicated lane, and a combination thereof.

In those embodiments where there is no traffic light at the intersection, if there are no vehicles in the opposite side of the road the vehicle 152c may make the turning maneuver. If the vehicle 152f is at sufficient distance from vehicle 152e the vehicle 152e may move out of the lane 160b before the vehicle 152f reaches the start of dedicated turning lane. In this case, the system may not inform the driver of vehicle 152f to change lane. However, the system may indicate to the driver of vehicle 152f that vehicles ahead in the current lane are making a turn but does not require to change lane. The system may also inform the driver of 152f about the absence of the traffic light at the intersection and also information about how likely that a lane change is required or other drivable lanes for the vehicle 152*f* to minimize travel time as part of lane information.

Alternatively, if at least one other vehicle will make a turn in a road segment where there is dedicated lane to make a turn, wherein if the dedicated lane does not overflow, the first vehicle that is moving straight at the intersection may not require any change of lane and continue to move in the current lane as appropriate. However, if the dedicate lane overflows and the overflowing vehicle is in the same lane and ahead of the first vehicle then, the server may determine appropriate lane information in at least one of coarse mode and fine mode to minimize travel time. However, if the overflowing vehicle clears from the lane in which the first vehicle is moving without causing any delay for the first vehicle then, a lane change may not be required and the first vehicle may continue to move in the same lane as appropriate. Time to complete the turning for the other vehicle may be estimated from the past history of navigation data at the intersection, current switching cycle and switching period of the traffic light at the intersection, distance from the first vehicle to the other vehicle, speed of first vehicle, driver profile of turning vehicle, and combinations thereof. A driver profile may be created based on the history of normal driving characteristics of a driver over a predetermined time period. In an example a pattern recognition or machine learning algorithm may be used to create driver profile based at least on past history of navigation data.

Figure 12:
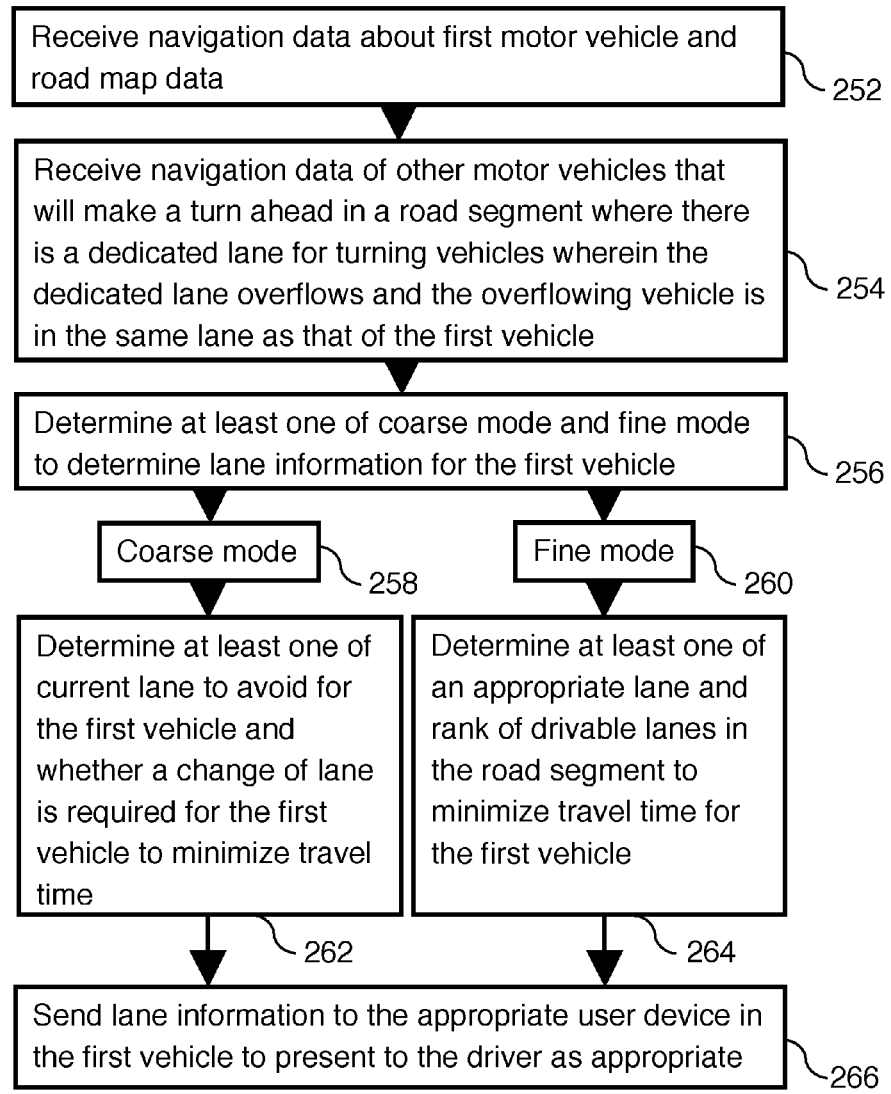
FIG. 12 is a flow chart illustrating a method for determining lane information for a first vehicle to minimize travel time based at least on navigation data of the first and at least one other vehicle is waiting in a dedicated lane to make a turn, according to an embodiment of the invention.

FIG. 12 is a flow chart illustrating a method for determining lane information for a first vehicle to minimize travel time according to some exemplary embodiment. The flowchart illustrated in FIG. 12 may be described with the schematic illustration shown in FIG. 11. For example, if vehicles 152*c* to 152*e* are waiting to turn in a dedicated lane 160*c* for turning and vehicle 152*e* is obstructing the first vehicle 152*f* (moving straight at the intersection) then the method may determine lane information for vehicle 152*f* to minimize travel time. In this example, determination of lane information for vehicles 152*a* and 152*b* may not be affected by the turning vehicles 152*c* to 152*e*.

At step 252, the method may receive navigation data of first vehicle 152*f* that moves straight at the intersection. At step 252, the method may also receive map data of road segment 150 and additional data. At step 254, the method receives navigation data of other vehicle 152*e* to determine whether the vehicle 152*e* is in the same lane and ahead of vehicle 152*f* wherein the other vehicles 152*c* to 152*e* are in a dedicated lane 160*c* waiting for turning right.

At step, 256, the method determines at least one of coarse mode and fine mode to determine lane information to minimize travel time for first vehicle 152*f* based at least on the one or more from a list including navigation data of first vehicle 152*f*, navigation data of other vehicle 152*e*, and road map data. At steps 258 and 260, the method branches to coarse mode and fine mode of operation respectively. At step 262, the method determines appropriate lane information in coarse mode for vehicle 152*f* to minimize travel time. The determined lane information is at least one of a change of lane is required and avoid driving in lane 160*b* in road segment 150 due to the obstructing vehicle 152*e* as appropriate. At step 264, the method determines appropriate lane information for vehicle 152*f* to minimize travel time in fine mode. The determined lane information is at least one of an optimum lane (160*a*) to minimize travel time in road segment 150 and rank order of drivable lanes in road segment 150 according to increasing order of travel time for vehicle 152*f* (example rank of lanes may be: 160*a*, 160*b*). Lane 160*c* is not drivable for vehicle 152*f* as the vehicle is going straight at the intersection. At step 266, the determined lane information may be presented to the driver of vehicle 152*f* as appropriate.

In preferred embodiments, the method may also perform at least one from a list including (a) determine characteristics of navigation of at least one of first and other vehicles, (b) receive type of vehicle of at least one of first and other vehicles, and (c) receive current time at step 254 or at an appropriate step. The method may also receive additional data as appropriate. This data may be appropriately used for determining a mode of operation and/or for determining lane information for the first vehicle to minimise travel time in an appropriate mode.

Figure 13:
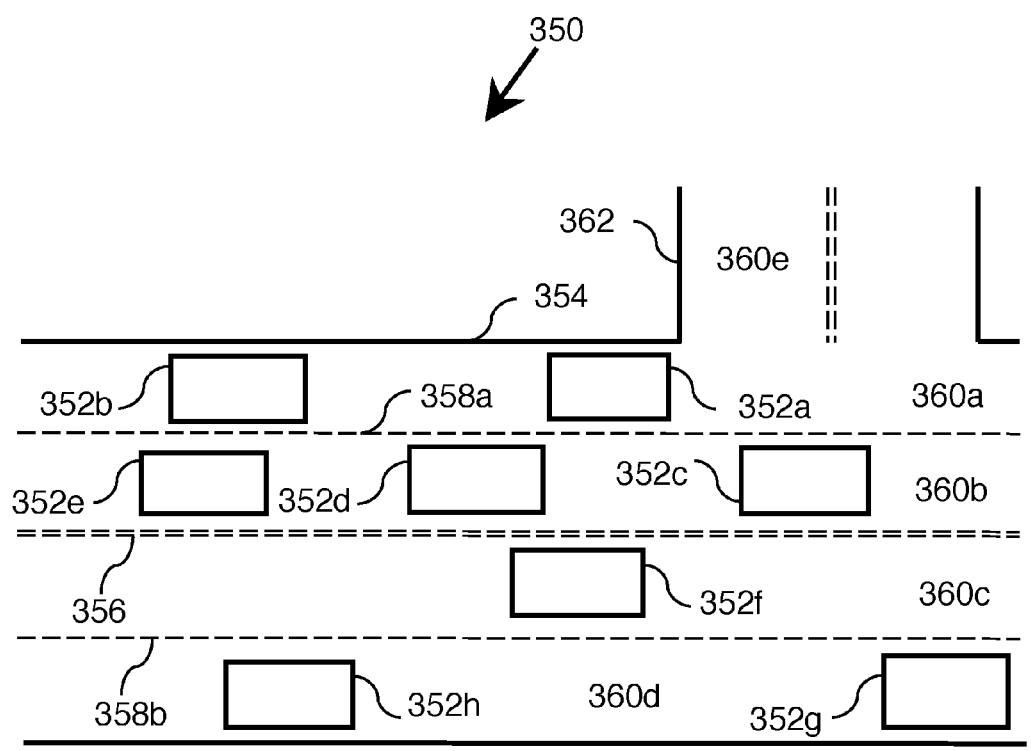
FIG. 13 illustrates a schematic diagram of a road segment and drivers with user devices in vehicles wherein, at least one other vehicle that is either waiting or moving towards the location where it will turn left at an intersection, according to an embodiment of the invention.

FIG. 13 illustrates an example schematic diagram of a road segment 350. The rectangular blocks 352*a* to 352*h* denote drivers with an appropriate device on road 354. According to an embodiment, only the drivers (users) of the vehicles are shown however, passengers may also be in the vehicles with appropriate devices (not shown). Users 352*a* to 352*e* travel in the left to right direction and users 352*f* to 352*h* travel in the right to left direction on the road 354. Double dashed line 356 indicates the separating marking on the road 354 to indicate the opposite directions of travel. The single dashed lines 358*a* and 358*b* indicate the lane markings on the road 354. The road markings are marked with dashed lines however, it will be appreciated that these road markings may depend on the type of road, region, territory, and country. The two lanes 360*a* and 360*b* are for moving left to right direction and the lanes 360*c* and 360*d* are for moving from the right to left direction in road 354. A lane 360*e* in road 362 is also shown. A traffic light signal (not shown) may or may not be present at the intersection.

In preferred embodiments, the vehicles 352*a* may be waiting to make a left turn to go to road 362. In an implementation, the system may inform the driver of the vehicle 352*b* about an imminent lane change or an appropriate lane 360*b* to minimize travel time. In another example, the server may compare the estimated time required for the vehicle 352*a* to complete the turning or to move out of the lane 360*a* and calculated time for the vehicle 352*b* to reach the intersection to determine appropriate lane information to minimize travel time for vehicle 352*b*. A lane change may be required if vehicle 352*b* will reach the intersection before the estimated time required for the vehicle 352*a* to move out of the lane 360*a*.

If the vehicle 352*a* is expected to take more than a predetermined time to complete the turn, the system may inform the driver of vehicle 352*b* to go to lane 360*b*. In an exemplary embodiment, the expected time to complete the turn or move out of the lane 360*a* for vehicle 352*a* may be determined from the traffic condition in the road 362, past history of time taken to make the turn, current time, and driver profile. Determining whether a lane change is required may also depends on the speed of the vehicle 352*b*, distance to the intersection, difficulty of changing lane (non-limiting example: depending on the traffic in adjacent lanes), and other conditions including road conditions and lane change restrictions.

Figure 14:
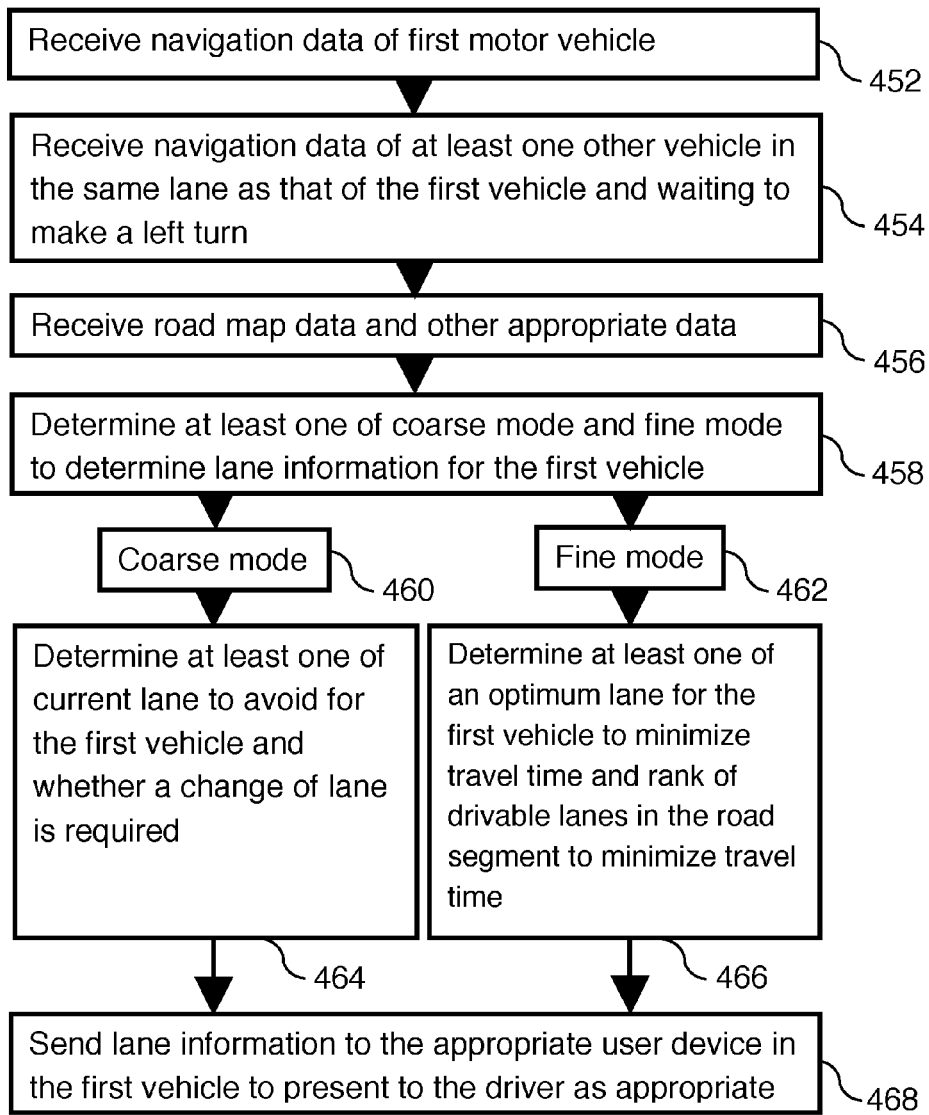
FIG. 14 is a flow chart illustrating a method for determining lane information for a first vehicle to minimize travel time based at least on navigation data of the first and at least one other vehicle that will turn left turn at an intersection, according to an embodiment of the invention.

FIG. 14 is a flow chart illustrating a method for determining lane information for a first vehicle to minimize travel time according to some exemplary embodiment. The flowchart illustrated in FIG. 14 is described with the schematic illustration shown in FIG. 13. For example, if a first vehicle 352*b* is moving straight and another vehicle 352*a* is waiting to turn left, the method may determine appropriate lane information for vehicle 352*b* to minimize travel time. In an embodiment, the determined lane information for vehicles 352c to 352e may not be affected by the turning vehicle 352a.

At step 452, the method receives navigation data of first vehicle 352b that moves straight at the intersection. At step 454, the method receives navigation data of other vehicle 352a that turns left at the intersection. The vehicle 352a is in the same lane and ahead of the first vehicle 352b. At step 456, the method receives map data of road segment 350 and other appropriate data. The other data may include, but not limited to, type of vehicles, current time, and one or more additional data. At steps 458, the method determines at least one of coarse mode and fine mode to determine lane information to minimize travel time for the first vehicle 352b based at least on the one or more from a list including navigation data of first vehicle 352b, navigation data of other vehicle 352a, navigation characteristics of first vehicle 352b, navigation characteristics of other vehicle 352a, type of first vehicle 352b, type of other vehicle 352a, road map data, and other data such as weather condition, road condition, driver state, surrounding conditions and combinations thereof. At steps 460 and 462, the method selects coarse mode and fine mode of operation respectively.

At step 464, the method determines appropriate lane information for vehicle 352b to minimize travel time in coarse mode. The determined lane information is at least one of a change of lane is needed and avoid driving in lane 360a in the road segment 350 due to the obstructing vehicle 352a. At step 466, the method determines appropriate lane information for vehicle 352b to minimize travel time in fine mode. The determined lane information is at least one of an appropriate lane (360b) to drive in road segment 350 to minimize travel time and rank order of drivable lanes in road segment 350 according to increasing order of travel time for vehicle 352b (example rank order may be: 360b and 360a). At step 468, the determined lane information may be presented to the driver via a user device appropriately.

In a preferred embodiment, the method may also perform at least one from a list including (a) determine characteristics of navigation of at least one of first and other vehicles, (b) receive type of vehicle of at least one of first and other vehicles, and (c) receive current time at step 456 or at an appropriate step. This data may be appropriately used for determining a mode of operation and/or for determining lane information for the first vehicle to minimise travel time.

Figure 15:
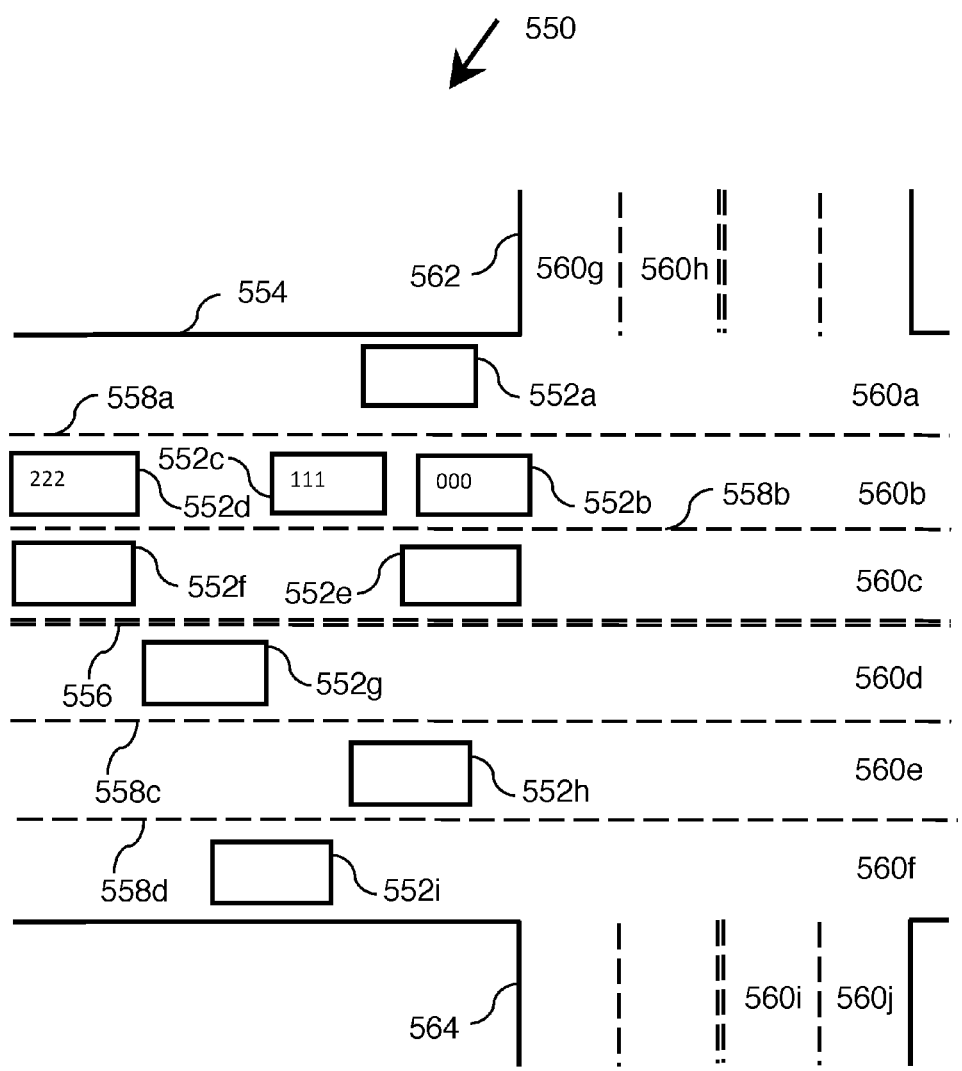
FIG. 15 illustrates a schematic diagram of a road segment and drivers with user devices in vehicles where at least one other vehicle that will go straight or make a turn at an intersection wherein the other vehicle obstructs the first vehicle, according to an embodiment of the invention.

FIG. 15 illustrates an example schematic diagram of a road segment 550. The rectangular blocks 552a to 552i denote drivers with an appropriate device on road 554. In this example, only the drivers of the vehicles are shown however, passengers may also be in the vehicles (not shown). Users 552a to 552f travel from the left to right direction and users 552g to 552i travel from the right to left direction on road 554. Double dashed line 556 indicates the separating line marking on the road to indicate the opposite directions of travel on the road. Single dashed lines 558a to 558d indicate the lane markings in the road 554. The three lanes 560a to 560c are for moving from the left to right direction and lanes 560d to 560f are for moving from the right to left direction. Two roads 562 and 564 are also shown. Two lanes in road 562 are marked as 560g and 560h. Two lanes in road 564 are marked as 560i and 560j. A traffic light signal (not shown) may or may not be present at the intersection.

In a preferred embodiment, the vehicles 552a and 552b may be waiting for a green light signal at the intersection to make a left turn to go to road 562. At this intersection, the lane 560a may be dedicated only for left turn and vehicles in lane 560b may either go straight or turn left. The vehicles 552c and 552d are moving straight at the intersection. In an embodiment, the server may receive data about the current switching cycle and switching period of the traffic light at the intersection to determine a lane for the vehicles. By way of example only, if the traffic light is green for vehicles moving straight and red for the vehicles turning left then, the server may determine that a lane change is required or appropriate lane information in at least one of coarse mode and fine mode for the two vehicles (552c and 552d). The determination of the lane may also depend on other factors including distance from the vehicles (552c and 552d) to the intersection, speed of vehicles (552c and 552d), traffic condition in neighboring lanes, difficulty of changing lane, and lane change restrictions, and the like. In an example, if the vehicle 552c will reach the intersection before the vehicle 552b completes the turn, the system may inform the driver of vehicle 552c to go to lane 560c.

In another example, if the traffic light is green at the same time for both vehicles turning left and moving straight, the server may not inform the drivers of vehicles 552c and 552d to change lane or determine the current lane to continue driving in road segment 550 as the appropriate to minimize travel time. However, if there is traffic in lane 560h and the vehicle 552b is waiting for the traffic to clear or for some other reason, the server may determine to change lane or appropriate lane information for the vehicles 552c and 552d to minimize travel time.

In another embodiment, the server may compare the estimated time required for the vehicle 552b to complete the turn or to move out of the lane 560b and the calculated the time for the vehicle 552c to reach intersection to determine an appropriate lane for vehicle 552c. A lane change may be required if vehicle 552c will reach the intersection before the estimated time required for the vehicle 552b to move out of the lane 560b. The estimation of time to make the turn for vehicle 552b may depend on a number of factors including current switching cycle and switching period of traffic light, how fast the driver makes a turning maneuver, type of vehicle, and number of vehicles ahead to make turn.

In another non-limiting example road segment, if the lane 560c is only for right turn and lane 560b is for vehicles either turning right or going straight at the intersection. Lane 560a is for moving straight or turning left at the intersection. Vehicles 552b and 552e are waiting to make a right turn. Vehicles 552a, 552c and 552d are moving straight at the intersection. In this case, the vehicles 552c and 552d may be informed appropriately about need to change lane to minimize travel time. In another embodiment, the server may use the traffic light switching cycle and switching period to determine an appropriate lane for vehicles 552c and 552d. In yet another implementation, the system may estimate the time required for vehicle 552b to complete the turn and time that will take for the vehicle 552c to reach the intersection to determine the need to change lane to minimize travel time.

In an embodiment, if the vehicle 552b is expected to take more than a predetermined time to complete the right turn, the system may inform the drivers of vehicles 552c and 552d about the need to change lane or appropriate lane information to minimize travel time. In another embodiment, the expected time to complete or move out of the current lane for vehicle 552b may be determined from the traffic condition in road 564, past history of time taken to make the turn, current time of day, and driver profile (user profile). Determining whether a lane change is required may also depends on the speed of the vehicles (552c and 552d), also easiness of changing lane (example: depending on the traffic in adjacent lane 560a for vehicle 552c and 552d), road conditions, and lane change restrictions.

Figure 16:
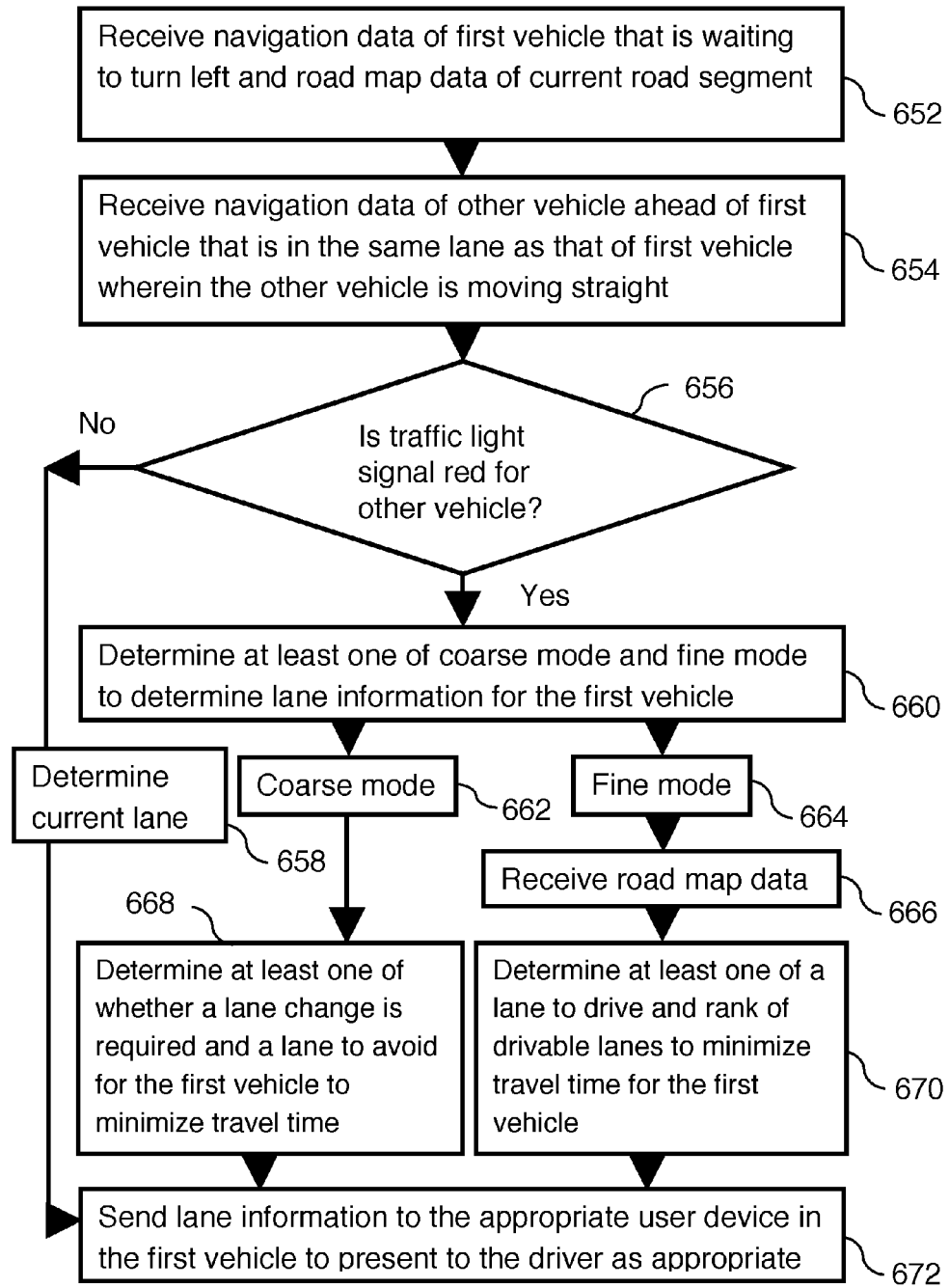
FIG. 16 is a flow chart illustrating a method for determining lane information for a first vehicle to minimize travel time based at least on navigation data of the first and at least one other vehicle that will go straight or make a turn at an intersection, according to an embodiment of the invention.

FIG. 16 is a flow chart illustrating a method for determining lane information for a first vehicle to minimize travel time according to some exemplary embodiment. The flow chart illustrated in FIG. 16 is described with the schematic illustration shown in FIG. 15.

At step 652, the method receives navigation data of first vehicle 552c that is waiting to turn left in the road segment 550. The method may also receive map data of road segment 550 and additional data. At step 654, the method receives navigation data of other vehicle 552b to determine whether the vehicle 552b is in the same lane and ahead of first vehicle 552c wherein the other vehicle 552b is moving straight at the intersection. At step 656, the method checks whether the traffic light signal at the intersection (not shown) is red for the other vehicle 552b to go straight. If the traffic light is green (NO) for vehicle 552b, at step 658, the method determines the current lane for the first vehicle 552c to continue moving as appropriate. If the traffic light is red (YES) for vehicle 552b, at step 660, the method determines at least one of coarse mode and fine mode to determine lane information to minimize travel time for first vehicle 552c. At steps 662 and 664, the method selects coarse mode and fine mode of operation respectively. At step 668, the method determines appropriate lane information for vehicle 552c to minimize travel time in coarse mode. The determined lane information is at least one of a change of lane is needed and avoid driving in the lane 560b in road segment 550 due to the obstructing vehicle 552b ahead.

At step 670, the method determines appropriate lane information for vehicle 552c to minimize travel time in fine mode. The determined lane information is at least one of an appropriate lane 660a to drive in road segment 550 and rank order of drivable lanes in road segment 550 according to increasing order of travel time for vehicle 552c (as a non-limiting example, the rank order may be: 560a, and 560b). As the lane 560c is dedicated only for turning right, this lane is not drivable for the first vehicle 552c in road segment 550. At step 672, the determined lane information may be presented to the driver via an appropriate user device.

In another embodiment, if both (first vehicle and the other vehicle) are in the same lane, the step 670 may also check additional conditions including time for the first vehicle 552c to reach the intersection is greater than the other vehicle 552b to cross the intersection, whether a lane change is allowed, and user preference.

In preferred embodiments, the method may also perform at least one from a list including (a) determine characteristics of navigation of at least one of first and other vehicles, (b) receive type of vehicle of at least one of first and other vehicles, and (c) receive current time at step 654 or at an appropriate step. The method may also receive additional data as appropriate. This data may be appropriately used for determining a mode of operation and/or for determining lane information for the first vehicle to minimise travel time in an appropriate mode of operation.

Figure 17:
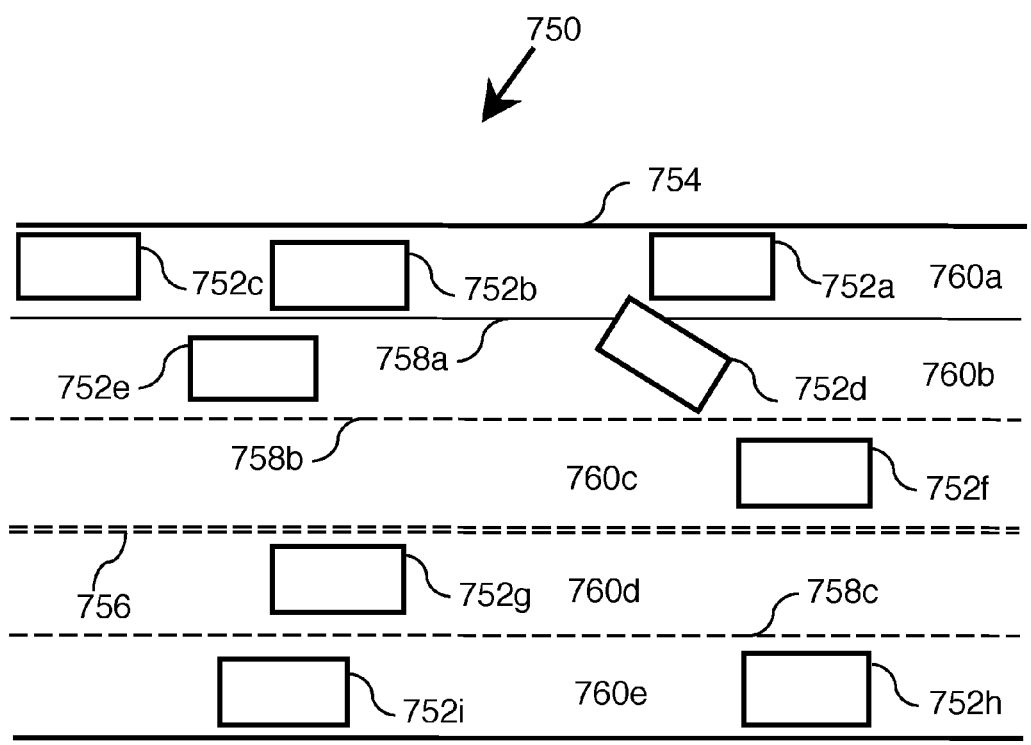
FIG. 17 illustrates a schematic diagram of a road segment and drivers with user devices in vehicles wherein at least one other vehicle is maneuvering to park ahead of first vehicle, according to an embodiment of the invention.

FIG. 17 illustrates an example schematic diagram of a road segment 750. The rectangular blocks 752a to 752i denote drivers with appropriate devices on road 754. In this example, the drivers of the vehicles are shown however, passengers with appropriate devices may also be in the vehicles (not shown). Users 752a to 752f travel in the left to right direction and users 752g to 752i travel in the right to left direction on the road 754. Double dashed lines 756 indicate the opposite sides of travel on the road 754. Lines 758a to 758c indicate the lane markings on the road 754. The three lanes 760a to 760c are for moving left to right direction and the lanes 760d and 760e are for moving right to left direction. The lane 760a is dedicated only for parking or stopping and marked as appropriate with continuous line marking 758a. The road markings may dependent on the state, territory or country.

According to preferred embodiments, the vehicle 752d is maneuvering to park between the two parked vehicles 752a and 752b in lane 760a. Parking of the vehicle 752d may be learned from at least one method from a list including a user input, maneuver of the vehicle during a predetermined time period, from the orientation of the vehicle, and by some other means (non-limiting examples: distance between the destination and where the vehicle is stopped, stopped in legal parking area, user device goes out of drivable area, past history of parking location and time). In an embodiment, the driver of vehicle 752e may be appropriately informed with appropriate lane information including change of lane is required, avoid driving in lane 760b, an appropriate lane 760c to drive and rank order of drivable lanes according to increasing order of travel time (example rank order of drivable lanes is: 760c, and 760b). As lane 760a is dedicated only for parking, the lane 760a may not be a drivable lane for vehicle 752e.

According to other embodiments, if the vehicle 752e will reach the location of vehicle 752d, before vehicle 752d completes parking the system may determine a change of lane is required for vehicle 752e. When determining an appropriate lane for vehicle 752e, the server system may also check the road map data (includes available lanes, lane change restrictions, traffic restrictions at current time for the type of the first vehicle), traffic data, and speed of the vehicle 752e.

By way of example only, if the vehicle 752d completes parking before the vehicle 752e reaches the parking location, the system may determine that a lane change is not required or determine the current lane as the appropriate lane to continue driving in road segment 750. The estimation of time to complete parking for vehicle 752d may depend on a number of factors including past history of time taken to complete parking, time taken to park at the location learned from other drivers or by some other means. Time to reach the parking location for the vehicle 752e may be calculated based at least on the speed of vehicle 752e and the distance to the parking location. In an embodiment, the determination of the lane may also depend on the number of lanes in the street, lane change restrictions, traffic restrictions in each lane, traffic in other lanes, and appropriate additional data.

Figure 18:
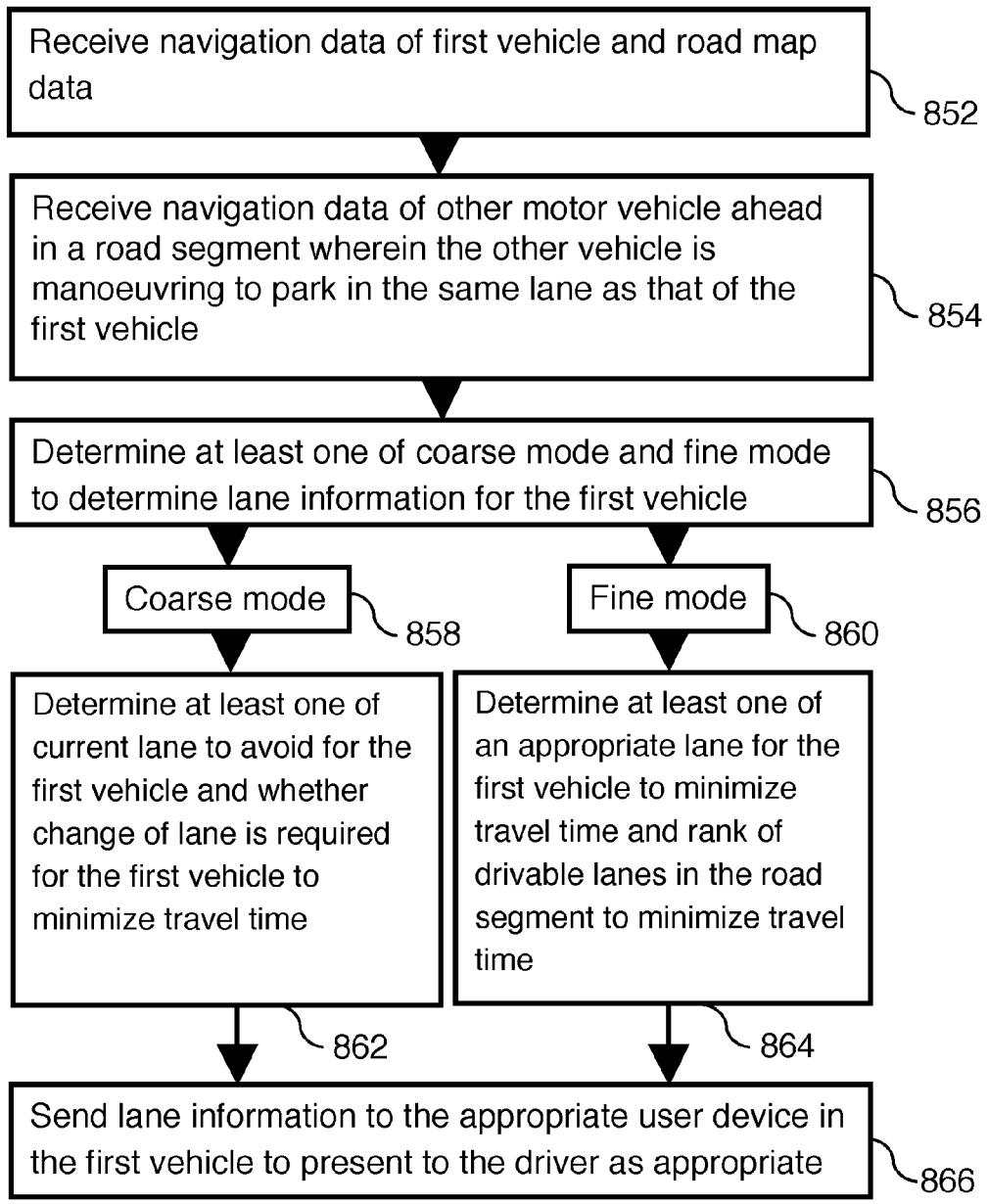
FIG. 18 is a flow chart illustrating a method for determining lane information for a first vehicle to minimize travel time based at least on navigation data of a first and at least one other vehicle that is maneuvering to park in the same road segment, according to an embodiment of the invention.

FIG. 18 is a flow chart illustrating a method for determining lane information for a first vehicle to minimize travel time according to an exemplary embodiment of the invention. The flowchart illustrated in FIG. 18 is described with the schematic illustration shown in FIG. 17. For example, if a first vehicle (752e) is moving straight and another vehicle 752d is maneuvering to park ahead, the method may determine appropriate lane information for vehicle 752e to minimize travel time. In an implementation, the lane determination for vehicle 752f may not be affected by the vehicle 752d maneuvering to park.

At step 852, the method receives navigation data of first vehicle 752e that is moving straight in the road segment 750. The method may also receive map data of road segment 750 and one or more appropriate additional data. At step 854, the method receives navigation data of other vehicle 752d that is maneuvering to park wherein the vehicle 752d in the same lane and ahead of first vehicle 752e. At step 856, the method determines at least one of coarse mode and fine mode to determine lane information to minimize travel time for first vehicle 752e based at least on one or more from a list including navigation data of first vehicle 752e, navigation data of other vehicle 752d, navigation characteristics of first vehicle 752e, navigation characteristics of other vehicle 752d, and road map data. At steps 858 and 860, the method selects coarse mode and fine mode of operations respectively.

At step 862, the method determines appropriate lane information for the first vehicle 752e to minimize travel time in coarse mode. The determined lane information is at least one of a change of lane is required and avoid driving in lane 760b in the current road segment 750 because the obstructing vehicle 752d is estimated to take longer to park. At step 864, the method determines appropriate lane information for vehicle 752e to minimize travel time in fine mode. The determined lane information is at least one of an appropriate lane 760f to drive in road segment 750 and rank order of drivable lanes in road segment 750 according to increasing order of travel time for vehicle 752e (example rank order may be: 760c, and 760b). As the lane 760a is dedicated for parking, this lane is not drivable for the first vehicle 752e. At step 866, the determined lane information may be presented to the driver via an appropriate user device.

In preferred embodiments, the method may also perform at least one from a list including (a) determine characteristics of navigation of at least one of first and other vehicles, (b) receive type of vehicle of at least one of first and other vehicles, and (c) receive current time at step 854 or at an appropriate step. The method may also receive additional data as appropriate. This data may be appropriately used for determining a mode of operation and/or for determining lane information for the first vehicle to minimise travel time in an appropriate mode.

Figure 19:
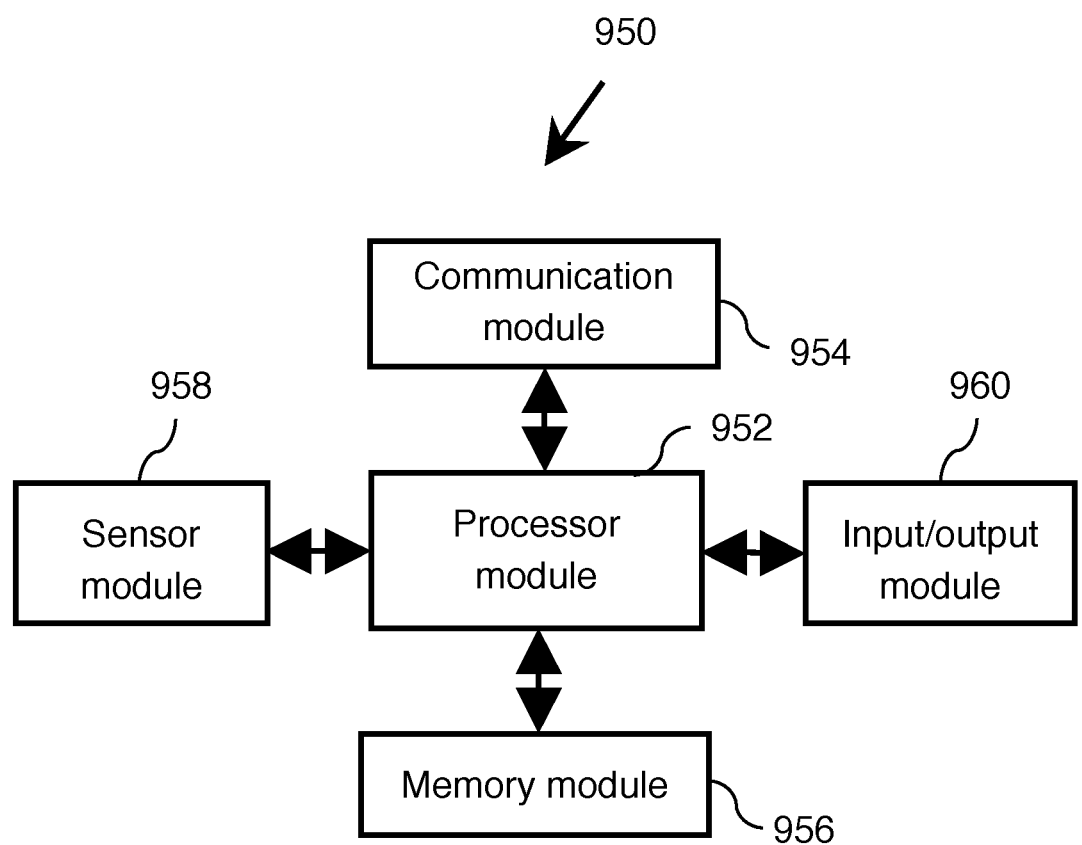
FIG. 19 illustrates a block diagram of a user device according to an embodiment of the invention.

FIG. 19 illustrates block diagram of an example user device 950 including a processor module 952, a communication module 954, a memory module 956, a sensor module 958, and an input/output module 960 in accordance with some exemplary embodiments of the present invention. It will be appreciated that FIG. 19 illustrates example components of a computing device that may be present in a typical user device. FIG. 19 and the description provided are brief and general components of a computing device that may be used as a user device however, various aspects can be implemented on it. The user device 950 may include additional modules such as a power control module (not shown), other hardware modules and software modules as required for the operation of a computing device. An example user device 950 may be a smart phone, tablet, computer, portable device or built-in computer system in a vehicle, although without limitation thereto. Although the example components illustrated in FIG. 19 as separate modules, some of these modules may be built as a single integrated module in the user device 950. Moreover, some of the blocks illustrated in the user device 950 may be built into more than one unit, for example, the input/output module may be made into more than one module such as an input module and an output module. The different modules in the user device 950 may be interconnected through an appropriate bus (data bus not shown) connection which is able to transmit data between different modules in a computing device.

The input/output module 960 is operably connected to processor module 952 for a user to be able to interact with the device 950. The input/output module 960 may be a touch display (smart screen) may act as an input and output module. In other embodiments, the input module is inclusive of a hardware keyboard, software keyboard, a touch pad, pointing device, visual, haptic, gesture based input device or sound based input device, but without limitation thereto. The output module may include a display screen, audio device, haptic device, vibration device, visual output device or the like. A user device may comprise one or more input and one or more output devices.

The sensor module 958 may include plurality of sensing systems including, but not limited to, a camera, a microphone, a positioning system module (for example GPS or other appropriate positioning device), a body sensor, an inertial navigation system including accelerometer and a speedometer. The sensor module 958 is operably connected to processor module 952 to send the data to be processed in the processor and to receive control signals from the processor 952. In preferred embodiments, GPS data may be used by the system to determine the navigation information of a vehicle including current location and speed.

The memory module 956 may include a volatile or non-volatile computer readable storage medium that is able to store such as software programs and data to implement the functionality of the lane determination system. For example, the memory 956 may include Random Access Memory (RAM), Read Only Memory (ROM), flash memory or any other form of long term or short term memory, although without limitation thereto. In some embodiments, the memory may also include hard disk drive, floppy disk drive, tape drive, secure digital (SD) card, digital versatile disc random access memories (DVD-RAM), or any other appropriate form of computer readable storage medium.

The processor module 952 is operably connected to a communication module 954, an input/output module 960, a memory module 956, and a sensor module 958. The processor module may also be connected to other modules/devices (not shown) within a device or connected externally via an appropriate interface. The processor module 952 may include, but not limited to, microprocessor unit, graphical processor unit, digital signal processor or any other appropriate processors that is able to execute computer program instructions on data to produce the expected output. A processor module may include a plurality of components from a list including registers, buffers, control logic, data lines, arithmetic logic unit (ALU), floating-point unit (FPU), and other appropriate components for performing operations including arithmetic, logical, control, input, and output specified by the instructions in a computer program.

In preferred embodiments, the processor may be one or more from a list including single processor, multi processors, single-core, and multi-core processors. The processor 952 may execute machine instructions or computer instructions to produce an output on an output device or send data to a peripheral device interface or other appropriate interfaces. In alternative forms of a user device, a plurality of hardware processors, types of memory, and data busses (not shown) may be present.

In another embodiment, the processor module 952 may receive user input through one or more input devices such as touch screen, audio, visual, keyboard, and other haptic based devices. The processor module 952 may execute instructions that include program instructions stored in memory within the user device, stored externally or transmitted by means of electromagnetic wave. The processor module may perform computations based on the stored instructions (stored internally or externally), user input and other input data (for example: sensor data) to produce an output that may be presented to the user (for example: output may be displayed on screen, audio, and multimedia) or sent to an interface module (for example: network interface, sensor module or other appropriate control module). In an embodiment, the processor module may be implemented as a single chip or multiple chips that may include plurality of digital and analogue processors.

In a user device 950, the processor module 952 is connected to sensor module to receive sensor data. The processor module is also connected to input/output module to receive input and send appropriate output. The processor module is further connected to communication module to establish appropriate wireless connection (for example: Wi-Fi, a peer-to-peer connection such as BLUETOOTH or Wi-Fi Direct, or other appropriate form of connection) to communicate directly or via its leader to the server system 104 via the wireless network or other appropriate communication network 106. Further, the processor is connected to appropriate memory module to store and retrieve data. The user device may be connected to external devices through wired or wireless connection as appropriate.

Communication module 954 may provide the required interface including signal processing (non-limiting examples: analogue and digital signal processing) to communicate to server system 104. User device 950 may communicate through one or more communication technologies including cdma2000, WCDMA, WiMAX, Wi-Fi, Wi-Fi Direct, BLUETOOTH, GPRS, 3G, 4G, LTE, satellite based communication, and other appropriate communication technologies that will be known to an ordinary person skilled in the relevant art. User device may communicate using one or more protocols including Internet Protocol (IP), Transmission Control Protocol (TCP), User Datagram Protocol (UDP), Real-time Transport Protocol (RTP), and any other appropriate protocols.

The user device 950 may include mechanisms to identify the current location of the device. A mechanism that identifies the location of a device may include appropriate software, firmware, and hardware that provides the geographic location of required accuracy at required time interval. A geographic location identification system may include one or more from a list including inertial sensor based system, satellite based navigation system, image (visual image, infrared image or depth image) based localization system, cellular base station transmitting antenna based location identification, wireless access point based location identification system, triangulation localization (localization with three distances to a user device from three known locations), dead reckoning, map matching, and combinations thereof.

The user device 950 may have an operating system such as Windows (by Microsoft), Ubuntu (a Linux based operating system), iOS (by Apple), and Android (by Google). In an alternative embodiment, a user device may be implemented without an operating system however, with appropriate software and hardware appropriately configured to perform the required operations to send navigation data to the server 104, receive lane information, and other appropriate information from the server 104.

The user device 950 may also include hardware and/or software modules including antenna to communicate wirelessly to the Internet, a camera device to capture photo and video, a call managing module may provide the required functionality to make and receive telephone call, short message service (SMS) module to send and receive SMS, a media player module to play multimedia content (for example: music and movie), and an Internet web browser (for example: Firefox and Google Chrome). A user device may also have additional applications installed such as calculator, games, calendar, text editor, and other appropriate application programs.

Figure 20:
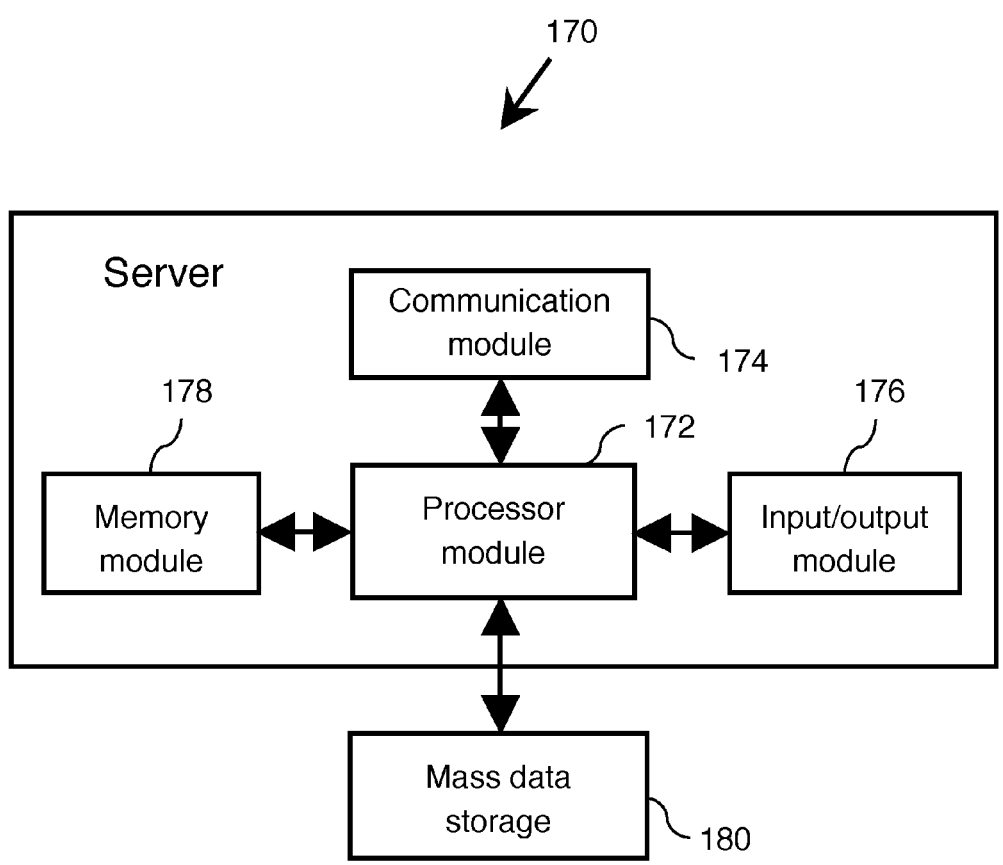
FIG. 20 illustrates a block diagram of a computer server system according to an embodiment of the invention.

FIG. 20 illustrates a block diagram of a server system 170 including a processor module 172, a communication module 174, an input/output module 176, and a memory module 178 in accordance with some exemplary embodiments. It will be appreciated that FIG. 20 illustrates example components of a server however, the server may include additional components such as a power control module (not shown), other hardware, firmware, and software modules as required for the operation of a computer server system. Although the example components illustrated in FIG. 20 as separate modules, some of these modules may be built as a single integrated module and some of the blocks illustrated may be built as more than one unit in the server 170. For example, the input/output module 176 may be made into more than one module such as an input module and an output module. The different modules in the server 170 may be interconnected through an appropriate data bus (not shown) which is able to transmit data between different modules in a computing server system.

The processor module 172 is operably connected to other modules such as communication module 174, input/output module 176, and memory module 178. The processor module 172 may also be operably connected to a mass storage 180 via an appropriate medium such as a data bus, wired connection or wireless connection through an appropriate interface. For example, if the mass storage 180 is implemented within the server computer it may be connected using an appropriate data bus however, if the mass storage 180 is an external device, it may be connected via a wired or wireless connection as appropriate through an appropriate interface. The communication module 174 provides the necessary functions for the server 170 to receive navigation data from user devices, other appropriate data from appropriate sources, and send information (including lane information) to a driver of a vehicle to minimize travel time. The communication module 174 may be designed or appropriately chosen to support the required data transfer and communication technology used for communicating to user devices.

The input/output module 176 may be a single module (example a touch sensitive display) or separate input and output modules. The input module receives external input for the operation of the server 170. Example input devices include hardware keyboard, software keyboard, mouse, voice input device, and other appropriate input devices. The output device presents the output via an appropriate device such as display device, sound, or any other appropriate device. The memory module 178 may include volatile and/or non-volatile memory for the correct operation of the server 170. Volatile memory may include, but not limited to, Random Access Memory (RAM), and non-volatile memory may include, but not limited to, read-only memory, flash memory, hard disk drive, floppy disk, magnetic tape, optical discs, and combinations thereof.

The mass storage device 180 is appropriately connected to the server 170 such that the server may request for data and the mass storage device responds to the request appropriately. The mass data storage device 180 may store road map data, current and past navigation data of vehicles, current and past characteristics of navigation of vehicles, current and past traffic related data, and additional data for the correct operation of the lane determination system, although without limitation thereto. The data may be stored in a database or data files or any other appropriate form.

The server 170 may be a personal computer (non-limiting examples include: a laptop, a desktop computer with appropriate resources such as memory, processing power, communication data rate, and hardware/software reliability), a remote server or a network server accessible via an appropriate communication medium. A personal computer correctly configured to act as a server may communicate to the user device via an appropriate medium. A server may be located in a local area network, wide area network, or any other appropriate network. The server may also be connected to the Internet. The server may also be a cloud based system. In some example, a user device may be connected to a computer or mobile telephone and that computer/mobile telephone may provide the necessary functions for the user device to communicate to a remote server via an appropriate connection or via the Internet.

In an embodiment, the server 170 may be configured with appropriate software and hardware to receive the navigation data from the first and other vehicles in one or more road segment. A server may process this navigation data in conjunction with road map data, type of vehicle, current time and additional data as appropriate to determine lane information in at least one of coarse mode and fine mode for the first vehicle to minimize travel time. The server then transmits the determined lane information and other appropriate information to the appropriate user device in the first vehicle to present to the driver. Similarly, the server may also determine appropriate lane information to other vehicles as well and send it to appropriate user devices. The lane information may also be presented appropriately to the processor of an autonomous driving system in an appropriate form of input to be incorporated into the driving control system.

In an embodiment, the system may be implemented as a client-server model where the user devices 102 act as clients and the server system 104 act as the server. The client may communicate to the remote server 104 directly or via its clique leader through an appropriate communication network 106. In an embodiment, the client and server role may be implemented in computer programs appropriately to perform client-server architecture. A computer program or application program may be stored in one or more computer readable medium may contain machine instructions such that when these instructions are executed a device performs one or more functions described in some exemplary embodiments. The computer program may be implemented in one or more computer languages from a list including machine language, assembly language (for example: Z80 instruction set), procedural language (for example: C language) and object oriented language (for example: C++ language). A computer program may also be implemented in hardware, programmable hardware, and other appropriate medium as will be appreciated by a skilled addressee.

In a preferred embodiment, the vehicle in a road segment may be displayed as icons representing the vehicles on a portion of a road map view, satellite view, three-dimensional view or any other appropriate view depending on factors including user preference, location of the user, traffic condition, and current time. The vehicle icon may represent the features that identify a vehicle including make, model, size, color, one or more digits of registration number of the vehicle, other appropriate information about a vehicle, and combinations thereof.

The different embodiments and implementations of the system, method, and computer program product described in this document may be realized with one or more from a list including analogue electronic circuit, digital electronic circuit, integrated circuit, field-programmable gate array, application specific integrated circuit, computer hardware, software, firmware, and other appropriate form of implementation.

Although, a number of exemplary embodiments of the present invention has been described in this document, it would be appreciated that they may dependent on conditions including the road layout, traffic related restrictions, road rules, driving restrictions (left hand driving, right hand driving, type of road, region, state, territory, and country). The examples and embodiments given in this document are not exhaustive and not limiting the invention. These are some of the examples to describe the invention however, one skilled in the art would understand that other examples also exist and would be able to apply as appropriate without departing from the present invention. Several embodiments of the present invention are described with examples for left hand side driving road system. However, one skilled in the art will understand that the embodiments described in this document may be appropriately implemented in regions, territories and countries where right hand side driving road system is used without departing the scope of the present invention.

Although the invention has been described herein with particular exemplary embodiments, one skilled in the art will understand that various modifications, changes and variations may be made in the elements, operation and details of the methods of the invention without departing the essential scope thereof. The system described herein may be implemented with some components removed or other components added to the method or system without departing from the invention. The different steps illustrated in the figures may not require the particular order shown in the example figures. Additionally, some steps may be eliminated or some steps may be added or order of some of the steps may be changed to the described flow of steps. Furthermore, one or more steps illustrated in one figure may be appropriately included into another figure in the implementation of the invention without departing the present invention. It is intended that the invention described herein is not limited to the exemplary embodiments or examples given to describe the principles of the invention. An ordinary person skilled in the relevant art may use and implement the present invention in other appropriate examples as well without leaving the scope of the invention. The invention will include all the embodiments within the scope of the appended claims.

What is claimed is:

1. A method for determining lane congestion information among a plurality of vehicles on a multi-lane road, comprising:

receiving, through a user input of a user device, a driving destination;

sensing, with a sensor on a first vehicle containing the user device, the presence of a user device in a second vehicle within a vehicle awareness zone relative to the first vehicle;

receiving, through a wireless radio of the user device of the first vehicle, vehicle data of the second vehicle;

transmitting the vehicle data of the second vehicle to a remote server using the wireless radio of the user device in the first vehicle; and switching, in at least one of the user device and the remote server, the mode of operation between a first mode that provides a lane recommendation based on traffic conditions ahead of the first vehicle within the lane the first vehicle is traveling, and a second mode that provides a lane recommendation based on traffic conditions ahead of the first vehicle in a plurality of lanes, the lane recommendation in the second mode including a ranking of lanes based on a travel time estimate for each drivable lane.

2. The method of claim 1, further comprising forming a clique between the first vehicle and the second vehicle based on at least one of a predetermined strength-of-signal threshold between the user device of the first vehicle and the user device of the second vehicle, a predetermined distance sensed between the user device of the first vehicle and the user device of the second vehicle, and a direction of travel of the first vehicle and the second vehicle.

3. The method of claim 1, wherein the user device of the first vehicle is designated as a clique leader configured to interact with the remote server, the designation being based on a comparison of available processing resources amongst user devices in the first and second vehicles.

4. The method of claim 1, wherein the vehicle data of the second vehicle is received using a Wi-Fi or a peer-to-peer communications protocol.

5. The method of claim 1, wherein the vehicle data of the second vehicle includes navigation data.

6. The method of claim 5, wherein the navigation data of the second vehicle is transmitted to the remote server without storage in the user device of the first vehicle.

7. The method of claim 5, wherein the navigation data of the second vehicle transmitted to the remote server is predetermined prior to commencement of a trip being undertaken by the second vehicle.

8. The method of claim 5, further comprising receiving a lane recommendation based on a comparison of navigation data of the first vehicle and the navigation data of the second vehicle.

9. The method of claim 8, wherein the lane recommendation is based on a density of vehicles in the lane in which the first vehicle is traveling.

10. The method of claim 8, wherein the lane recommendation is based on a calculated minimum time of travel to the destination.

11. The method of claim 1, further comprising filtering data received from the second vehicle prior to transmitting the vehicle data of the second vehicle to the remote server.

12. The method of claim 1, further comprising receiving, from at least one of the user device, another vehicle, and the remote server, a lane recommendation based on the second vehicle being classified as a non-automobile vehicle, wherein the non-automobile classification is based on at least one of user input, navigational data, characteristics of navigation, stored data, sensor data, and data from the second vehicle.

13. The method of claim 1, further comprising receiving, from at least one of the user device, another vehicle, and the remote server, a lane recommendation based on a vehicle ahead of the first vehicle being driven in a manner causing a bottleneck in traffic ahead of the first vehicle.

14. The method of claim 1, further comprising receiving a lane recommendation, from at least one of the user device, another vehicle, and the remote server, without providing GPS data to the remote server after sensing the presence of the user device in the second vehicle.

15. The method of claim 1, further comprising selectively transmitting a lane recommendation, from at least one of the user device, another vehicle, and the remote server, amongst a plurality of vehicles, including the first and second vehicles, to minimize traffic oscillation between lanes.

16. The method of claim 1, wherein the switching, in at least one of the user device and the remote server, between the first mode and the second mode is further based on at least one from a group including map data, traffic condition, road condition, weather condition, surrounding condition, and driver state.

17. The method of claim 1, further comprising storing the vehicle data of at least the second vehicle to generate a traffic profile, the traffic profile being based on a time of day.

18. The method of claim 17, further comprising time-stamping the vehicle data of at least the second vehicle to generate the traffic profile.

19. The method of claim 17, wherein the traffic profile is a profile of a predefined segment of road.

20. The method of claim 17, wherein the traffic profile is a profile of a driver.

21. The method of claim 1, further comprising ranking each lane of a predefined segment of road on which the first vehicle is traveling, the ranking being based on at least one of whether the first vehicle is an automobile, the presence of a travel restriction in a lane of the road being travelled by the first vehicle, and average lane speed of each lane within the predefined segment of road.

22. The method of claim 1, further comprising receiving, through the wireless radio of the user device of the first vehicle, an estimated time for an obstructing vehicle ahead of the first vehicle to clear a lane in which the first vehicle is traveling, and receiving a lane recommendation if the estimated time exceeds an estimated travel time for the first vehicle to reach a location of the obstructing vehicle.

23. A method for determining lane congestion information among a plurality of vehicles on a multi-lane road, comprising:
   receiving, through a user input of a user device, a driving destination;
   receiving, through a wireless radio of the user device, vehicle data of a second vehicle within a vehicle awareness zone relative to a first vehicle containing the user device, wherein the vehicle data includes vehicle type data and navigation data, wherein the navigation data is based on at least one of a driving destination, road map data, and lane obstruction data; and
   determining whether a lane recommendation is needed for the first vehicle based on the vehicle data of the second vehicle.

24. The method of claim 23, wherein the vehicle awareness zone is defined by at least one of a predetermined strength-of-signal threshold between the user device of the first vehicle and a user device of the second vehicle, a predetermined distance sensed between the user device of the first vehicle and the user device of the second vehicle, and a direction of travel of the first vehicle and the second vehicle.

25. The method of claim 23, further comprising sensing, with a sensor in the first vehicle, the presence of a user device in the second vehicle and obtaining the navigation data of the second vehicle from the user device in the second vehicle the presence sensed by the sensor meets a predetermined threshold, and wherein the lane recommendation is based on at least the navigation data of the second vehicle and determined to reduce at least one of traffic bottleneck and traffic oscillation between lanes.

26. A system for determining lane congestion information among a plurality of vehicles on a multi-lane road, comprising:
   a first database including navigation data pertaining to a geographical area;

a processor configured to receive navigation data from a user device in a first vehicle; and a non-transitory computer readable medium encoded with a computer program coupled to said processor to:

compare the navigation data of the first vehicle with the navigation data stored in said first database;

switch, in at least one of the user device and a remote server, between a first mode that provides a lane recommendation based on vehicle data of the vehicles ahead of the first vehicle within the lane the first vehicle is traveling, and a second mode that provides a lane recommendation based on traffic conditions ahead of the first vehicle in a plurality of lanes, the lane recommendation in the second mode including a ranking of lanes based on a travel time estimate for each drivable lane wherein vehicle data includes at least navigation data; and send the lane recommendation to the user device in the first vehicle.

27. The system of claim 26, further comprising the non-transitory computer readable medium encoded with a computer program coupled to said processor to:

receive navigation data of a second vehicle within a vehicle awareness zone relative to the first vehicle; and compare the navigation data of the first vehicle with the navigation data of the second vehicle; wherein the computer program encoded on said non-transitory computer readable medium includes instructions that when executed by said processor cause said processor to generate a plurality of lane recommendations deliverable to a respective number of vehicles to reduce at least one of traffic bottleneck and traffic oscillation between lanes.

28. A computer program product embodied in a non-transitory computer readable storage medium for providing a lane recommendation to a user in a first vehicle, the computer program product comprising programming instructions causing a coupled processor to:

receive navigation data of a first vehicle;

sense a presence of a user device in a second vehicle within a vehicle awareness zone relative to the first vehicle;

receive vehicle data of the second vehicle;

transmit the vehicle data of the second vehicle to a remote server using a coupled wireless radio; and determine, in at least one of the user device and the remote server, a lane recommendation in a first mode based on vehicle data of the vehicles ahead of the first vehicle within the lane the first vehicle is travelling or in a second mode based on vehicle data of the vehicles ahead of the first vehicle in a plurality of lanes wherein each respective lane is ranked based on a travel time for each lane wherein vehicle data includes at least navigation data.

29. The computer program product of claim 28, further comprising programming instructions causing the coupled computer to receive a lane recommendation from the remote server and transmit the lane recommendation to the second vehicle.

30. The computer program product of claim 28, further comprising programming instructions causing the coupled computer to receive a plurality of lane recommendations from the remote server and multicast the lane recommendations to a plurality of vehicles within the vehicle awareness zone.

* * * * *